US010627224B2

(12) United States Patent
Masuda

(10) Patent No.: US 10,627,224 B2
(45) Date of Patent: Apr. 21, 2020

(54) INFORMATION PROCESSING DEVICE, INFORMATION PROCESSING METHOD, AND PROGRAM

(71) Applicant: FUJIFILM CORPORATION, Minato-ku, Tokyo (JP)

(72) Inventor: Tomonori Masuda, Saitama (JP)

(73) Assignee: FUJIFILM CORPORATION, Tokyo (JP)

(*) Notice: Subject to any disclaimer, the term of this patent is extended or adjusted under 35 U.S.C. 154(b) by 100 days.

(21) Appl. No.: 16/051,511

(22) Filed: Aug. 1, 2018

(65) Prior Publication Data
US 2018/0335300 A1    Nov. 22, 2018

Related U.S. Application Data

(63) Continuation of application No. PCT/JP2016/083992, filed on Nov. 16, 2016.

(30) Foreign Application Priority Data

Feb. 29, 2016 (JP) ................. 2016-038143

(51) Int. Cl.
*G01B 11/26* (2006.01)
*G03B 15/00* (2006.01)
(Continued)

(52) U.S. Cl.
CPC ............ *G01B 11/26* (2013.01); *G01B 11/026* (2013.01); *G01S 17/08* (2013.01); *G02B 13/06* (2013.01);
(Continued)

(58) Field of Classification Search
None
See application file for complete search history.

(56) References Cited

U.S. PATENT DOCUMENTS 6,711,284 B1   3/2004 Koide
9,071,751 B2   6/2015 Higashimoto
(Continued)

FOREIGN PATENT DOCUMENTS

CN   101312501 A   11/2008
CN   103245255 A    8/2013
(Continued)

OTHER PUBLICATIONS

International Search Report issued in International Application No. PCT/JP2016/083992 dated Feb. 7, 2017.
(Continued)

*Primary Examiner* — William B Perkey
(74) *Attorney, Agent, or Firm* — SOLARIS Intellectual Property Group, PLLC

(57) ABSTRACT

An information processing device includes an acquisition unit that acquire measurement success/failure information indicating whether or not measurement by a measurement unit has been successful in a case where a measurement process is executed of emitting directional light, which is light having directivity, toward a subject within a specific imaging range among a plurality of imaging ranges serving as imaging targets in panoramic imaging of the subject, and receiving reflected light of the directional light to cause the measurement unit to measure a distance to the subject, and an execution unit that executes a measurement suppressing process of suppressing the measurement by the measurement unit which is performed on the subjects within the plurality of imaging ranges, in a case where the measurement success/failure information acquired by the acquisition unit indicates that the measurement by the measurement unit has been successful.

20 Claims, 34 Drawing Sheets

(51) Int. Cl.
*G01B 11/00* (2006.01)
*G03B 37/02* (2006.01)
*G03B 13/20* (2006.01)
*G06T 7/246* (2017.01)
*G06T 7/73* (2017.01)
*G01S 17/08* (2006.01)
*G02B 13/06* (2006.01)
*G01B 11/02* (2006.01)

(52) U.S. Cl.
CPC ............. *G03B 13/20* (2013.01); *G03B 15/00* (2013.01); *G03B 37/02* (2013.01); *G06T 7/246* (2017.01); *G06T 7/73* (2017.01)

(56) References Cited

U.S. PATENT DOCUMENTS

| | | | |
|---|---|---|---|
| 2003/0210407 A1* | 11/2003 | Xu | G01B 11/2545 356/611 |
| 2009/0245653 A1 | 10/2009 | Kochi et al. | |
| 2012/0045100 A1* | 2/2012 | Ishigami | G06T 7/73 382/106 |
| 2012/0229870 A1 | 9/2012 | Inoue et al. | |

FOREIGN PATENT DOCUMENTS

| | | |
|---|---|---|
| CN | 103868504 A | 6/2014 |
| JP | 2000-099740 A | 4/2000 |
| JP | 2001-124522 A | 5/2001 |
| JP | 2007-278743 A | 10/2007 |
| JP | 2009-053126 A | 3/2009 |
| JP | 2012-185053 A | 9/2012 |
| JP | 2012-199752 A | 10/2012 |
| JP | 2013-092456 A | 5/2013 |

OTHER PUBLICATIONS

Written Opinion of the ISA issued in International Application No. PCT/JP2016/083992 dated Feb. 7, 2017.

International Preliminary Report on Patentability issued in International Application No. PCT/JP2016/083992 dated Apr. 21, 2017.

English language translation of the following: Office action dated Nov. 13, 2019 from the SIPO in a Chinese patent application No. 201680082669.7 corresponding to the instant patent application. This office action translation is submitted now in order to supplement the understanding of the cited references which are being disclosed in the instant Information Disclosure Statement.

\* cited by examiner

INFORMATION PROCESSING DEVICE, INFORMATION PROCESSING METHOD, AND PROGRAM

CROSS-REFERENCE TO RELATED APPLICATIONS

This application is a continuation application of International Application No. PCT/JP2016/083992, filed Nov. 16, 2016, the disclosure of which is incorporated herein by reference in its entirety. Further, this application claims priority from Japanese Patent Application No. 2016-038143, filed Feb. 29, 2016, the disclosure of which is incorporated herein by reference in its entirety.

BACKGROUND

1. Technical Field

The technique of the present disclosure relates to an information processing device, an information processing method, and a program.

2. Related Art

JP2013-92456A, JP2012-185053A, and JP2000-99740A disclose a device that performs panoramic imaging on a subject. Meanwhile, in these specifications, the panoramic imaging refers to a series of operations of imaging a subject included in an imaging range with respect to a plurality of imaging ranges which are continuous with each other in a specific direction such as a vertical direction or a horizontal direction, and joining a plurality of captured images obtained by the imaging together to generate a panoramic image.

Incidentally, there has been known a distance measurement device which is equipped with a panoramic imaging function of performing panoramic imaging, in addition to a distance measurement function of emitting a laser beam to a measurement target and receiving reflected light of the laser beam to measure a distance to the measurement target. Such a type of distance measurement device operates the distance measurement function together with the panoramic imaging function to measure a distance to a subject included in an imaging range required in panoramic imaging.

SUMMARY

However, in the above-described distance measurement device, it is not possible to measure a distance to a subject in a case where the subject is irradiated with a laser beam at an angle where reflected light cannot be received, is black in color, has light transmissivity, or has a gloss.

Consequently, in order to increase the degree of success in measurement of a distance to a subject, a method is considered in which the distance to the subject is measured once with respect to each of all imaging required in one panoramic imaging.

According to this method, it is possible to increase the degree of success in the measurement of the distance to the subject, as compared to a case where the distance to the subject is measured only once with respect to each of all imaging required in one panoramic imaging. On the other hand, the measurement of the distance to the subject with respect to each of all imaging required in one panoramic imaging may be troublesome work. For this reason, in a case where panoramic imaging is performed on each of a plurality of subjects and a distance to the subject is also measured in each panoramic imaging, much time and effort may be required until the entire work is terminated.

One embodiment of the invention provides an information processing device, an information processing method, and a program which are capable of suppressing unnecessary measurement, as compared to a case where a distance to a subject is measured once with respect to each of all imaging required in one panoramic imaging.

An information processing device of a first aspect of the invention includes an acquisition unit that acquire measurement success/failure information indicating whether or not measurement by a measurement unit has been successful in a case where a measurement process is executed of emitting directional light, which is light having directivity, toward a subject within a specific imaging range among a plurality of imaging ranges serving as imaging targets in panoramic imaging of the subject, and receiving reflected light of the directional light to cause the measurement unit to measure a distance to the subject, and an execution unit that executes a measurement suppressing process of suppressing the measurement by the measurement unit which is performed on the subjects within the plurality of imaging ranges, in a case where the measurement success/failure information acquired by the acquisition unit indicates that the measurement by the measurement unit has been successful.

Therefore, according to the information processing device of the first aspect of the invention, it is possible to suppress unnecessary measurement, as compared to a case where the distance to the subject is measured once with respect to each of all imaging required in one panoramic imaging.

In the information processing device of a second aspect of the invention according to the information processing device of the first aspect of the invention, the measurement suppressing process is a measurement prohibition process of prohibiting the measurement by the measurement unit which is performed on the subjects within the plurality of imaging ranges.

Therefore, according to the information processing device of the second aspect of the invention, it is possible to prohibit unnecessary measurement, as compared to a case where the distance to the subject is measured once with respect to each of all imaging required in one panoramic imaging.

In the information processing device of a third aspect of the invention according to the information processing device of the second aspect of the invention, the measurement process is a process executed in a case where a measurement start instruction for causing the measurement unit to start the measurement of the distance to the subject is received, and the measurement prohibition process is a process of prohibiting the measurement by the measurement unit which is performed on the subjects within the plurality of imaging ranges by invalidating the measurement start instruction.

Therefore, according to the information processing device of the third aspect of the invention, it is possible to prohibit unnecessary measurement by simple control, as compared to a case where the measurement start instruction is not invalidated.

In the information processing device of a fourth aspect of the invention according to the information processing device of any one of the first to third aspects of the invention, the measurement suppressing process is a process of suppressing the measurement by the measurement unit which is performed on the subject within an imaging range of which imaging has not been performed yet, among the plurality of imaging ranges.

Therefore, according to the information processing device of the fourth aspect of the invention, it is possible to suppress unnecessary measurement even during panoramic imaging, as compared to a case where the distance to the subject is measured once with respect to each of all imaging required in one panoramic imaging.

In the information processing device of a fifth aspect of the invention according to the information processing device of any one of the first to fourth aspects of the invention, the execution unit executes the measurement suppressing process in a case where the measurement success/failure information acquired by the acquisition unit indicates that the measurement by the measurement unit has been successful, and imaging of the plurality of imaging ranges has been terminated.

Therefore, according to the information processing device of the fifth aspect of the invention, it is possible to suppress unnecessary measurement, as compared to a case where the subject within the imaging range having been subjected to imaging is set to be a measurement target and the measurement by the measurement unit is executed again, even though the measurement by the measurement unit has been successful and the imaging of the plurality of imaging ranges has been terminated.

In the information processing device of a sixth aspect of the invention according to the information processing device of any one of the first to fifth aspects of the invention, the measurement suppressing process is a process including a first display process of displaying, on a first display unit, information for prompting suppression of the measurement by the measurement unit which is performed on the subjects within the plurality of imaging ranges.

Therefore, according to the information processing device of the sixth aspect of the invention, it is possible to suppress remeasurement of the distance to the subject within the imaging range used in the panoramic imaging that has already been performed, as compared to a case where the information for prompting suppression of the measurement by the measurement unit is not displayed.

In the information processing device of a seventh aspect of the invention according to the information processing device of any one of the first to sixth aspects of the invention, the execution unit further executes a movement process of operating a change mechanism, which has a power source and changes an imaging direction in accordance with power generated by the power source, in a case where imaging of the subject within a designated imaging range is terminated, to move a position of the designated imaging range to a position where next imaging in the panoramic imaging is expected to be performed, the designated imaging range being an imaging range designated as an object to be subjected to the imaging before individual imaging is performed, among the plurality of imaging ranges.

Therefore, according to the information processing device of the seventh aspect of the invention, it is possible to move the position of the designated imaging range to a position where the next imaging in the panoramic imaging is expected to be performed without requiring time and effort, as compared to a case where the position of the designated imaging range is manually moved to a position where the next imaging required in the panoramic imaging is expected to be performed.

In the information processing device of an eighth aspect of the invention according to the information processing device of any one of the first to seventh aspects of the invention, the execution unit further executes a generation process of generating a panoramic image obtained by joining images, which are obtained by performing projection conversion on a plurality of captured images obtained by imaging the subject included in each of the plurality of imaging ranges, together.

Therefore, according to the information processing device of the eighth aspect of the invention, it is possible to generate a high-precision panoramic image, as compared to a case where a panoramic image is generated by joining images having not been subjected to projection conversion together.

In the information processing device of a ninth aspect of the invention according to the information processing device of the eighth aspect of the invention, in a case where a first captured image, obtained by imaging the subject within one imaging range of which imaging is first performed out of adjacent imaging ranges which are imaging ranges adjacent to each other in the plurality of imaging ranges, includes multi-apex pixels which are at least four or more pixels for defining apexes of a polygon and a second captured image, obtained by imaging the subject within the other imaging range out of the adjacent imaging ranges, includes corresponding pixels which are pixels corresponding to the multi-apex pixels, the panoramic image is an image including a first projection-converted image which is an image obtained by performing projection conversion on the first captured image on the basis of the multi-apex pixels, and a second projection-converted image which is an image obtained by performing projection conversion on the second captured image on the basis of the corresponding pixels.

Therefore, according to the information processing device of the ninth aspect of the invention, it is possible to generate the panoramic image including the projection-converted image without requiring time and effort, as compared to a case where four or more pixels for defining the apexes of the polygon are searched for with respect to each of all still images obtained by imaging each subject included in each of the plurality of imaging ranges serving as imaging targets in the panoramic imaging.

In the information processing device of a tenth aspect of the invention according to the information processing device of the ninth aspect of the invention, the execution unit further executes a second display process of displaying imaging start timing information, indicating a timing when the imaging of the subject within the other imaging range is started, on a second display unit in a case where the other imaging range includes the apexes of the polygon.

Therefore, according to the information processing device of the tenth aspect of the invention, it is possible to easily make a user recognize an imaging timing when a captured image contributing to high-precision projection conversion can be acquired, as compared to a case where the imaging start timing information is not displayed.

In the information processing device of an eleventh aspect of the invention according to the information processing device of any one of the first to tenth aspects of the invention, the execution unit further executes a derivation process of deriving a dimension of a real space region corresponding to an interval between a plurality of pixels designated within a panoramic image obtained by performing the panoramic imaging, on the basis of the distance to the subject which is obtained by executing the measurement process and the designated interval.

Therefore, according to the information processing device of the eleventh aspect of the invention, it is possible to derive the dimension of a real space region designated through the panoramic image without requiring time and effort, as compared to a case where the distance to the subject is measured once with respect to each of all imaging required in one panoramic imaging.

An information processing method of a twelfth aspect of the invention includes acquiring measurement success/failure information indicating whether or not measurement by a measurement unit has been successful in a case where a measurement process is executed of emitting directional light, which is light having directivity, toward a subject within a specific imaging range among a plurality of imaging ranges serving as imaging targets in panoramic imaging of the subject, and receiving reflected light of the directional light to cause the measurement unit to measure a distance to the subject, and executing a measurement suppressing process of suppressing the measurement by the measurement unit which is performed on the subjects within the plurality of imaging ranges, in a case where the acquired measurement success/failure information indicates that the measurement by the measurement unit has been successful.

Therefore, according to the information processing method of the twelfth aspect of the invention, it is possible to suppress unnecessary measurement, as compared to a case where the distance to the subject is measured once with respect to each of all imaging required in one panoramic imaging.

A program of a thirteenth aspect of the invention causes a computer to execute a process including acquiring measurement success/failure information indicating whether or not measurement by a measurement unit has been successful in a case where a measurement process is executed of emitting directional light, which is light having directivity, toward a subject within a specific imaging range among a plurality of imaging ranges serving as imaging targets in panoramic imaging of the subject, and receiving reflected light of the directional light to cause the measurement unit to measure a distance to the subject, and executing a measurement suppressing process of suppressing the measurement by the measurement unit which is performed on the subjects within the plurality of imaging ranges, in a case where the acquired measurement success/failure information indicates that the measurement by the measurement unit has been successful.

Therefore, according to the program of the thirteenth aspect of the invention, it is possible to suppress unnecessary measurement, as compared to a case where the distance to the subject is measured once with respect to each of all imaging required in one panoramic imaging.

According to one embodiment of the invention, it is possible to obtain an effect that unnecessary measurement can be suppressed, as compared to a case where a distance to a subject is measured once with respect to each of all imaging required in one panoramic imaging.

BRIEF DESCRIPTION OF THE DRAWINGS

Exemplary embodiments according to the technique of the present disclosure will be described in detail based on the following figures, wherein.

DETAILED DESCRIPTION

Hereinafter, an example of an embodiment according to the technique of this disclosure will be described with reference to the accompanying drawings.

Meanwhile, in this embodiment, for convenience of description, a distance from a distance measurement device 10A to a subject serving as a measurement target will be simply referred to as a "distance" or a "distance to a subject". In this embodiment, an angle of view with respect to a subject will be simply referred to as an "angle of view". In this embodiment, "distance measurement" refers to the measurement of a distance to a subject.

First Embodiment

Figure 1:
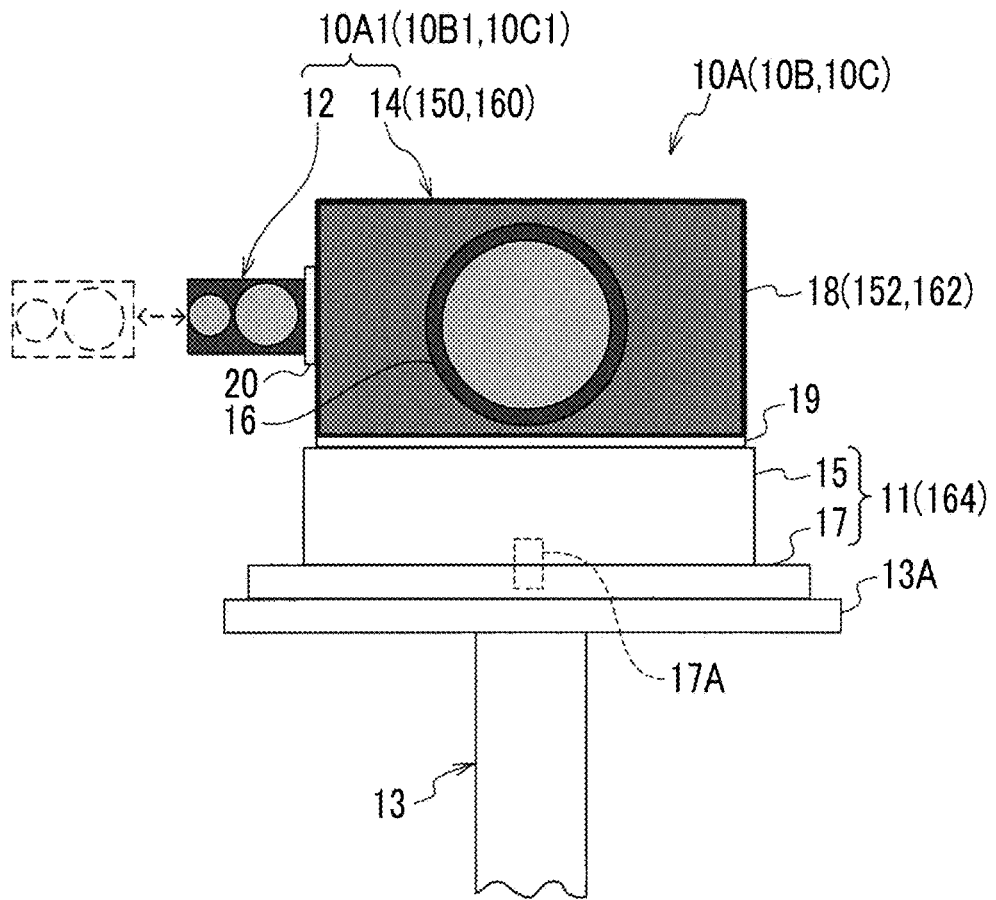
FIG. 1 is a front view illustrating an example of the appearance of a distance measurement device according to first to third embodiments.

As illustrated in FIG. 1 as an example, the distance measurement device 10A which is an example of an information processing device according to the technique of this disclosure includes a distance measurement device main body 10A1 and a change mechanism 11, and is supported by a tripod 13.

The distance measurement device main body 10A1 includes a distance measurement unit 12 and an imaging device 14. Meanwhile, in this embodiment, the distance measurement unit 12 and a distance measurement control unit 68 to be described later (see FIG. 5) are examples of a measurement unit according to the technique of this disclosure.

The change mechanism 11 includes a vertical rotation mechanism 15 and a horizontal rotation mechanism 17, and changes an imaging direction of the imaging device 14 in accordance with power which is generated by motors 21 and 23 to be described later. The vertical rotation mechanism 15 is disposed so as to be superimposed on the upper surface of the horizontal rotation mechanism 17. The distance measurement device main body 10A1 is disposed so as to be superimposed on the upper surface of the vertical rotation mechanism 15. The horizontal rotation mechanism 17 is detachably attached on the upper surface of a camera platform 13A of the tripod 13.

A pillar-like rotation axis 17A erected in the vertical direction of the distance measurement device 10A when seen in a front view is provided in the center portion of the horizontal rotation mechanism 17 when seen in a plan view, and the vertical rotation mechanism 15 is attached so as to be rotatable with respect to the horizontal rotation mechanism 17 through the rotation axis 17A.

A hot shoe 19 is provided on the lower surface of the imaging device 14, and the change mechanism 11 is detachably attached to the imaging device 14 through the hot shoe 19.

The imaging device 14 includes a lens unit 16 and an imaging device main body 18, and the lens unit 16 is detachably attached to the imaging device main body 18.

A hot shoe 20 is provided on the left surface of the imaging device main body 18 in a front view, and the distance measurement unit 12 is detachably attached to the hot shoe 20.

The distance measurement device 10A has a distance measurement system function of emitting a laser beam for distance measurement to the distance measurement unit 12 to perform distance measurement and an imaging system function of causing the imaging device 14 to image a subject to obtain a captured image. Meanwhile, hereinafter, a captured image will be also simply referred to as an "image". In addition, hereinafter, for convenience of description, a description will be given on the assumption that the height of an optical axis L1 (see FIG. 5) of a laser beam emitted from the distance measurement unit 12 is the same as the height of an optical axis L2 (see FIG. 5) of the lens unit 16 in the vertical direction.

The distance measurement device 10A operates the distance measurement system function to perform a measurement sequence (see FIG. 6) once in accordance with one instruction in principle, and one distance is finally output by the measurement sequence being performed once.

The distance measurement device 10A has a panoramic imaging measurement mode and a dimension derivation mode as operation modes of the distance measurement system function. The panoramic imaging measurement mode is an operation mode for performing distance measurement together with panoramic imaging. The dimension derivation mode is an operation mode for deriving the dimension of a real space region designated by a user by operating a dimension derivation function to be described later, on the basis of the actually measured distance which is a distance measured by the distance measurement device 10A.

Meanwhile, hereinafter, for convenience of description, a description will be given of an example of a case where a distance between two points in the real space is derived, as the dimension of the real space region. In addition, hereinafter, for convenience of description, "between the two points in the real space" will be referred to as an "area on the real space" or simply an "area".

The distance measurement device 10A has a still image imaging mode and a movie imaging mode as operation modes of the imaging system function. The still image imaging mode is an operation mode for capturing a still image, and the movie imaging mode is an operation mode for capturing a moving image. The still image imaging mode and the movie imaging mode are selectively set in accordance with a user's instruction.

Figure 2:
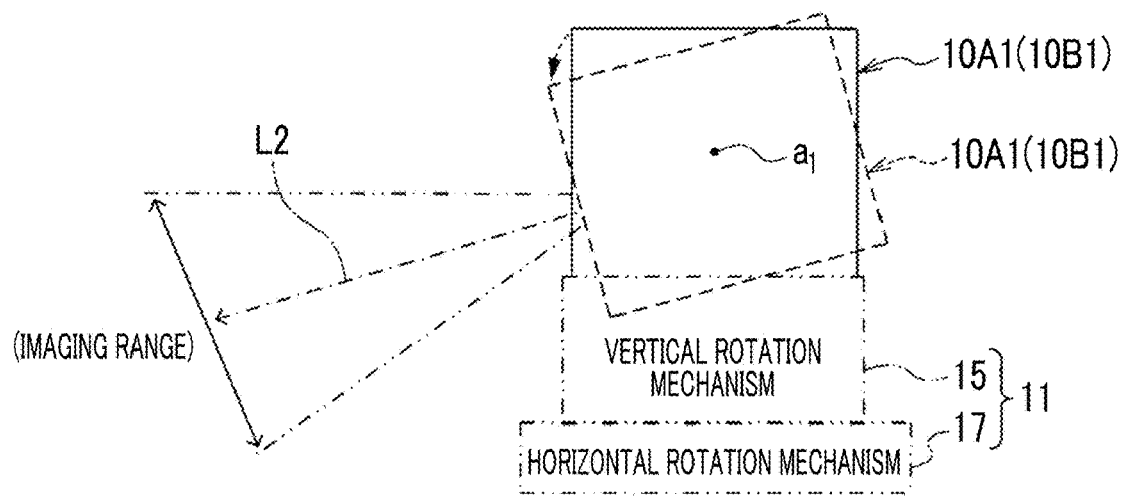
FIG. 2 is a diagram, when seen in a side view, illustrating an example of a mode in which the position of an imaging device, which is included in the distance measurement device according to the first and second embodiments, in an imaging range is changed downward when seen in a front view.
Figure 3:
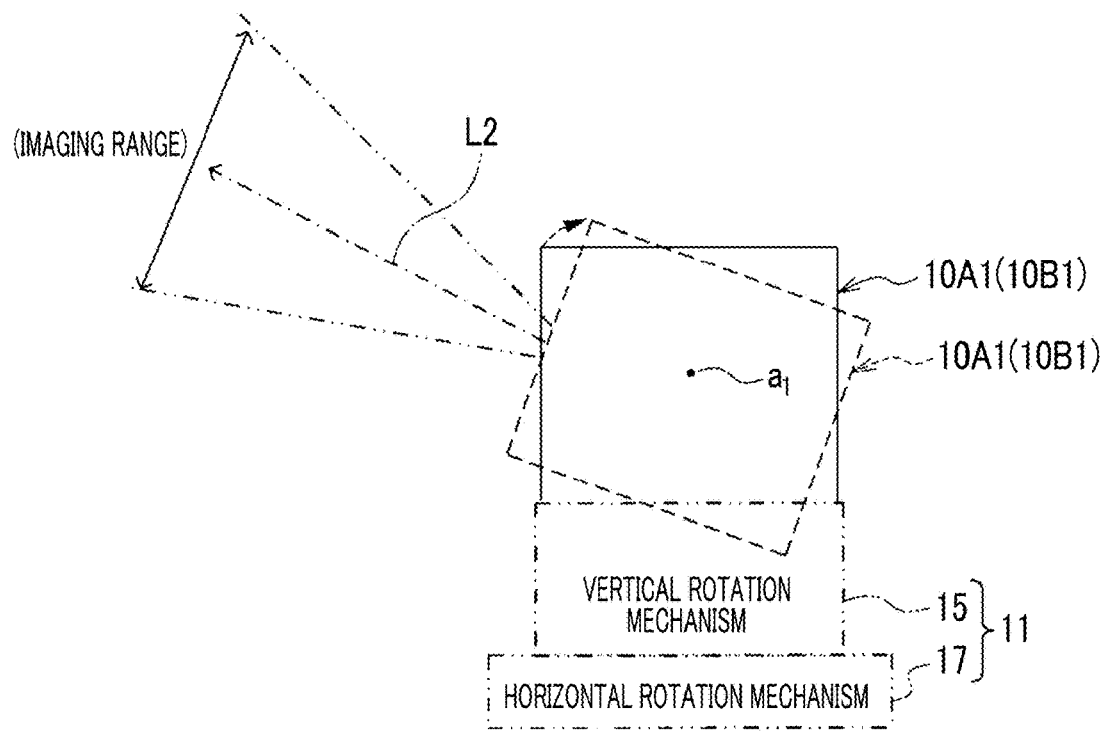
FIG. 3 is a diagram, when seen in a side view, illustrating an example of a mode in which the position of an imaging device, which is included in the distance measurement device according to the first and second embodiments, in an imaging range is changed upward when seen in a front view.

As illustrated in FIGS. 2 and 3 as examples, the vertical rotation mechanism 15 receives power generated by the motor 23 (see FIG. 5) to be described later in a state where the distance measurement device main body 10A1 is attached to the vertical rotation mechanism 15, to rotate the distance measurement device main body 10A1 in the vertical direction when seen in a front view.

As illustrated in FIG. 2 as an example, in a case where the distance measurement device main body 10A1 is rotated counterclockwise centering around a center point $a_1$ of the distance measurement device main body 10A1 when seen from the right side surface by the vertical rotation mechanism 15 in a state where the distance measurement device main body is attached to the vertical rotation mechanism 15, the position of the imaging range is changed downward when seen in a front view. In this case, the emission direction of the laser beam by the distance measurement unit 12 is also changed downward when seen in a front view. Meanwhile, in this embodiment, the imaging range refers to a range on the real space which is to be imaged by the imaging device 14.

As illustrated in FIG. 3 as an example, in a case where the distance measurement device main body 10A1 is rotated clockwise centering around the center point $a_1$ of the distance measurement device main body 10A1 when seen from the right side surface by the vertical rotation mechanism 15 in a state where the distance measurement device main body is attached to the vertical rotation mechanism 15, the position of the imaging range is changed upward when seen in a front view. In this case, the emission direction of the laser beam by the distance measurement unit 12 is also changed upward when seen in a front view.

Figure 4:
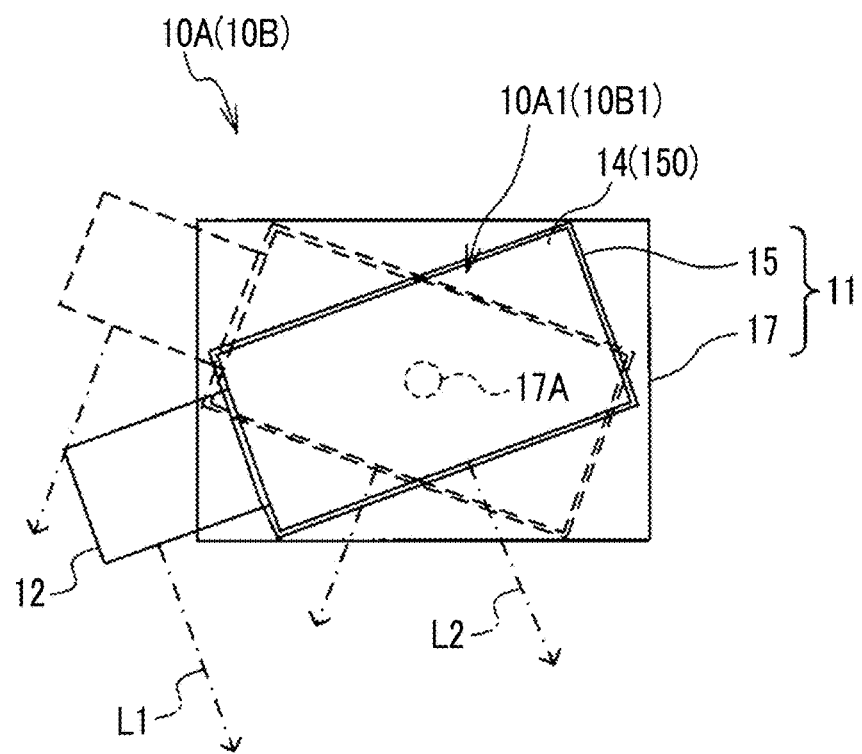
FIG. 4 is a diagram, when seen in a plan view, illustrating an example of a mode in which a distance measurement device main body included in the distance measurement device according to the first and second embodiments is rotated in a lateral direction when seen in a front view.

As illustrated in FIG. 4 as an example, the center portion of the vertical rotation mechanism 15 when seen in a bottom view is fixed to the rotation axis 17A of the horizontal rotation mechanism 17. The rotation axis 17A is rotated by the transmission of power, generated by the motor 21 (see FIG. 5) to be described later, as a rotational force. Therefore, the horizontal rotation mechanism 17 receives the power generated by the motor 21 to be described later in a state where the distance measurement device main body 10A1 is attached to the vertical rotation mechanism 15, to rotate the distance measurement device main body 10A1 in the lateral direction when seen in a front view.

That is, in a case where the distance measurement device main body 10A1 is rotated counterclockwise when seen in a plan view centering around the rotation axis 17A of the distance measurement device main body 10A1 by the horizontal rotation mechanism 17 in a state where the distance measurement device main body is attached to the vertical rotation mechanism 15, the position of the imaging range is changed rightward when seen in a front view. In this case, the emission direction of the laser beam by the distance measurement unit 12 is also changed rightward when seen in a front view.

In a case where the distance measurement device main body 10A1 is rotated clockwise centering around the rotation axis 17A of the distance measurement device main body 10A1 when seen in a plan view by the horizontal rotation mechanism 17 in a state where the distance measurement device main body is attached to the vertical rotation mechanism 15, the position of the imaging range is changed leftward when seen in a front view. In this case, the emission direction of the laser beam by the distance measurement unit 12 is also changed leftward when seen in a front view.

Figure 5:
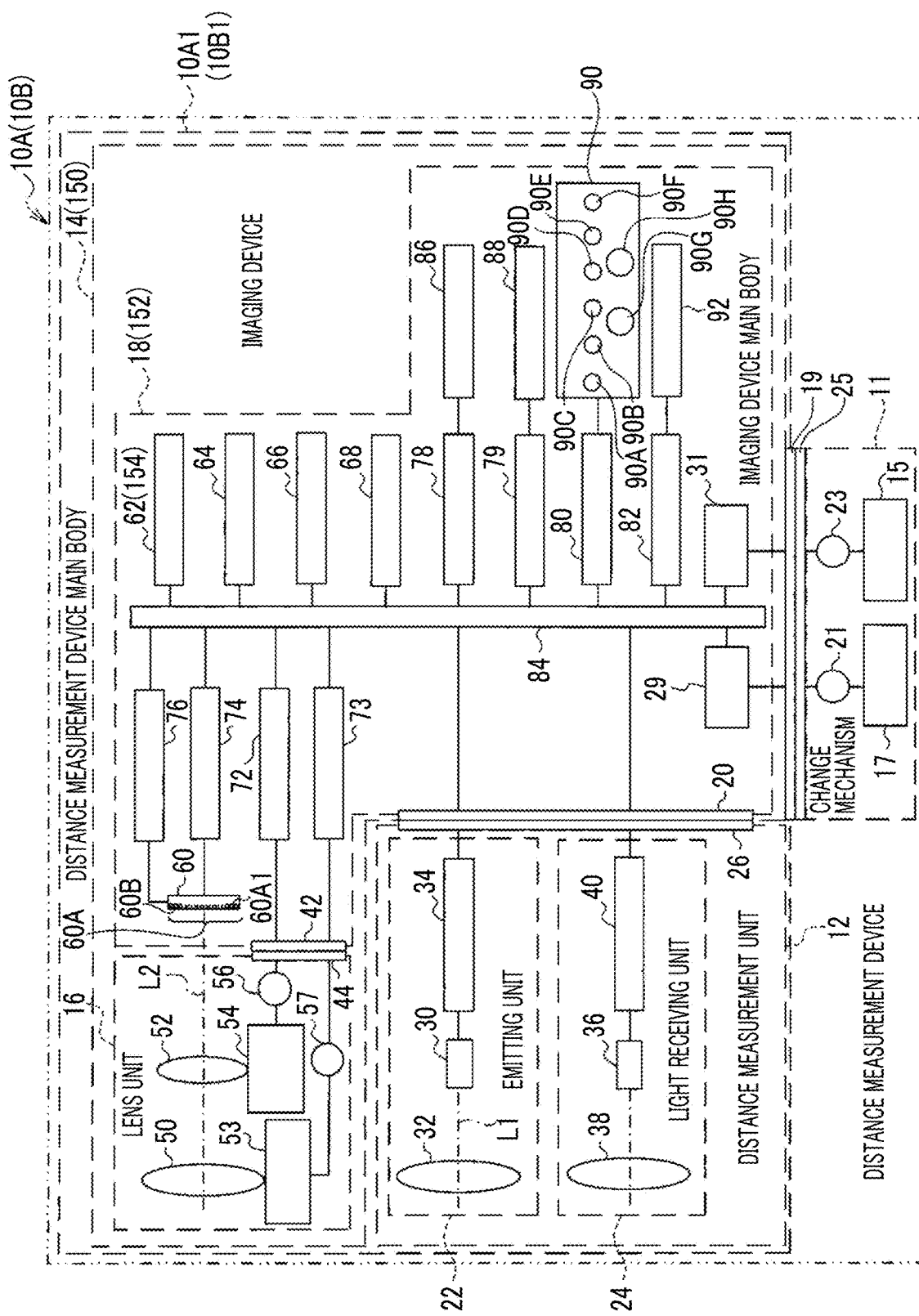
FIG. 5 is a block diagram illustrating an example of a hardware configuration of the distance measurement device according to the first and second embodiments.

As illustrated in FIG. 5 as an example, the distance measurement unit 12 includes an emitting unit 22, a light receiving unit 24, and a connector 26.

The connector 26 can be connected to the hot shoe 20, and the distance measurement unit 12 is operated under the control of the imaging device main body 18 in a state where the connector 26 is connected to the hot shoe 20.

The emitting unit 22 includes a Laser Diode (LD) 30, a condensing lens (not shown), an objective lens 32, and an LD driver 34.

The condensing lens and the objective lens 32 are provided along the optical axis L1 of a laser beam emitted by the LD 30, and are disposed in this order along the optical axis L1 from the LD 30 side.

The LD 30 emits a laser beam for distance measurement which is an example of a directional light according to the technique of this disclosure. The laser beam emitted by the LD 30 is a colored laser beam, and an irradiation position of the laser beam is visually recognized on the real space and is also visually recognized from a captured image obtained by the imaging device 14, for example, within a range of approximately several meters from the emitting unit 22.

The condensing lens condenses a laser beam emitted by the LD 30, and transmits the condensed laser beam. The objective lens 32 faces a subject, and emits the laser beam passing through the condensing lens to the subject.

The LD driver 34 is connected to the connector 26 and the LD 30, and drives the LD 30 in accordance with an instruction of the imaging device main body 18 to emit a laser beam.

The light receiving unit 24 includes a Photo Diode (PD) 36, an objective lens 38, and a light receiving signal processing circuit 40. The objective lens 38 is disposed on a light receiving surface side of the PD 36, and a reflected laser beam which is a laser beam emitted by the emitting unit 22 and reflected from the subject is incident on the objective lens 38. The objective lens 38 transmits the reflected laser beam and guides the reflected laser beam to the light receiving surface of the PD 36. The PD 36 receives the reflected laser beam having passed through the objective lens 38, and outputs an analog signal based on the amount of light received, as a light receiving signal.

The light receiving signal processing circuit 40 is connected to the connector 26 and the PD 36, amplifies the light receiving signal, which is input from the PD 36, by an amplifier (not shown), and performs Analog/Digital (A/D) conversion on the amplified light receiving signal. The light receiving signal processing circuit 40 outputs the light receiving signal digitalized by the A/D conversion to the imaging device main body 18.

The imaging device 14 includes mounts 42 and 44. The mount 42 is provided in the imaging device main body 18, and the mount 44 is provided in the lens unit 16. The lens unit 16 is exchangeably mounted on the imaging device main body 18 by the mount 44 being coupled to the mount 42.

The lens unit 16 includes a focusing lens 50, a zoom lens 52, a focusing lens movement mechanism 53, a zoom lens moving mechanism 54, and motors 56 and 57.

Subject light which is light reflected from the subject is incident on the focusing lens 50. The focusing lens 50 transmits the subject light and guides the subject light to the zoom lens 52.

The focusing lens 50 is attached to the focusing lens movement mechanism 53 so as to be slidable with respect to the optical axis L2. In addition, the motor 57 is connected to the focusing lens movement mechanism 53, and the focusing lens movement mechanism 53 receives power of the motor 57 to make the focusing lens 50 slide along the direction of the optical axis L2.

The zoom lens 52 is attached to the zoom lens moving mechanism 54 so as to be slidable with respect to the optical axis L2. In addition, the motor 56 is connected to the zoom lens moving mechanism 54, and the zoom lens moving mechanism 54 receives the power of the motor 56 to make the zoom lens 52 slide along the direction of the optical axis L2.

The motors 56 and 57 are connected to the imaging device main body 18 through the mounts 42 and 44, and driving is controlled in accordance with a command given from the imaging device main body 18.

The change mechanism 11 includes the vertical rotation mechanism 15, the horizontal rotation mechanism 17, the motors 21 and 23, and the connector 25. The motor 21 and the motor 23 which are examples of a power source according to the technique of this disclosure are connected to the connector 25.

The connector 25 is configured to be connectable to the hot shoe 19. In a case where the connector 25 is connected to the hot shoe 19, the motors 21 and 23 are connected to the imaging device main body 18, and the driving of the motors is controlled in accordance with a command given from the imaging device main body 18.

Meanwhile, in this embodiment, a stepping motor is applied as an example of the motors 21, 23, 56, and 57. Therefore, the motors 21, 23, 56, and 57 are operated in synchronization with a pulse power on the basis of a command given from the imaging device main body 18.

The imaging device main body 18 includes an imaging element 60, a main control unit 62, an image memory 64, an image processing unit 66, a distance measurement control unit 68, motor drivers 29, 31, 72, and 73, an imaging element driver 74, an image signal processing circuit 76, and a display control unit 78. In addition, the imaging device main body 18 includes a touch panel interface (I/F) 79, a reception I/F 80, and a media I/F 82.

The main control unit 62, the image memory 64, the image processing unit 66, the distance measurement control unit 68, the motor drivers 29, 31, 72, and 73, the imaging element driver 74, the image signal processing circuit 76, and the display control unit 78 are connected to a bus line 84. In addition, the touch panel I/F 79, the reception I/F 80, and the media I/F 82 are also connected to the bus line 84.

The imaging element 60 is a Complementary Metal Oxide Semiconductor (CMOS) type image sensor, and includes color filters (not shown). The color filters include a G filter corresponding to green (G), an R filter corresponding to red (R), and a B filter corresponding to blue (B) which both contribute to the obtainment of a brightness signal. The imaging element 60 includes an imaging pixel group 60A including a plurality of imaging pixels 60A1 arranged in a matrix. Any one filter of the R filter, the G filter, and the B filter included in the color filters is allocated to each of the imaging pixels 60A1, and the imaging pixel group 60A receives the subject light to image the subject.

That is, the subject light having passed through the zoom lens 52 is imaged on an imaging surface 60B which is the light receiving surface of the imaging element 60, and charge based on the amount of subject light received is accumulated in the imaging pixels 60A1. The imaging element 60 outputs the charge accumulated in the imaging pixels 60A1 as an image signal indicating an image equivalent to a subject image which is obtained by imaging the subject light on the imaging surface 60B.

The main control unit 62 controls the entire distance measurement device 10A through the bus line 84.

The motor driver 72 is connected to the motor 56 through the mounts 42 and 44, and controls the motor 56 in accordance with an instruction of the main control unit 62. The motor driver 73 is connected to the motor 57 through the mounts 42 and 44, and controls the motor 57 in accordance with an instruction of the main control unit 62.

The imaging device 14 has a viewing angle changing function. The viewing angle changing function is a function of changing an angle of view by moving the zoom lens 52, and is realized by the zoom lens 52, the zoom lens moving mechanism 54, the motor 56, the motor driver 72, and the main control unit 62 in this embodiment. Meanwhile, in this embodiment, an optical viewing angle changing function of the zoom lens 52 is described. However, the technique of this disclosure is not limited thereto, an electronic viewing angle changing function not using the zoom lens 52 may be used.

The imaging element driver 74 is connected to the imaging element 60, and provides a driving pulse to the imaging element 60 under the control of the main control unit 62. The imaging pixels 60A1 included in the imaging pixel group 60A are driven in accordance with the driving pulse supplied to the imaging element 60 by the imaging element driver 74.

The image signal processing circuit 76 is connected to the imaging element 60, and reads out an image signal for one frame from the imaging element 60 for each imaging pixel 60A1 under the control of the main control unit 62. The image signal processing circuit 76 performs various processing, such as correlative double sampling processing, automatic gain control, and A/D conversion, on the read-out image signal. The image signal processing circuit 76 outputs an image signal, which is digitalized by performing various processing on the image signal, to the image memory 64 for each frame at a specific frame rate (for example, several tens of frames per second) which is specified by a clock signal supplied from the main control unit 62. The image memory 64 temporarily holds the image signal which is input from the image signal processing circuit 76.

The motor driver 29 is connected to the motor 21 through the hot shoe 19 and the connector 25, and controls the motor 21 in accordance with an instruction of the main control unit 62. The motor driver 31 is connected to the motor 23 through the hot shoe 19 and the connector 25, and controls the motor 23 in accordance with an instruction of the main control unit 62. Power generated by the motor 21 is transmitted to the horizontal rotation mechanism 17, and power generated by the motor 23 is transmitted to the vertical rotation mechanism 15.

The imaging device main body 18 includes a display unit 86 which is an example of a first display unit and a second display unit according to the technique of this disclosure, a touch panel 88, a reception device 90, and a memory card 92.

The display unit 86 is connected to the display control unit 78, and displays various information under the control of the display control unit 78. The display unit 86 is realized by, for example, a Liquid Crystal Display (LCD).

The touch panel 88 which is an example of a reception unit according to the technique of this disclosure is superimposed on a display screen of the display unit 86, and receives a touch of a user's finger or an indicator such as a touch pen. The touch panel 88 is connected to the touch panel I/F 79, and outputs positional information indicating a position touched by the indicator to the touch panel I/F 79. The touch panel I/F 79 operates the touch panel 88 in accordance with an instruction of the main control unit 62, and outputs the positional information, which is input from the touch panel 88, to the main control unit 62. Meanwhile, in this embodiment, the touch panel 88 is described, but the invention is not limited thereto. A mouse (not shown) used by being connected to the distance measurement device 10A may be applied instead of the touch panel 88, or the touch panel 88 and the mouse may be used in combination.

The reception device 90 includes an imaging measurement button 90A, an imaging button (not shown), an imaging system operation mode switching button 90B, a wide angle instruction button 90C, a telephoto instruction button 90D, a panoramic imaging measurement button 90E, and a dimension derivation button 90F. In addition, the reception device 90 also includes a rotary switch for vertical rotation 90G, a rotary switch for horizontal rotation 90H, and the like, and receives the user's various instructions. The reception device 90 is connected to the reception I/F 80, and the reception I/F 80 outputs an instruction content signal indicating contents of an instruction received by the reception device 90 to the main control unit 62.

The imaging measurement button 90A is a pressing type button that receives an instruction for starting imaging and measurement. The imaging button is a pressing type button that receives an instruction for starting imaging. The imaging system operation mode switching button 90B is a pressing type button that receives an instruction for switching between a still image imaging mode and a movie imaging mode.

The wide angle instruction button 90C is a pressing type button that receives an instruction for setting an angle of view to be a wide angle, and the amount of change of the angle of view to the wide angle side is determined depending on a pressing time for which the pressing of the wide angle instruction button 90C is continuously performed within an allowable range.

The telephoto instruction button 90D is a pressing type button that receives an instruction for setting an angle of view to be at a telephoto side, the amount of change of the angle of view to the telephoto side is determined depending on a pressing time for which the pressing of the telephoto instruction button 90D is continuously performed within an allowable range.

The panoramic imaging measurement button 90E is a pressing type button that receives an instruction for starting a panoramic imaging measurement process to be described later. The dimension derivation button 90F is a pressing type button that receives an instruction for starting a dimension derivation process to be described later. The rotary switch for vertical rotation 90G is a rotary type switch that receives an instruction for operating the vertical rotation mechanism 15 to change the position of an imaging range and an irradiation direction of a laser beam in the vertical direction when seen in a front view. The rotary switch for horizontal rotation 90H is a rotary type switch that receives an instruction for operating the horizontal rotation mechanism 17 to change the position of an imaging range and an irradiation direction of a laser beam in the lateral direction when seen in a front view.

Meanwhile, hereinafter, for convenience of description, the rotary switch for vertical rotation 90G and the rotary switch for horizontal rotation 90H will be referred to as a "rotary switch" without a reference numeral in a case where it is not necessary to give a description by distinguishing between the switches.

In addition, hereinafter, for convenience of description, the imaging measurement button 90A and the imaging button will be referred to as a "release button" without a reference numeral in a case where it is not necessary to give a description by distinguishing between the buttons. In addition, hereinafter, for convenience of description, the wide angle instruction button 90C and the telephoto instruction button 90D will be referred to as a "view angle instruction button" without a reference numeral in a case where it is not necessary to give a description by distinguishing between the buttons.

Meanwhile, in the distance measurement device 10A according to this embodiment, a manual focus mode and an autofocus mode are selectively set in accordance with the user's instruction through the reception device 90. The release button receives two-stage pressing operations of an imaging preparation instruction state and an imaging instruction state. The imaging preparation instruction state refers to, for example, a state where the release button is pressed to an intermediate position (half pressing position) from a waiting position, and the imaging instruction state refers to a state where the release button is pressed to a final pressing position (full pressing position) beyond the intermediate position. Meanwhile, hereinafter, for convenience of description, the "state where the release button is pressed to the half pressing position from the waiting position" will be referred to as a "half pressing state", and the "state where the release button is pressed to the full pressing position from the waiting position" will be referred to as a "full pressing state".

In the autofocus mode, the adjustment of imaging conditions is performed by the release button being set to be in a half pressing state. Thereafter, when the release button is subsequently set to be in a full pressing state, the actual exposure is performed. That is, after exposure adjustment is performed by the operation of an Automatic Exposure (AE) function by the release button being set to be in a half pressing state prior to the actual exposure, focus adjustment is performed by the operation of an Auto-Focus (AF) function, and the actual exposure is performed when the release button is set to be in a full pressing state.

Here, the actual exposure refers to exposure performed to obtain a still image file to be described later. In this embodiment, the exposure means exposure performed to obtain a live view image to be described later and exposure performed to obtain a moving image file to be described later, in addition to the actual exposure. Hereinafter, for convenience of description, the exposures will be simply referred to as "exposure" in a case where it is not necessary to give a description by distinguishing between the exposures.

Meanwhile, in this embodiment, the main control unit 62 performs exposure adjustment based on an AE function and focus adjustment based on an AF function. In this embodiment, a case where the exposure adjustment and the focus adjustment are performed is described. However, the technique of this disclosure is not limited thereto, and the exposure adjustment or the focus adjustment may be performed.

The image processing unit 66 acquires an image signal for each frame from the image memory 64 at a specific frame rate, and performs various processing, such as gamma correction, brightness color difference conversion, and compression processing, on the acquired image signal.

The image processing unit 66 outputs the image signal, which is obtained by performing various processing, to the display control unit 78 for each frame at a specific frame rate. In addition, the image processing unit 66 outputs the image signal, which is obtained by performing various processing, to the main control unit 62 in accordance with a request of the main control unit 62.

The display control unit 78 outputs the image signal, which is input from the image processing unit 66, to the display unit 86 for each frame at a specific frame rate under the control of the main control unit 62.

The display unit 86 displays an image, character information, and the like. The display unit 86 displays an image shown by the image signal, which is input from the display control unit 78 at a specific frame rate, as a live view image. The live view image is a consecutive frame image which is obtained by consecutive imaging, and is also referred to as a through-image. In addition, the display unit 86 also displays a still image which is a single frame image obtained by performing imaging using a single frame. Further, the display unit 86 also displays a reproduced image, a menu screen, and the like, in addition to the live view image.

Meanwhile, in this embodiment, the image processing unit 66 and the display control unit 78 are realized by an Application Specific Integrated Circuit (ASIC), but the technique of this disclosure is not limited thereto. For example, each of the image processing unit 66 and the display control unit 78 may be realized by a Field-Programmable Gate Array (FPGA). In addition, the image processing unit 66 may be realized by a computer including a Central Processing Unit (CPU), a Read Only Memory (ROM), and a Random Access Memory (RAM). In addition, the display control unit 78 may also be realized by a computer including a CPU, a ROM, and a RAM. Further, each of the image processing unit 66 and the display control unit 78 may be realized by a combination of a hardware configuration and a software configuration.

The main control unit 62 controls the imaging element driver 74 to cause the imaging element 60 to perform exposure for each frame in a case where an instruction for capturing a still image is received by the release button under a still image imaging mode. The main control unit 62 acquires an image signal, which is obtained by performing the exposure for each frame, from the image processing unit 66 and performs compression processing on the acquired image signal to generate a still image file having a specific still image format. Meanwhile, here, the specific still image format refers to, for example, Joint Photographic Experts Group (JPEG).

The main control unit 62 acquires an image signal, which is output to the display control unit 78 as a signal for a live view image by the image processing unit 66, for each frame at a specific frame rate in a case where an instruction for capturing a moving image is received by the release button under a movie imaging mode. The main control unit 62 performs compression processing on the image signal acquired from the image processing unit 66 to generate a moving image file having a specific moving image format. Meanwhile, here, the specific moving image format refers to, for example, Moving Picture Experts Group (MPEG). In addition, hereinafter, for convenience of description, the still image file and the moving image file will be referred to as an image file in a case where it is not necessary to give a description by distinguishing between the image files.

The media I/F 82 is connected to the memory card 92, and performs the recording and read-out of the image file on the memory card 92 under the control of the main control unit 62. Meanwhile, the image file which is read out from the memory card 92 by the media I/F 82 is subjected to extension processing by the main control unit 62 to be displayed on the display unit 86 as a reproduced image.

Meanwhile, the main control unit 62 stores distance information, which is input from the distance measurement control unit 68, in the memory card 92 through the media I/F 82 in association with the image file. The distance information is read out together with the image file by the main control unit 62 from the memory card 92 through the media I/F 82, and a distance indicated by the read-out distance information is displayed on the display unit 86 together with the reproduced image based on the associated image file.

The distance measurement control unit 68 controls the distance measurement unit 12 under the control of the main control unit 62. Meanwhile, in this embodiment, the distance measurement control unit 68 is realized by an ASIC, but the technique of this disclosure is not limited thereto. For example, the distance measurement control unit 68 may be realized by a FPGA. In addition, the distance measurement control unit 68 may be realized by a computer including a CPU, a ROM, and a RAM. Further, the distance measurement control unit 68 may be realized by a combination of a hardware configuration and a software configuration.

The hot shoe 20 is connected to the bus line 84, and the distance measurement control unit 68 controls the LD driver 34 to control the emission of a laser beam by the LD 30 under the control of the main control unit 62 and acquires a light receiving signal from the light receiving signal processing circuit 40. The distance measurement control unit 68 derives a distance to the subject on the basis of a timing when the laser beam is emitted and a timing when the light receiving signal is acquired, and outputs distance information indicating the derived distance to the main control unit 62.

Here, the measurement of a distance to the subject by the distance measurement control unit 68 will be described in more detail.

Figure 6:
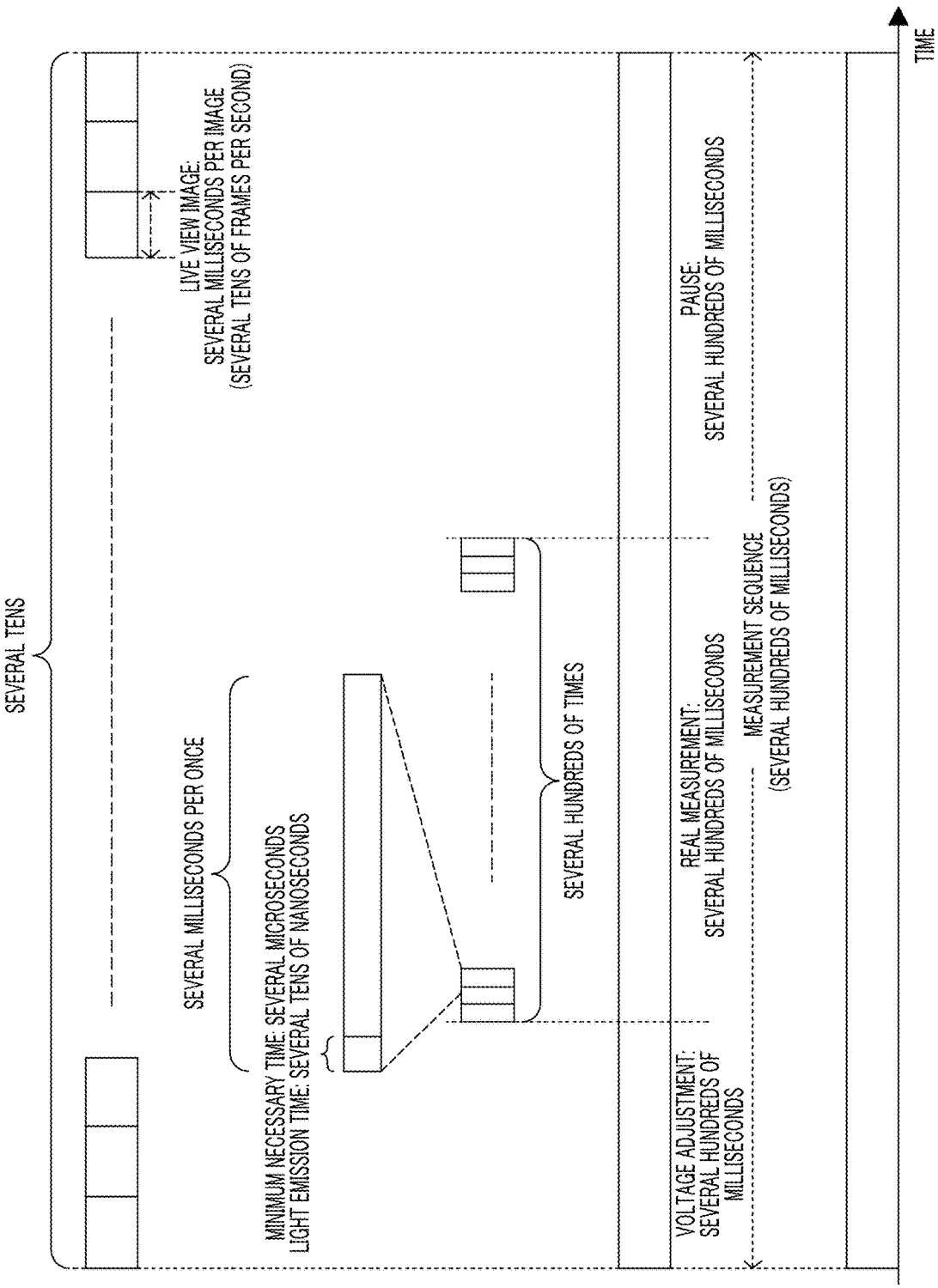
FIG. 6 is a time chart illustrating an example of a measurement sequence based on the distance measurement device according to the first to third embodiments.

As illustrated in FIG. 6 as an example, one measurement sequence by the distance measurement device 10A is specified by a voltage adjustment period, a real measurement period, and a pause period.

The voltage adjustment period is a period in which driving voltages of the LD 30 and the PD 36 are adjusted. The real measurement period is a period in which a distance to the subject is actually measured. In the real measurement period, an operation of causing the LD 30 to emit a laser beam and causing the PD 36 to receive the reflected laser beam is repeated several hundred times, and a distance to the subject is derived on the basis of a timing when the laser beam is emitted and a timing when the light receiving signal is acquired. The pause period is a period for stopping the driving of the LD 30 and the PD 36. Accordingly, in one measurement sequence, the measurement of a distance to the subject is performed several hundred times.

Meanwhile, in this embodiment, each of the voltage adjustment period, the real measurement period, and the pause period is set to be several hundred milliseconds.

Figure 7:
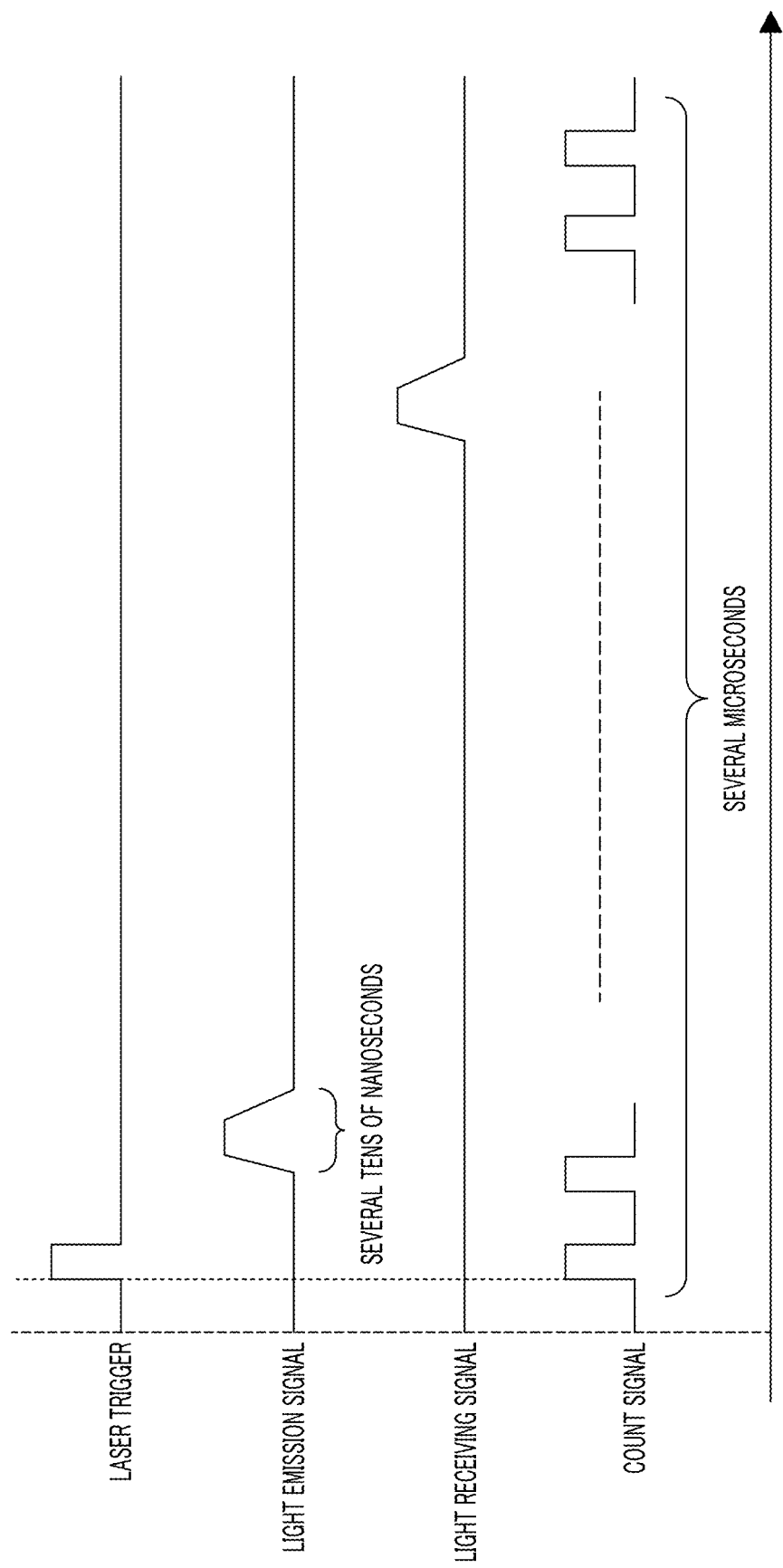
FIG. 7 is a time chart illustrating examples of a laser trigger, a light emission signal, a light receiving signal, and a count signal which are required in a case where measurement is performed once by the distance measurement device according to the first to third embodiments.

As illustrated in FIG. 7 as an example, a count signal for specifying a timing when the distance measurement control unit 68 gives an instruction for emitting a laser beam and a timing when a light receiving signal is acquired is provided to the distance measurement control unit 68. In this embodiment, the count signal is generated by the main control unit 62 and is supplied to the distance measurement control unit 68. However, the invention is not limited thereto, and the control signal may be generated by a dedicated circuit, such as a time counter, which is connected to the bus line 84, and may be supplied to the distance measurement control unit 68.

The distance measurement control unit 68 outputs a laser trigger for emitting a laser beam to the LD driver 34 in accordance with the count signal. The LD driver 34 drives the LD 30 to emit a laser beam in accordance with the laser trigger.

In the example illustrated in FIG. 7, a light emission time of a laser beam is set to be several tens of nanoseconds. In this case, a time until the laser beam, which is emitted toward a subject positioned several kilometers ahead by the emitting unit 22, is received by the PD 36 as a reflected laser beam is set to be "several kilometers×2/speed of light"≈several microseconds. Therefore, as illustrated in FIG. 6 as an example, a time of several microseconds is required as a minimum necessary time in order to measure a distance to the subject positioned several kilometers ahead.

Meanwhile, in this embodiment, as illustrated in FIG. 6 as an example, one measurement time is set to be several milliseconds in consideration of a reciprocating time of the laser beam, and the like. However, the reciprocating time of the laser beam varies depending on a distance to the subject, and thus one measurement time may vary in accordance with an assumed distance.

In a case where a distance to the subject is derived on the basis of measured values obtained from several hundred times of measurement in one measurement sequence, the distance measurement control unit 68 analyzes, for example, a histogram of the measured values obtained from several hundred times of measurement to derive a distance to the subject.

Figure 8:
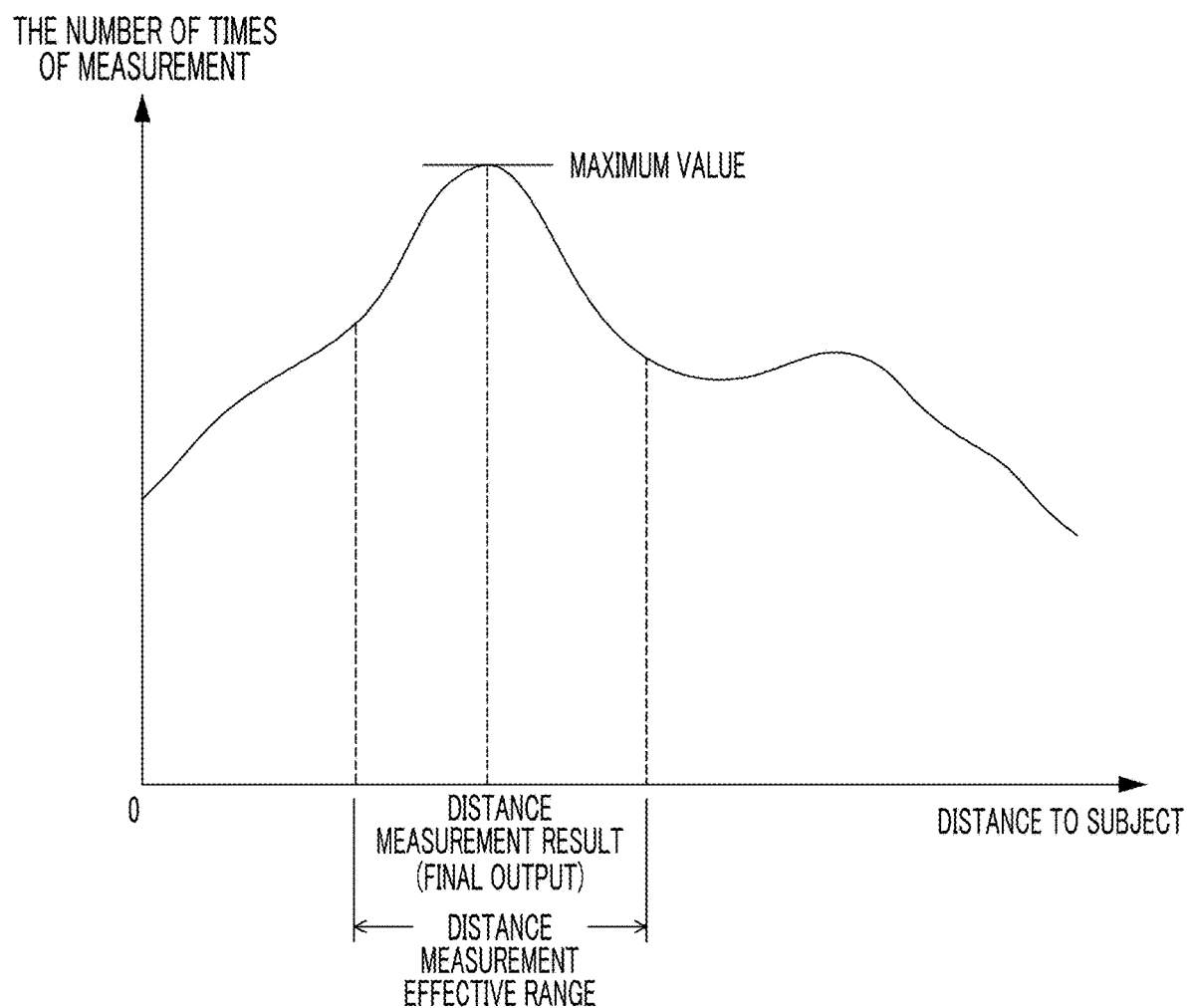
FIG. 8 is a graph illustrating an example of a histogram (a histogram in a case where a distance (measured value) to a subject is represented by a lateral axis and the number of times of measurement is represented by a vertical axis) of measured values obtained in a measurement sequence based on the distance measurement device according to the first to third embodiments.

As illustrated in FIG. 8 as an example, in a histogram of measured values obtained from several hundred times of measurement in one measurement sequence, the lateral axis represents a distance to a subject, the vertical axis represents the number of times of measurement, and a distance corresponding to a maximum value of the number of times of measurement is derived by the distance measurement control unit 68 as a distance measurement result. Meanwhile, the histogram illustrated in FIG. 8 is just an example, and a histogram may be generated on the basis of a reciprocating time (an elapsed time from the emission of light to the reception of light) of a laser beam, half of the reciprocating time of the laser beam, or the like, instead of the distance to the subject.

Figure 9:
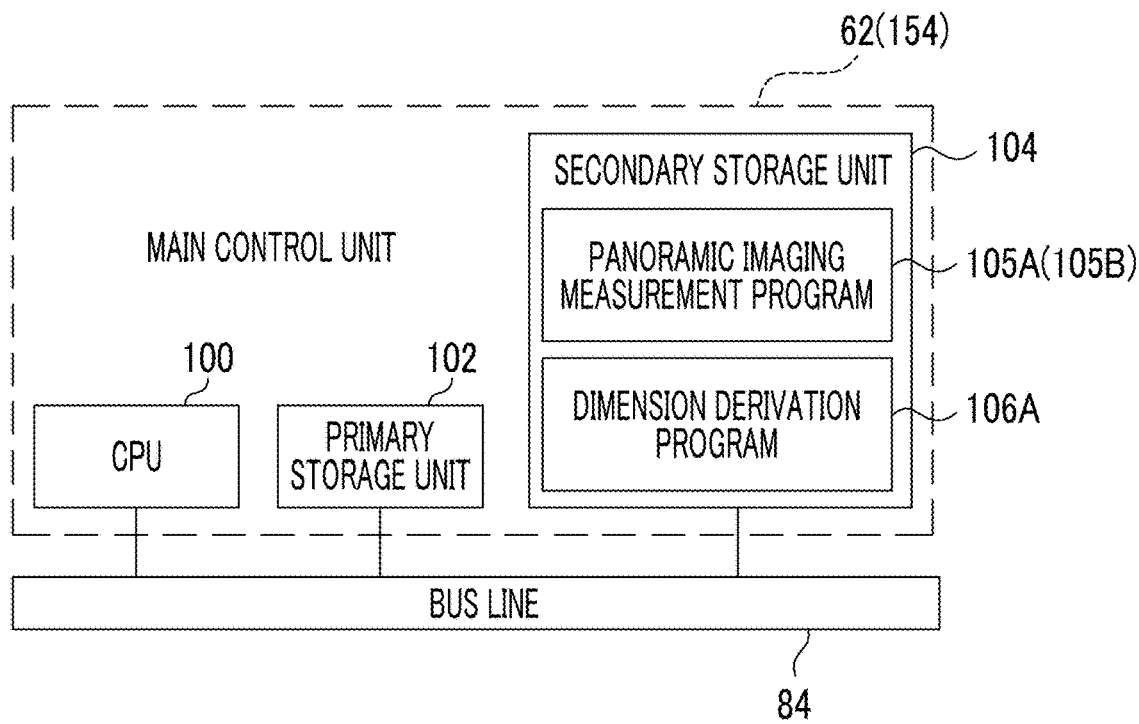
FIG. 9 is a block diagram illustrating an example of a hardware configuration of a main control unit included in the distance measurement device according to the first and second embodiments.

As illustrated in FIG. 9 as an example, the main control unit 62 includes a CPU 100, a primary storage unit 102, and a secondary storage unit 104 which are examples of an acquisition unit and an execution unit according to the technique of this disclosure. The CPU 100 controls the entire distance measurement device 10A. The primary storage unit 102 is a volatile memory which is used as a work area during the execution of various programs, and the like. An example of the primary storage unit 102 is a RAM. The secondary storage unit 104 is a non-volatile memory that stores control programs, various parameters, or the like for controlling the operation of the distance measurement device 10A in advance. An example of the secondary storage unit 104 is an Electrically Erasable Programmable Read Only Memory (EEPROM), a flash memory, or the like. The CPU 100, the primary storage unit 102, and the secondary storage unit 104 are connected to each other through the bus line 84.

In the distance measurement device 10A, the secondary storage unit 104 stores a panoramic imaging measurement program 105A and a dimension derivation program 106A, as illustrated in FIG. 9 as an example. Meanwhile, the panoramic imaging measurement program 105A is an example of a program according to the technique of this disclosure.

The CPU 100 reads out the panoramic imaging measurement program 105A from the secondary storage unit 104, and develops the read-out panoramic imaging measurement program 105A to the primary storage unit 102. The CPU 100 executes the panoramic imaging measurement program 105A which is developed to the primary storage unit 102.

Figure 10:
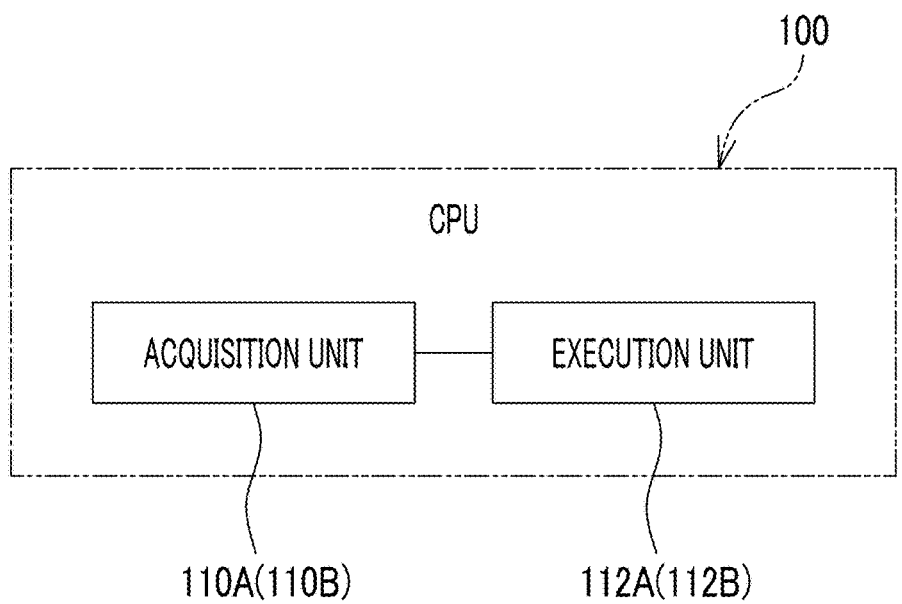
FIG. 10 is a block diagram illustrating an example of a main function of a CPU according to the first and second embodiments.

The CPU 100 executes the panoramic imaging measurement program 105A to operate as an acquisition unit 110A and an execution unit 112A, as illustrated in FIG. 10 as an example.

The acquisition unit 110A acquires measurement success/failure information in a case where a measurement process is executed by operating a distance measurement system function with a subject, which is within a specific imaging range among a plurality of imaging ranges and is to be imaged in panoramic imaging of the subject, as a measurement target. Here, the measurement process refers to a process of causing the distance measurement unit 12 and the distance measurement control unit 68 to measure a distance to the subject. In addition, the measurement success/failure information refers to information indicating whether or not the distance measurement unit 12 and the distance measurement control unit 68 have succeeded in measuring the distance to the subject. In addition, the specific imaging range refers to an imaging range 115 which is determined as an imaging range 115 including the subject to be measured by operating the distance measurement system function during the panoramic imaging.

Meanwhile, in the first embodiment, the position of the specific imaging range is changed by operating the change mechanism 11 under the control of the main control unit 62. However, the technique of this disclosure is not limited thereto, and the position of the specific imaging range may be changed manually by the user.

Meanwhile, hereinafter, for convenience of description, the distance measurement unit 12 and the distance measurement control unit 68 will also be referred to as a "measurement unit" without a reference numeral. In addition, hereinafter, for convenience of description, the measurement of a distance to a subject by the measurement unit will also be simply referred to as "measurement by the measurement unit".

The execution unit 112A executes a measurement suppressing process of suppressing the measurement by the measurement unit performed on subjects within a plurality of imaging ranges, in a case where the measurement success/failure information acquired by the acquisition unit 110A indicates that the measurement by the measurement unit has been successful.

In addition, the CPU 100 reads out the dimension derivation program 106A from the secondary storage unit 104, and develops the read-out dimension derivation program 106A to the primary storage unit 102. The CPU 100 executes the dimension derivation program 106A which is developed to the primary storage unit 102.

The distance measurement device 10A has a dimension derivation function, and the dimension derivation function is a function which is realized by executing the dimension derivation program 106A by the CPU 100.

Figure 11:
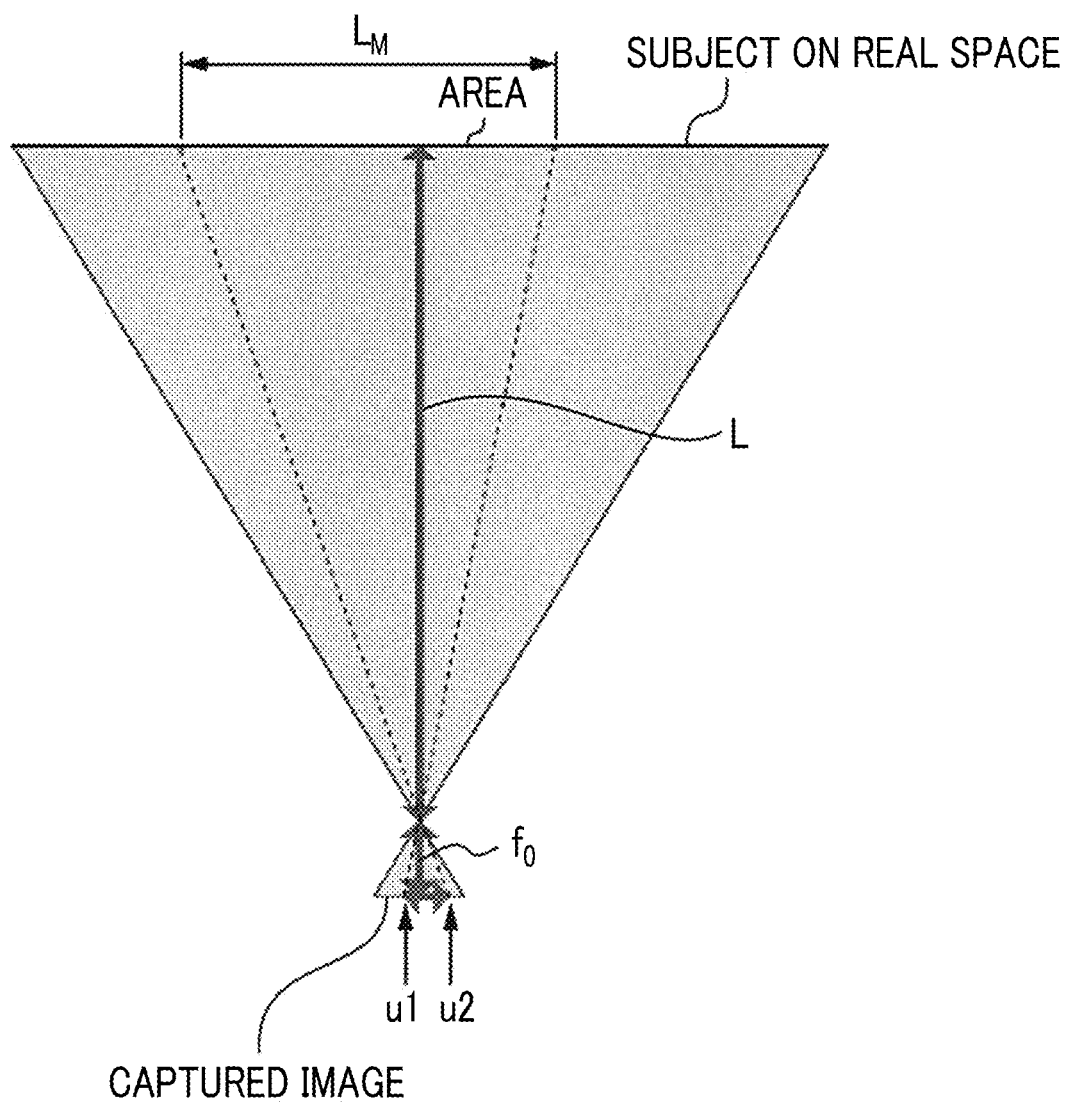
FIG. 11 is a diagram illustrating a method of measuring a dimension (length) of a designated area.

The dimension derivation function refers to a function of deriving a length $L_M$ of an area on the real space which is included in a subject or deriving a size based on the length $L_M$, on the basis of addresses u1 and u2 of a designated pixel and a distance L to the subject measured by the measurement unit, as illustrated in FIG. 11 as an example.

Here, the distance L to the subject refers to an actually measured distance. Meanwhile, hereinafter, for convenience of description, the distance L to the subject will be simply referred to as a "distance L". In addition, hereinafter, for convenience of description, the length $L_M$ of the area on the real space which is included in the subject will be simply referred to as a "length $L_M$". In addition, the "designated pixel" refers to, for example, a pixel in the imaging element 60 which corresponds to two points designated by the user on a captured image.

The length $L_M$ is calculated by, for example, the following Expression (1). In Expression (1), p denotes a pitch between pixels included in the imaging element 60, u1 and u2 denote an address designated by the user, and $f_0$ denotes a focal length.

$$L_M = L \times \left\{ \frac{p(u1 - u2)}{f_0} \right\} \tag{1}$$

Expression (1) is a numerical expression which is used on the assumption that an object to be subjected to dimension derivation is imaged in a state where the object faces the focusing lens 50 when seen in a front view. Therefore, a projection conversion process is performed by the distance measurement device 10A, for example, in a case where the subject including the object to be subjected to dimension derivation is imaged in a state where the object does not face the focusing lens 50 when seen in a front view. The projection conversion process refers to a process of converting, for example, a captured image obtained by imaging into an image equivalent to a facing image on the basis of a quadrangular image included in the captured image, by using a known technique such as affine transformation. The facing image refers to an image in a state of facing the focusing lens 50 when seen in a front view. The addresses u1 and u2 of the pixel in the imaging element 60 are designated through the facing image, and the length $L_M$ is derived by Expression (1).

Next, operations of portions of the distance measurement device 10A according to the technique of this disclosure will be described.

First, reference will be made to FIGS. 12 to 15 to describe a panoramic imaging measurement process realized by executing the panoramic imaging measurement program 105A by the CPU 100 in a case where the long pressing of the panoramic imaging measurement button 90E is performed.

Meanwhile, the "long pressing" mentioned above refers to an operation of continuously turning on a button such as the panoramic imaging measurement button 90E included in the reception device 90 for a predetermined time (for example, for three seconds) or longer. Here, the operation of turning on the button is roughly classified into "long pressing" and "normal pressing". The "normal pressing" refers to an operation of turning on the button within a range less than the above-mentioned predetermined time.

Figure 16:
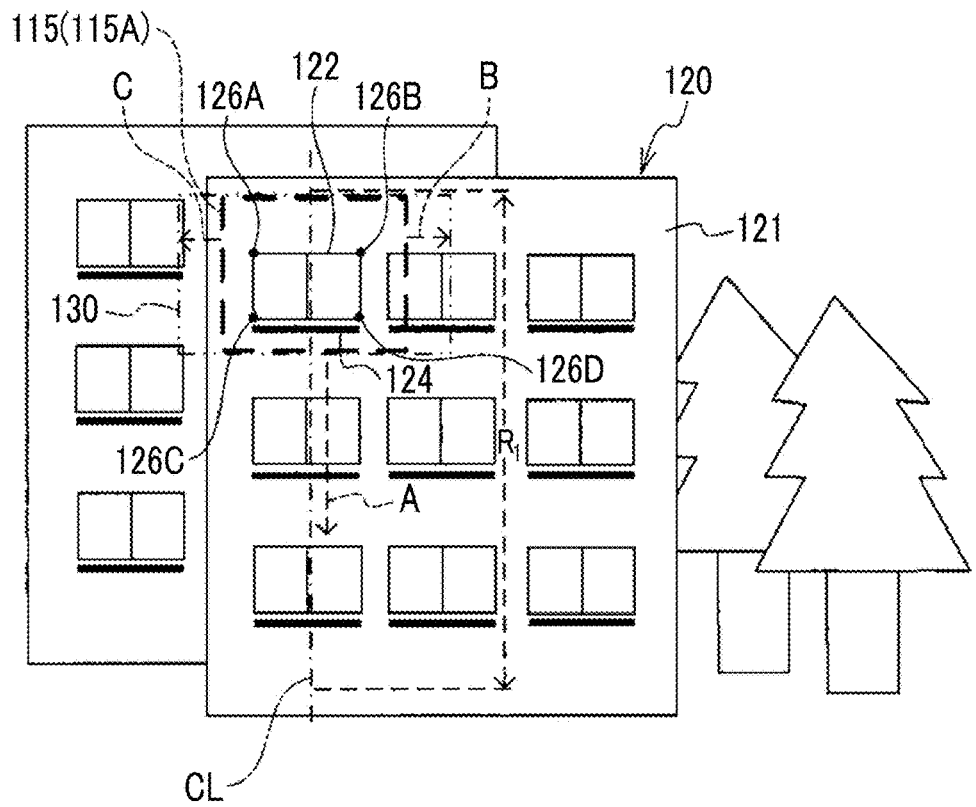
FIG. 16 is a conceptual diagram illustrating examples of an imaging range and an allowable range serving as a first imaging target in panoramic imaging.

In addition, hereinafter, for convenience of description, a description will be given on the assumption that an outer wall surface 121 of an office building 120 is a subject in panoramic imaging and is an object to be irradiated with a laser beam, as illustrated in FIG. 16 as an example.

In addition, the outer wall surface 121 is formed to have a planar shape, and is an example of a planar region according to the technique of this disclosure. In addition, a plurality of quadrangular windows 122 are provided on the outer wall surface 121, as illustrated in FIG. 16 as an example. In addition, a rectangular pattern 124 which is laterally long is drawn on the lower side of each window 122 on the outer wall surface 121, as illustrated in FIG. 16 as an example. However, the invention is not limited thereto, and dirt on the outer wall surface 121, a crack, or the like may be adopted.

Meanwhile, in this embodiment, the "planar shape" not only includes a plane, but also includes a planar shape in a range allowing slight irregularities generated due to a window, a ventilating opening, or the like. The planar shape may be a plane or a planar shape which is recognized as a "planar shape", for example, by visual observation or the existing image analysis technique.

In addition, hereinafter, for convenience of description, a description will be given on the assumption that a distance to the outer wall surface 121 is measured by the distance measurement device 10A by irradiating the outer wall surface 121 with a laser beam.

In addition, hereinafter, for convenience of description, a description will be given on the assumption that a live view image is displayed on the display unit 86.

In addition, hereinafter, for convenience of description, a description will be given on the assumption that panoramic imaging is performed while changing the position of the imaging range 115 in a direction of an arrow A along a center line CL passing through the center of the imaging range 115, which is in the lateral direction when seen in a front view, in the vertical direction when seen in a front view, as illustrated in FIG. 16 as an example.

In addition, hereinafter, for convenience of description, a description will be given on the assumption that the position of the imaging range 115 is changed from above to below when seen in a front view within a range $R_1$ along the center line CL, as illustrated in FIG. 16 as an example.

Meanwhile, the range $R_1$ is decided, for example, at a stage before the execution of the panoramic imaging measurement process is executed. The decision of the range $R_1$ is realized, for example, under a range decision mode which is an operation mode for deciding the range $R_1$. The distance measurement device 10A transitions to a range decision mode in a case where the normal pressing of the panoramic imaging measurement button 90E is performed by the user. In a case where the distance measurement device 10A transitions to the range decision mode, a guide screen (not shown) which is a screen for guiding the procedure of operations until the decision of the range $R_1$ is completed is displayed in a partial region of the display unit 86 until the decision of the range $R_1$ is completed, and the user performs a necessary operation while viewing the guide screen.

Under the range decision mode, the range $R_1$ is decided by setting the position of the first imaging range 115 and the position of the last imaging range 115 in accordance with the user's operation with respect to the rotary switch and an instruction received through the touch panel 88. Here, the first imaging range 115 refers to an imaging range 115 serving as the first imaging target in the panoramic imaging. In addition, the last imaging range 115 refers to an imaging range 115 serving as the last imaging target in the panoramic imaging.

In a case where the display of the above-mentioned guide screen is started under the range decision mode, first, the user operates the change mechanism 11 by operating the rotary switch to make the position of the imaging range 115 reach the user's desired position as the position of the first imaging range 115. In a case where a special operation is received by the touch panel 88 in a state where the position of the imaging range 115 is maintained at the user's desired position, the position of the present imaging range 115 is set as the position of the first imaging range 115. The special operation refers to, for example, a double-tap operation with respect to a specific region (for example, the center portion of the touch panel 88) of the touch panel 88. In addition, the present imaging range 115 refers to an imaging range 115 which is designated as an imaging target before the imaging and includes a subject capable of being imaged by the imaging device 14 at the present point in time.

Next, the user operates the change mechanism 11 by operating the rotary switch to make the position of the imaging range 115 reach the user's desired position as the position of the last imaging range 115. In a case where the above-mentioned special operation is received by the touch panel 88 in a state where the position of the imaging range 115 is maintained at the user's desired position, the position of the present imaging range 115 is set as the position of the last imaging range 115, and the display of the above-mentioned guide screen is terminated.

In this manner, in a case where the range $R_1$ is decided, the change mechanism 11 is operated under the control of the main control unit 62, so that the position of the imaging range 115 is returned to the position of the last imaging range 115, and the CPU 100 is set to be in a standby state of long pressing with respect to the panoramic imaging measurement button 90E. In a case where the long pressing of the panoramic imaging measurement button 90E is performed in this state, the panoramic imaging measurement process illustrated in FIGS. 12 to 15 is executed.

Meanwhile, in the first embodiment, the imaging range 115 serving as an imaging target for a still image in panoramic imaging within the range $R_1$ by executing the panoramic imaging measurement process is an example of a designated imaging range according to the technique of this disclosure. The designated imaging range according to the technique of this disclosure refers to an imaging range 115 which is designated as an imaging target before each imaging is performed, among a plurality of imaging ranges 115 serving as imaging targets in the panoramic imaging within the range $R_1$. In addition, here, each imaging refers to, for example, one imaging for a still image which is performed by executing the processing of step 260 to be described later.

Figure 17:
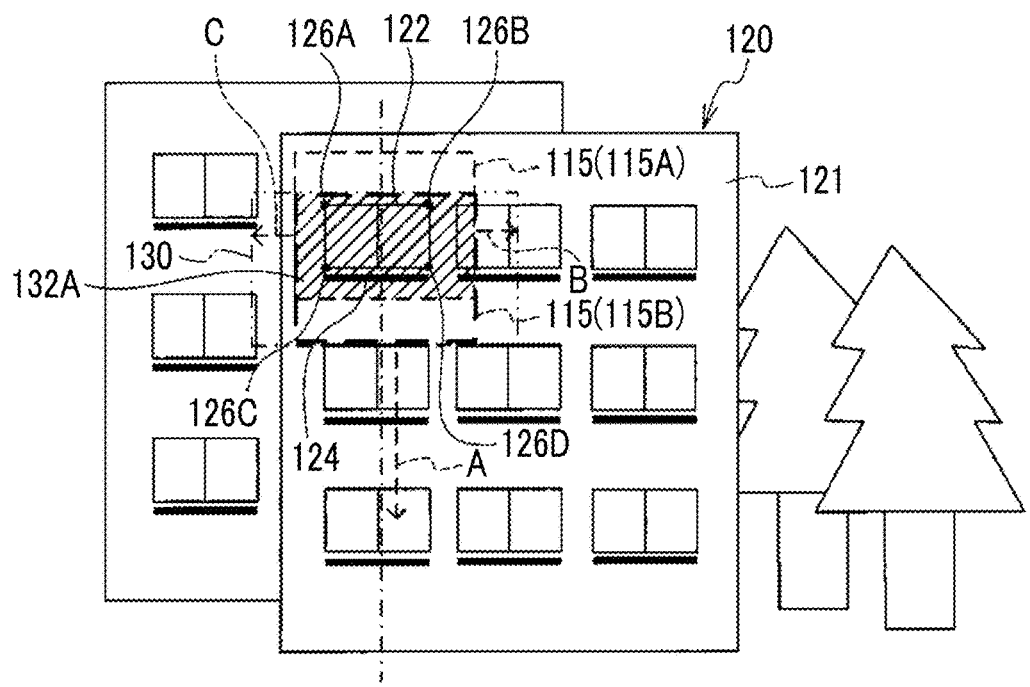
FIG. 17 is a conceptual diagram illustrating examples of an imaging range and an allowable range serving as a second imaging target in panoramic imaging.
Figure 18:
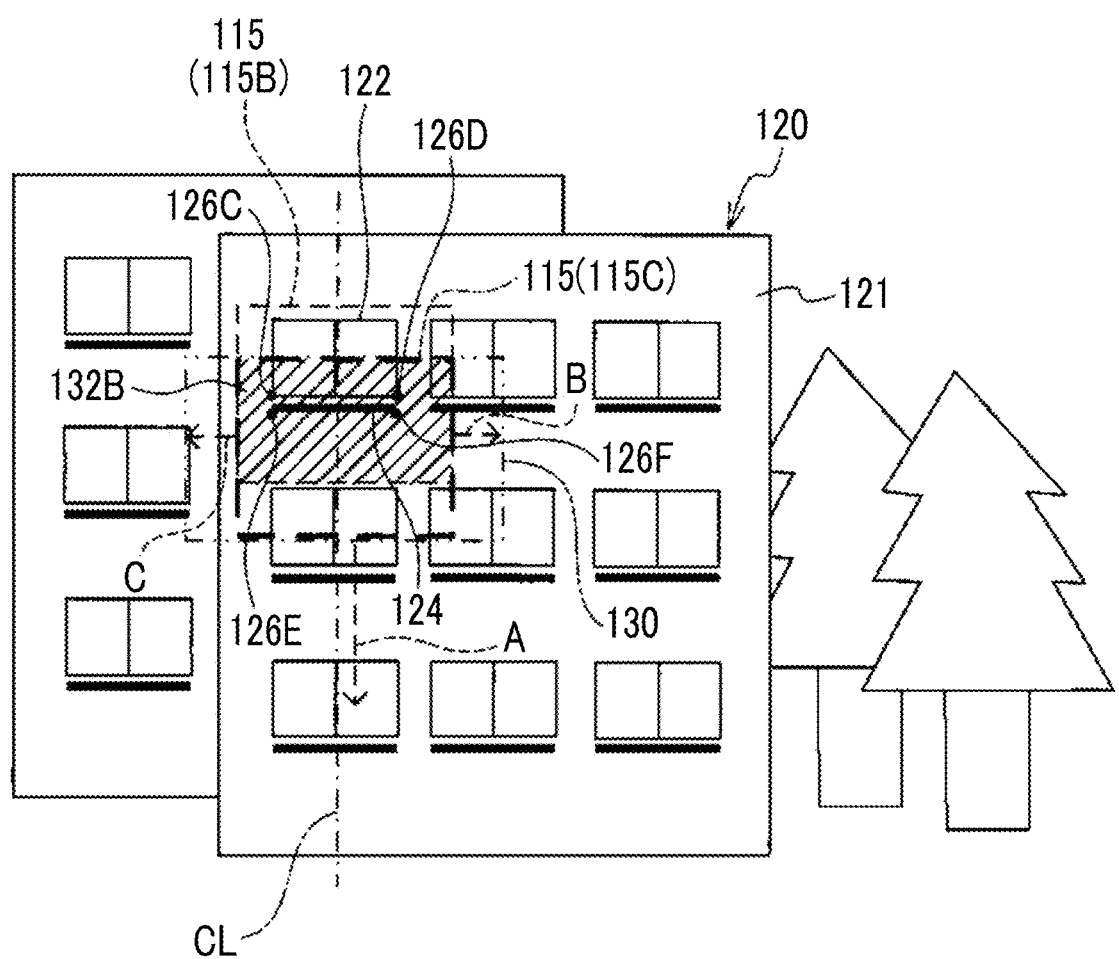
FIG. 18 is a conceptual diagram illustrating examples of an imaging range and an allowable range serving as a third imaging target in panoramic imaging.

In addition, hereinafter, for convenience of description, the first imaging range 115 will be referred to as an "imaging range 115A", as illustrated in FIG. 16 as an example. In addition, hereinafter, for convenience of description, an imaging range 115 serving as a second imaging target in the panoramic imaging will be referred to as an "imaging range 115B", as illustrated in FIG. 17 as an example. In addition, hereinafter, for convenience of description, an imaging range 115 serving as a third imaging target in the panoramic imaging will be referred to as an "imaging range 115C", as illustrated in FIG. 18 as an example.

Further, hereinafter, for convenience of description, a description will be given on the assumption that a captured image obtained by imaging a subject within at least one imaging range 115 among the plurality of imaging ranges 115 includes four pixels capable of specifying four apexes for defining a quadrangle.

Figure 12:
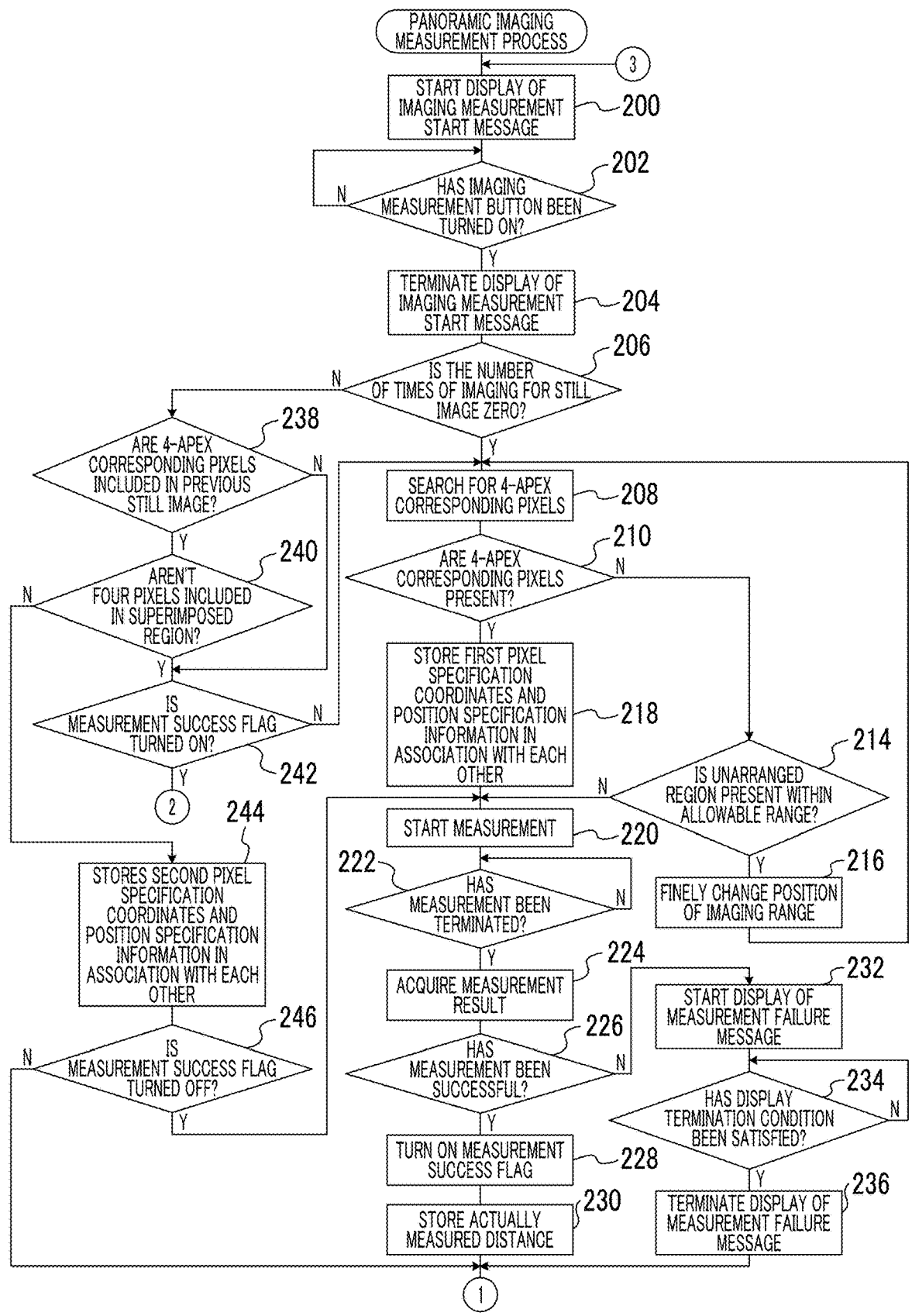
FIG. 12 is a flowchart illustrating an example of a flow of a panoramic imaging measurement process according to the first embodiment.
Figure 19:
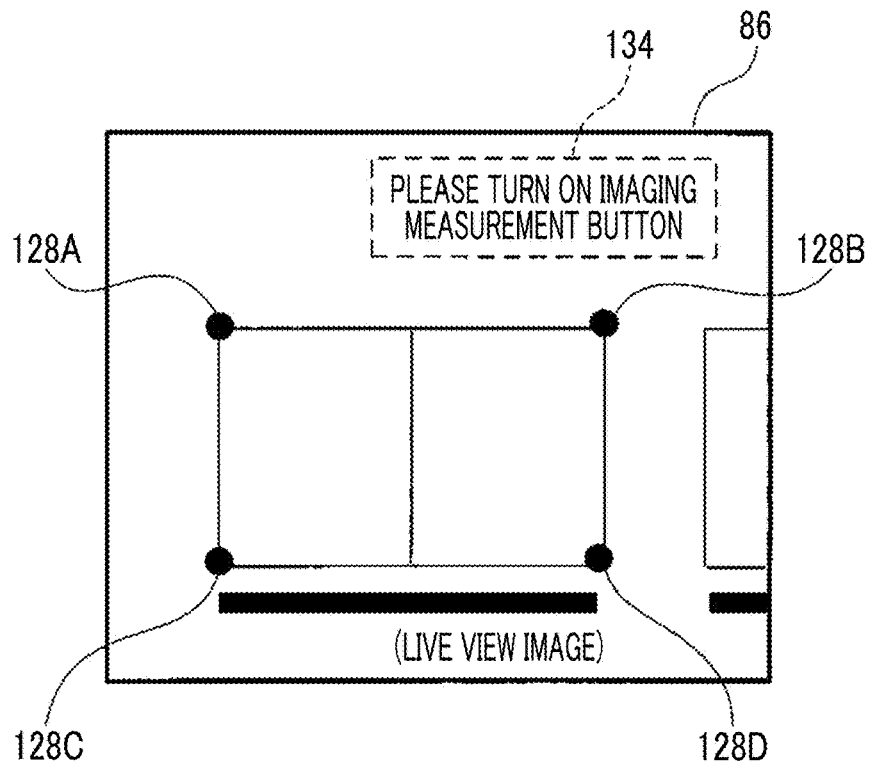
FIG. 19 is a schematic screen view illustrating an example of a screen on which a live view image showing a subject within the imaging range illustrated in FIG. 16 and an imaging measurement start message are displayed.

In the panoramic imaging measurement process illustrated in FIG. 12, first, the acquisition unit 110A starts the display of an imaging measurement start message 134 within a display region of a live view image on the display unit 86, as illustrated in FIG. 19 as an example, in step 200, and then the process proceeds to step 202. Here, a message of "please turn on imaging measurement button" is adopted as an example of the imaging measurement start message 134. However, this is just an example, and a message for prompting the user to give an instruction for starting imaging by the imaging device 14 and measurement by the measurement unit may be used.

In addition, the example illustrated in FIG. 19 shows a case where the imaging measurement start message 134 is visibly displayed, but audible display such as the output of a sound using a sound reproducing device (not shown) or permanent visible display such as the output of printed matter using a printer may be performed instead of the visible display or may be performed in combination.

In step 202, the acquisition unit 110A determines whether or not the imaging measurement button 90A has been turned on. In step 202, in a case where the imaging measurement button 90A has not been turned on, the determination result is negative, and the determination in step 202 is performed again. In step 202, in a case where the imaging measurement button 90A has been turned on, the determination result is positive, and the process proceeds to step 204.

Meanwhile, in the first embodiment, an operation of turning on the imaging measurement button 90A by the user is an example of a measurement start instruction according to the technique of this disclosure. In addition, the measurement start instruction refers to an instruction for causing the measurement unit to start the measurement of a distance to a subject.

In step 204, the acquisition unit 110A causes the display unit 86 to terminate the display of the imaging measurement start message 134, and then the process proceeds to step 206.

In step 206, the execution unit 112A determines whether or not the number of times of imaging for a still image after the execution of the panoramic imaging measurement process is started is zero. Whether or not imaging for a still image has been performed after the execution of the panoramic imaging measurement process is started is determined depending on whether or not the processing of step 260 to be described later has been executed.

In step 206, in a case where the number of times of imaging for a still image after the execution of the panoramic imaging measurement process is started is equal to or more than once, the determination result is negative, and the process proceeds to step 238. In step 206, in a case where the number of times of imaging for a still image after the execution of the panoramic imaging measurement process is started is zero, the determination result is positive, and the process proceeds to step 208.

In step 208, the execution unit 112A searches for 4-apex corresponding pixels which are an example of multi-apex pixels according to the technique of this disclosure, with a live view image showing the subject within the imaging range 115 as a target, and then the process proceeds to step 210.

The multi-apex pixels according to the technique of this disclosure refer to at least four or more pixels for defining apexes of a polygon among pixels included in a first captured image. The first captured image refers to a captured image obtained by imaging a subject within one imaging range 115 of which the imaging is performed first, out of adjacent imaging ranges. The adjacent imaging ranges refer to imaging ranges 115 adjacent to each other in the plurality of imaging ranges 115. Meanwhile, in the first embodiment, a 4-apex pixel is given as an example of multi-apex pixels. However, the technique of this disclosure is not limited thereto, and replacement with any pixels can be performed as long as the pixels are at least four or more pixels for defining the apexes of a polygon.

The 4-apex corresponding pixels refer to four pixels for defining four apexes of a quadrangle within the captured image. In the example illustrated in FIG. 16, the subject within the imaging range 115 includes real-space four apexes which are four apexes for defining the quadrangle, and the real-space four apexes correspond to 4-apex corresponding pixels. In the example illustrated in FIG. 16, apexes 126A, 126B, 126C, and 126D which are four apexes of an outer frame of the window 122 within the imaging range 115A correspond to the real-space four apexes.

On the other hand, in the example illustrated in FIG. 19, a live view image obtained by imaging the subject within the imaging range 115A is shown. In the example illustrated in FIG. 19, pixels 128A, 128B, 128C, and 128D which are four pixels respectively corresponding to the apexes 126A, 126B, 126C, and 126D, among pixels included in the live view image, correspond to 4-apex corresponding pixels.

In step 210, the execution unit 112A determines whether or not 4-apex corresponding pixels are present in the live view image showing the subject within the imaging range 115.

Meanwhile, in the example illustrated in FIG. 19, the pixels 128A, 128B, 128C, and 128D are present as 4-apex corresponding pixels in the live view image showing the subject within the imaging range 115A.

In the example illustrated in FIG. 17, the apexes 126A, 126B, 126C, and 126D are also included as real-space four apexes in the subject within the imaging range 115B. Therefore, the pixels 128A, 128B, 128C, and 128D are also present as 4-apex corresponding pixels in the live view image showing the subject within the imaging range 115B, similar to the example illustrated in FIG. 19.

Further, in the example illustrated in FIG. 18, apexes 126C, 126D, 126E, and 126F are included as real-space four apexes in the subject within the imaging range 115C. Therefore, in this case, 4-apex corresponding pixels corresponding to the apexes 126C, 126D, 126E, and 126F are present in the live view image showing the subject within the imaging range 115C.

In step 210, in a case where 4-apex corresponding pixels are present in the live view image showing the subject within the imaging range 115, the determination result is positive, and the process proceeds to step 218. In step 210, in a case where 4-apex corresponding pixels are not present in the live view image showing the subject within the imaging range 115, the determination result is negative, and the process proceeds to step 214.

In step 214, the execution unit 112A determines whether or not a non-arrangement region for the imaging range 115 is present within an allowable range.

Here, the non-arrangement region refers to a region in which the imaging range 115 has not yet been disposed within the allowable range. In addition, the allowable range refers to, for example, a range in which the imaging range 115 is enlarged in the lateral direction when seen in a front view with respect to the imaging range 115, and which is allowable as a range in which panoramic imaging can be performed.

In the example illustrated in FIG. 16, a range 130 corresponds to an allowable range. The range 130 is a range in which the imaging range 115 is enlarged by 1.5 times as an example in the lateral direction when seen in a front view with respect to the imaging range 115A.

In step 214, in a case where a non-arrangement region is present within the allowable range, the determination result is positive, and the process proceeds to step 216. In step 214, in a case where a non-arrangement region is not present within the allowable range, the determination result is negative. In a case where the determination result in step 214 is negative, the execution unit 112A stores position specification information in time series in a first storage region (not shown) of the primary storage unit 102, and then the process proceeds to step 220.

Here, the position specification information refers to information for specifying the position of the present imaging range 115. The position specification information is derived, for example, on the basis of rotation directions and the amounts of rotation of the vertical rotation mechanism 15 and the horizontal rotation mechanism 17. The rotation direction and the amount of rotation of the vertical rotation mechanism 15 are specified by, for example, the rotation direction and the amount of rotation of the motor 23, and the rotation direction and the amount of rotation of the horizontal rotation mechanism 17 are specified by, for example, the rotation direction and the amount of rotation of the motor 21.

In step 216, the execution unit 112A operates the change mechanism 11 with the non-arrangement region as a change destination to finely change the position of the imaging range 115 in a non-arrangement direction, and then the process proceeds to step 208.

Here, the non-arrangement direction refers to a direction in which the non-arrangement region is present. In the examples illustrated in FIGS. 16 to 18, a direction of an arrow B and a direction of an arrow C within the range 130 correspond to the non-arrangement direction.

In addition, the fine change refers to a change with a predetermined amount of change of the position of the imaging range 115 within the allowable range. The predetermined amount of change refers to, for example, the amount of change which is performed once and is derived so that the non-arrangement region disappears by several tens (for example, 20 times) of changes of the position of the imaging range 115 within the allowable range. Meanwhile, the "several tens of times" as mentioned herein may be a fixed number of times or may be the number of times which is changeable in accordance with the user's instruction.

In step 218, the execution unit 112A stores first pixel specification coordinates and position specification information in time series in the first storage region of the primary storage unit 102 in a state where the first pixel specification coordinates and the position specification information are associated with each other, and then the process proceeds to step 220. Meanwhile, here, the first pixel specification coordinates refer to coordinates for specifying the positions of the 4-apex corresponding pixels obtained by searching, among pixels within the live view image showing the subject within the present imaging range 115.

In step 220, the execution unit 112A causes the measurement unit to start the measurement of a distance to the subject by emitting a laser beam toward the subject within the present imaging range 115 which is an example of each of a specific imaging range and a designated imaging range according to the technique of this disclosure, and then the process proceeds to step 222.

In step 222, the execution unit 112A determines whether or not the measurement by the measurement unit has been terminated. Here, a case where the measurement by the measurement unit has been terminated is roughly classified into a case of a distance derivation success state and a case of a distance derivation failure state. The distance derivation success state refers to a state where the derivation of the distance to the subject has been successful, that is, a state where reflected light of the laser beam emitted from the emitting unit 22 has been received by the PD 36 of the light receiving unit 24 and the distance to the subject has been derived by the distance measurement control unit 68. The distance derivation failure state refers to a state where the reflected light of the laser beam emitted from the emitting unit 22 has not been received by the PD 36 of the light receiving unit 24 or the distance to the subject has not been derived by the distance measurement control unit 68 due to the amount of light received by the PD 36 which has not reach a predetermined amount of light received. Meanwhile, the predetermined amount of light received refers to the amount of light received which is obtained in advance as the amount of light received which is effective in deriving the distance to the subject, for example, by experiment using the real machine, computer simulation, or the like.

In step 222, in a case where the measurement by the measurement unit has not been terminated, the determination result is negative, and the determination in step 222 is performed again. In step 222, in a case where the measurement by the measurement unit has been terminated, the determination result is positive, and the process proceeds to step 224.

In step 224, the acquisition unit 110A acquires a measurement result of the measurement unit from the distance measurement control unit 68, and then the process proceeds to step 226. The measurement result is roughly classified into a measurement result in a case of the distance derivation success state and a measurement result in a case of the distance derivation failure state. The measurement result in a case of the distance derivation success state refers to an actually measured distance. The measurement result in a case of the distance derivation failure state refers to measurement failure information indicating that the measurement by the measurement unit has not been successful. Meanwhile, the measurement result acquired by the acquisition unit 110A by executing the processing of step 224 is an example of measurement success/failure information according to the technique of this disclosure.

In step 226, the execution unit 112A determines whether or not the measurement by the measurement unit has been successful by using the measurement result acquired by the acquisition unit 110A. That is, in step 226, the execution unit 112A determines that the measurement by the measurement unit has been successful, in a case where the measurement result acquired by the acquisition unit 110A is an actually measured distance. In addition, in step 226, the execution unit 112A determines that the measurement by the measurement unit has not been successful, in a case where the measurement result acquired by the acquisition unit 110A is measurement failure information.

In step 226, in a case where the measurement by the measurement unit has been successful, the determination result is positive, and the process proceeds to step 228. In step 226, in a case where the measurement by the measurement unit has not been successful, the determination result is negative, and the process proceeds to step 232.

In step 228, the execution unit 112A turns on a measurement success flag indicating that the measurement by the measurement unit has been successful, and then the process proceeds to step 230.

Meanwhile, the imaging range 115 which is used in imaging for a still image until the measurement success flag is turned on after the execution of the panoramic imaging measurement process is started is an example of a specific imaging range according to the technique of this disclosure.

In addition, the processing of step 228 is an example of a measurement prohibition process according to the technique of this disclosure. Here, the measurement prohibition process refers to a process of prohibiting the measurement by the measurement unit with subjects within the plurality of imaging ranges 115 used within the range $R_1$ as measurement targets.

Figure 14:
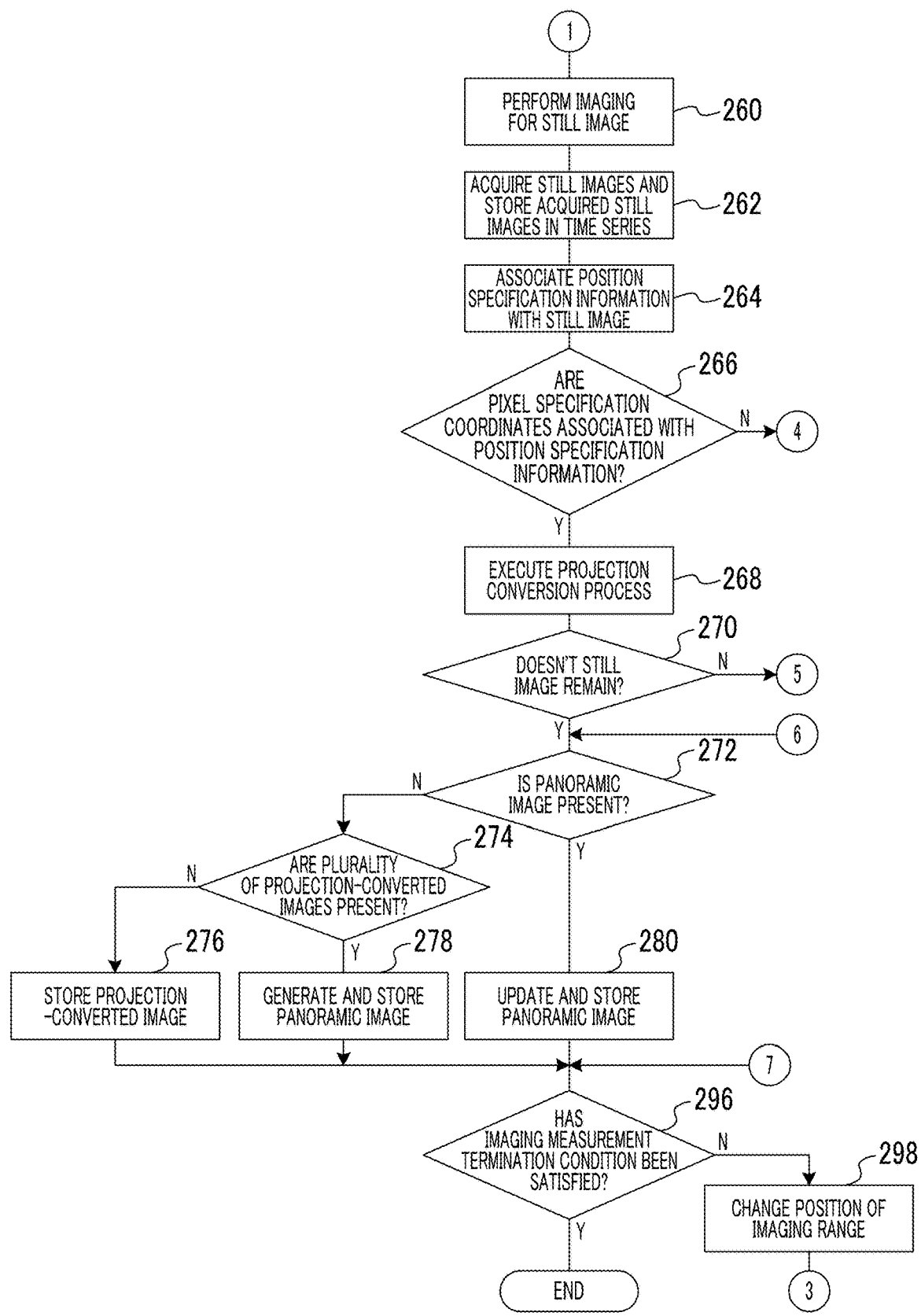
FIG. 14 is the continuation of the flowchart illustrated in FIGS. 12 and 13.

In step 230, the execution unit 112A stores the actually measured distance which is the measurement result acquired by the acquisition unit 110A in a second storage region (not shown) of the primary storage unit 102, and then the process proceeds to step 260 illustrated in FIG. 14.

Figure 20:
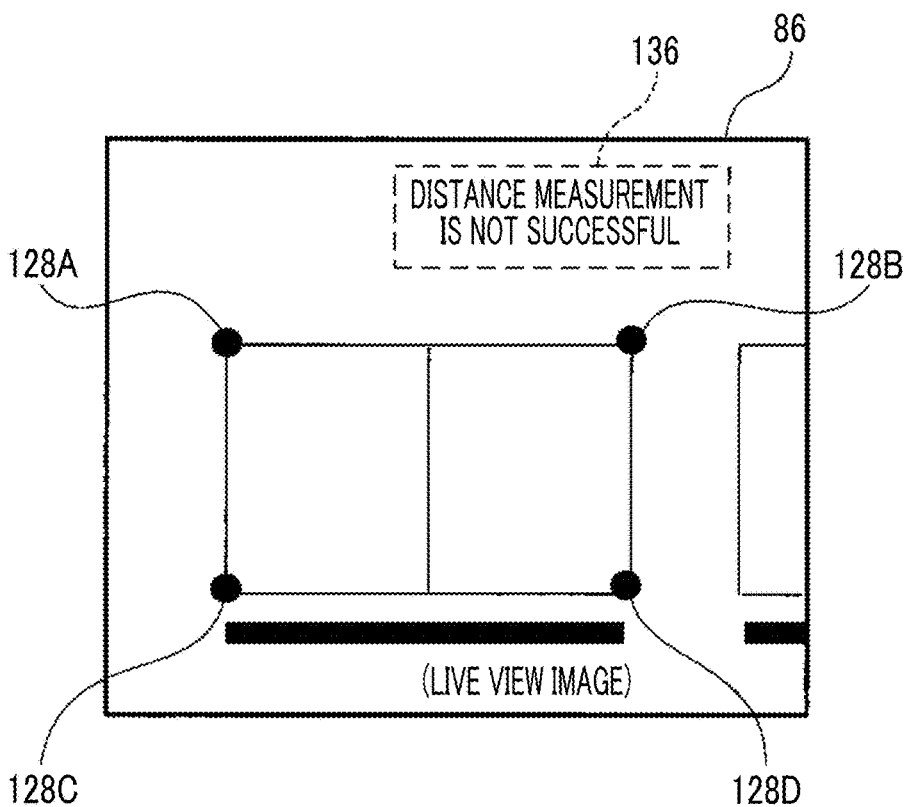
FIG. 20 is a schematic screen view illustrating an example of a screen on which a live view image showing a subject within the imaging range illustrated in FIG. 16 and a measurement failure message are displayed.

In step 232, the execution unit 112A causes the display unit 86 to start the display of a measurement failure message 136 indicating that the measurement by the measurement unit has not been successful, within a display region of the live view image as illustrated in FIG. 20 as an example, and then the process proceeds to step 234. Here, a message of "distance measurement is not successful" is shown as an example of the measurement failure message 136. However, this is just an example, and any message may be adopted as long as the message for making the user recognizes that the measurement by the measurement unit has not been successful.

The example illustrated in FIG. 20 shows a case where the measurement failure message 136 visibly displayed, but audible display such as the output of a sound using a sound reproducing device (not shown) or permanent visible display such as the output of printed matter using a printer may be performed instead of the visible display or may be performed in combination.

In step 234, the execution unit 112A determines whether or not a display termination condition for terminating the display of the measurement failure message 136 has been satisfied. An example of the display termination condition is a condition that a double-tap operation has been received by the touch panel 88, a condition that a specific button (for example, the imaging measurement button 90A) included in the reception device 90 has been turned on, or the like.

In step 234, in a case where the display termination condition has not been satisfied, the determination result is negative, and the determination in step 234 is performed again. In step 234, in a case where the display termination condition has been satisfied, the determination result is positive, and the process proceeds to step 236.

In step 236, the execution unit 112A causes the display unit 86 to terminate the display of the measurement failure message 136, and then the process proceeds to step 260 illustrated in FIG. 14.

In step 238, the execution unit 112A determines whether or not 4-apex corresponding pixels are included in the previous still image which is an example of a first captured image according to the technique of this disclosure. Here, the previous still image refers to a still image showing the subject within an imaging range 115 (an imaging range 115 used in imaging in the processing of step 260 to be described later) which is used in imaging for a still image and is located one imaging range before the present imaging range 115 among the plurality of imaging ranges 115.

In step 238, in a case where 4-apex corresponding pixels are not included in the previous still image, the determination result is negative, and the process proceeds to step 242. In step 238, in a case where 4-apex corresponding pixels are included in the previous still image, the determination result is positive, and the process proceeds to step 240.

In step 240, the execution unit 112A determines whether or not four pixels (an example of corresponding pixels according to the technique of this disclosure) which correspond to the 4-apex corresponding pixels included in the previous still image are present in a superimposed region. Here, the superimposed region refers to a region superimposed on the previous still image in the live view image showing the subject within the present imaging range 115. Meanwhile, the live view image showing the subject within the present imaging range 115 is an example of a second captured image according to the technique of this disclosure.

The second captured image according to the technique of this disclosure refers to a captured image obtained by imaging a subject within the other imaging range 115 out of the above-described adjacent imaging ranges.

In the example illustrated in FIG. 17, a range 132A (a hatched region illustrated in FIG. 17) in which the imaging range 115A and the imaging range 115B are superimposed on each other is shown. In the example illustrated in FIG. 17, the apexes 126A, 126B, 126C, and 126D in the subject within the imaging range 115A are included as real-space four apexes within the range 132A. Therefore, in this case, four pixels corresponding to the apexes 126A, 126B, 126C, and 126D are present in the live view image showing the subject within the imaging range 115B.

In the live view image showing the subject within the imaging range 115B, four pixels corresponding to the apexes 126A, 126B, 126C, and 126D illustrated in FIG. 17 are examples of corresponding pixels according to the technique of this disclosure. The corresponding pixels refer to, for example, four pixels corresponding to 4-apex corresponding pixels (an example of first multi-apex pixels according to the technique of this disclosure) which are included in a still image showing the subject within the imaging range 115A, among pixels included in the live view image showing the subject within the imaging range 115B illustrated in FIG. 17.

In the example illustrated in FIG. 17, the imaging range 115A and the imaging range 115B are examples of adjacent imaging ranges according to the technique of this disclosure. In the example illustrated in FIG. 17, the imaging range 115A is an example of "one imaging range of which the imaging is performed first, out of adjacent imaging ranges" according to the technique of this disclosure. The imaging range 115B is an example of "the other imaging range out of adjacent imaging ranges" according to the technique of this disclosure.

Here, as illustrated in FIG. 19 as an example, the pixels 128A, 128B, 128C, and 128D included in the live view image showing the subject within the imaging range 115A are pixels corresponding to the apexes 126A, 126B, 126C, and 126D. The pixels 128A, 128B, 128C, and 128D are also included in a still image obtained by imaging the subject within the imaging range 115A by executing the processing of step 260 to be described later. In this case, the apexes 126A, 126B, 126C, and 126D are included within the range 132A illustrated in FIG. 17. Therefore, four pixels corresponding to the pixels 128A, 128B, 128C, and 128D are also included in the live view image showing the subject within the imaging range 115B as the above-described corresponding pixels.

In the example illustrated in FIG. 18, a range 132B (a hatched region illustrated in FIG. 18) in which the imaging range 115B and the imaging range 115C are superimposed on each other is shown. In the example illustrated in FIG. 18, the apexes 126C, 126D, 126E, and 126F in the subject within the imaging range 115B are included as real-space four apexes in the range 132B. Therefore, in this case, four pixels corresponding to the apexes 126C, 126D, 126E, and 126F are present in the live view image showing the subject within the imaging range 115C.

In the live view image showing the subject within the imaging range 115C, four pixels corresponding to the apexes 126C, 126D, 126E, and 126F illustrated in FIG. 18 are an example of corresponding pixels according to the technique of this disclosure. In addition, in the example illustrated in FIG. 18, the imaging range 115B and the imaging range 115C are an example of adjacent imaging ranges according to the technique of this disclosure. In the example illustrated in FIG. 18, the imaging range 115B is an example of "one imaging range of which the imaging is performed first, out of adjacent imaging ranges" according to the technique of this disclosure. The imaging range 115C is an example of "the other imaging range out of adjacent imaging ranges" according to the technique of this disclosure. Meanwhile, the example illustrated in FIG. 8 is an example given on the assumption that 4-apex corresponding pixels are not present in the still image showing the subject within the imaging range 115A and 4-apex corresponding pixels are present in the still image showing the subject within the imaging range 115B.

Four pixels corresponding to the apexes 126C, 126D, 126E, and 126F are present in the still image showing the subject within the imaging range 115B illustrated in FIG. 18. In this case, the apexes 126C, 126D, 126E, and 126F are included in the range 132B illustrated in FIG. 18. Therefore, the four pixels corresponding to the apexes 126C, 126D, 126E, and 126F are also included as the above-described corresponding pixels in the live view image showing the subject within the imaging range 115C.

In this embodiment, for convenience of description, four pixels are described as multi-apex pixels. However, the technique of this disclosure is not limited thereto, and at least four or more pixels for defining apexes of a polygon may be adopted.

In step 240, in a case where four pixels corresponding to 4-apex corresponding pixels included in the previous still image are present in the superimposed region (for example, a case of the example illustrated in FIG. 17 and a case of the example illustrated in FIG. 18), the determination result is negative, and the process proceeds to step 244. In step 240, in a case where four pixels corresponding to 4-apex corresponding pixels included in the previous still image are not present in the superimposed region, the determination result is positive, and the process proceeds to step 242.

In step 242, the execution unit 112A determines whether or not a measurement success flag is turned on. In step 242, in a case where the measurement success flag is turned off, the determination result is negative, and the process proceeds to step 208. In a case where the determination result in step 242 is negative and thus the process proceeds to step 208, the measurement by the measurement unit is consequently performed again in the processing of step 220. In step 242, in a case where the measurement success flag is turned on, the determination result is positive, and the process proceeds to step 246 illustrated in FIG. 13. Meanwhile, the processing in which the determination result in step 242 is positive is an example of a measurement prohibition process according to the technique of this disclosure.

In step 244, the execution unit 112A stores second pixel specification coordinates, which are coordinates for specifying the positions of the four pixels included in the superimposed region, and position specification information in time series in the first storage region in a state where the second pixel specification coordinates and the position specification information are associated with each other, and then the process proceeds to step 246. Meanwhile, the four pixels located at positions specified by the second pixel specification coordinates stored in the first storage region by executing step 244 are an example of corresponding pixels according to the technique of this disclosure. In addition, hereinafter, for convenience of description, the first and second pixel specification coordinates will be referred to as "pixel specification coordinates" in a case where it is not necessary to give a description by distinguishing between the first and second pixel specification coordinates.

In step 246, the execution unit 112A determines whether or not the measurement success flag is turned off. In step 246, in a case where the measurement success flag is turned off, the determination result is positive, and the process proceeds to step 220. In a case where the determination result in step 246 is negative and thus the process proceeds to step 220, the measurement by the measurement unit is performed again in step 220. In step 246, in a case where the measurement success flag is turned on, the determination result is negative, and the process proceeds to step 260 illustrated in FIG. 14. Meanwhile, the processing in which the determination result in step 246 is negative is an example of a measurement prohibition process according to the technique of this disclosure.

Figure 13:
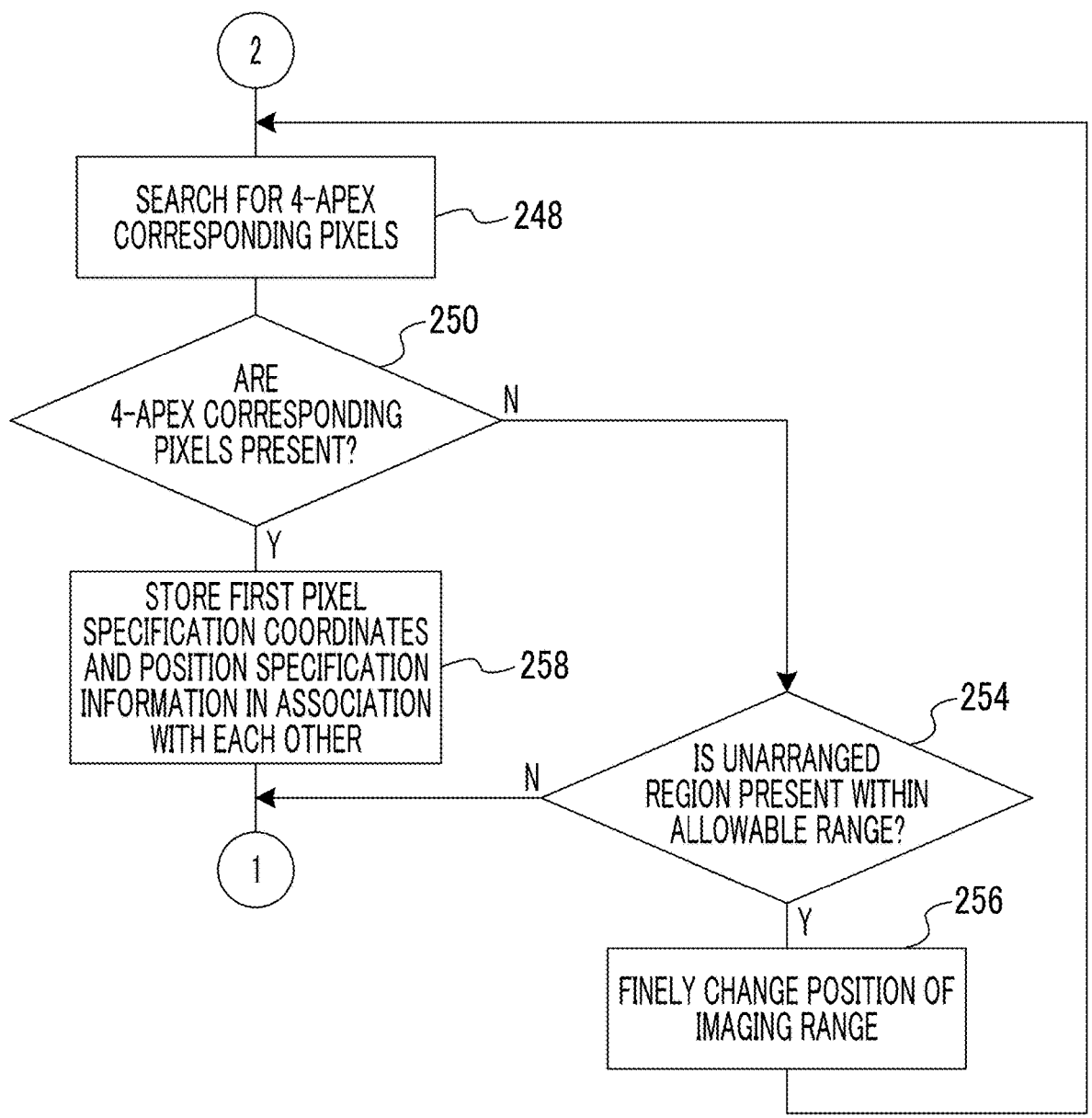
FIG. 13 is the continuation of the flowchart illustrated in FIG. 12.

In step 248 illustrated in FIG. 13, the execution unit 112A executes the same processing as the processing of step 208, and the process proceeds to step 250.

In step 250, the execution unit 112A determines whether or not 4-apex corresponding pixels are included in the live view image showing the subject within the imaging range 115. In step 250, in a case where 4-apex corresponding pixels are present in the live view image showing the subject within the imaging range 115, the determination result is positive, and the process proceeds to step 258. In step 250, In a case where 4-apex corresponding pixels are not present in the live view image showing the subject within the imaging range 115, the determination result is negative, and the process proceeds to step 254.

In step 254, the execution unit 112A executes the same processing as the processing of step 214, and then the process proceeds to step 256.

In step 256, the execution unit 112A executes the same processing as the processing of step 216, and then the process proceeds to step 248.

In step 258, the execution unit 112A executes the same processing as the processing of step 218, and then the process proceeds to step 260 illustrated in FIG. 14.

In step 260 illustrated in FIG. 14, the execution unit 112A causes the imaging device 14 to perform imaging for a still image, and then the process proceeds to step 262.

In step 262, the execution unit 112A acquires still images obtained by performing imaging by executing the processing of step 260 and stores the acquired still images in time series in a third storage region (not shown) of the primary storage unit 102, and then the process proceeds to step 264.

In step 264, the execution unit 112A associates the latest position specification information stored in the first storage region with the latest still image among the still images stored in time series in the third storage region, and then the process proceeds to step 266.

Meanwhile, hereinafter, for convenience of description, the latest still image among the still images stored in time series in the third storage region will be simply referred to as "the latest still image". In addition, hereinafter, for convenience of description, position specification information associated with a still image will also be referred to as "position specification information corresponding to a still image".

In step 266, the execution unit 112A determines whether or not pixel specification coordinates are associated with position specification information associated with the latest still image by executing the processing of step 264. In step 266, in a case where pixel specification coordinates are not associated with the position specification information associated with the latest still image by executing the processing of step 264, the determination result is negative, and the process proceeds to step 282 illustrated in FIG. 15. In step 266, in a case where pixel specification coordinates are associated with the position specification information associated with the latest still image by executing the processing of step 264, the determination result is positive, and the process proceeds to step 268. Meanwhile, hereinafter, for convenience of description, pixel specification coordinates associated with position specification information associated with a still image will be referred to as "pixel specification coordinates associated with a still image".

In step 268, the execution unit 112A executes a projection conversion process on the basis of the pixel specification coordinates corresponding to the latest still image, with the latest still image as a processing target, and erases the still image which is set to be a processing target from the third storage region, and then the process proceeds to step 270. In a case where the projection conversion process is executed in step 268, a projection conversion coefficient which is a coefficient for projection conversion is derived on the basis of a quadrangle defined by the pixel specification coordinates. The latest still image is converted into an image equivalent to the above-described facing image by using the derived projection conversion coefficient.

Meanwhile, hereinafter, for convenience of description, the image equivalent to the facing image obtained by executing the projection conversion process on the still image will be referred to as a "projection-converted image". In addition, position specification information corresponding to the still image which is set to be a processing target in step 268 is also associated with the projection-converted image. In addition, hereinafter, for convenience of description, the position specification information associated with the projection-converted image is also referred to as "position specification information corresponding to the projection-converted image". In addition, hereinafter, for convenience of description, the latest projection-converted image obtained by executing the processing of step 268 will be simply referred to as "the latest projection-converted image".

In step 270, the execution unit 112A determines whether or not a still image other than the still image which is set to be a processing target in step 268 remains in the third storage region. In step 270, in a case where a still image other than the still image which is set to be a processing target in step 268 does not remain in the third storage region, the determination result is negative, and the process proceeds to step 272. In step 270, in a case where a still image other than the still image which is set to be a processing target in step 268 remains in the third storage region, the determination result is positive, and the process proceeds to step 284 illustrated in FIG. 15.

In step 272, the execution unit 112A determines whether or not a panoramic image is stored in a fourth storage region (not shown) of the primary storage unit 102. Meanwhile, in a case where the processing of step 278 to be described later is executed and the processing of step 280 is executed, a panoramic image is stored in the fourth storage region.

In step 272, in a case where a panoramic image is stored in the fourth storage region, the determination result is positive, and the process proceeds to step 280. In step 272, in a case where a panoramic image is not stored in the fourth storage region, the determination result is negative, and the process proceeds to step 274.

In step 274, the execution unit 112A determines whether or not a plurality of projection-converted images are present. Here, first to fourth patterns are considered as a pattern including the plurality of projection-converted images.

The first pattern refers to a pattern in which a projection-converted image has already been stored in a fifth storage region (not shown) of the primary storage unit 102 by executing the processing of step 276 to be described later and the latest projection-converted image is present. The second pattern refers to a pattern in which a projection-converted image is stored in the fifth storage region, the latest projection-converted image is present, and a projection-converted image is obtained by executing the processing of step 292 to be described later. The third pattern refers to a pattern in which a projection-converted image is not stored in the fifth storage region, the latest projection-converted image is present, and a projection-converted image is obtained by executing the processing of step 292 to be described later. The fourth pattern refers to a pattern in which the latest projection-converted image is not present, and a plurality of projection-converted images are obtained by executing the processing of step 292 to be described later. Meanwhile, in a case where the processing of step 276 step 276 is executed, a projection-converted image obtained by executing the processing of step 268 is stored in the fifth storage region.

In step 274, in a case where a projection-converted image is stored in the fifth storage region, the determination result is positive, and the process proceeds to step 278. In step 274, in a case where a projection-converted image is not stored in the fifth storage region, the determination result is negative, and the process proceeds to step 276.

In step 276, the execution unit 112A stores the latest projection-converted image obtained by executing the processing of step 268 in the fifth storage region, and then the process proceeds to step 296.

In step 278, the execution unit 112A generates a panoramic image by joining the projection-converted image, obtained by executing at least one processing of step 268 and step 292, and the projection-converted image stored in the fifth storage region together. The execution unit 112A stores the generated panoramic image in the fourth storage region, and then the process proceeds to step 296. Meanwhile, the processing of step 278 is an example of a generation process according to the technique of this disclosure.

In step 280, the execution unit 112A acquires the panoramic image stored in the fourth storage region. Subsequently, the execution unit 112A updates the panoramic image by joining the projection-converted image obtained by executing at least one processing of step 268 and step 292 to the acquired panoramic image. The execution unit 112A stores the updated panoramic image in the fourth storage region (overwrite save), and then the process proceeds to step 296. Meanwhile, the processing of step 280 is an example of a generation process according to the technique of this disclosure.

Figure 15:
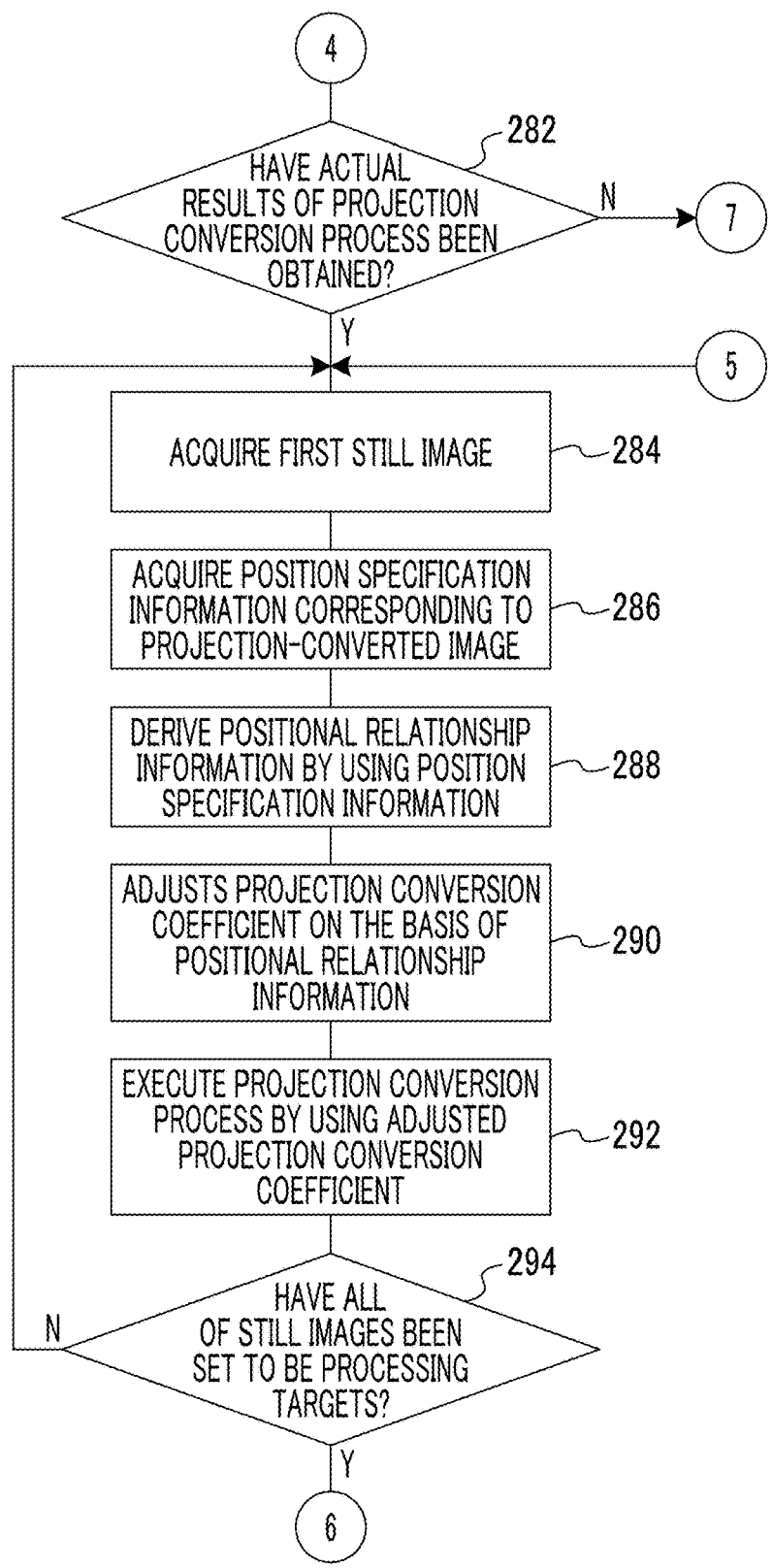
FIG. 15 is the continuation of the flowchart illustrated in FIG. 14.

In step 282 illustrated in FIG. 15, the execution unit 112A determines whether or not actual results of the projection conversion process have been obtained. The actual results of the projection conversion process refer to a fact that the projection conversion process has been executed on a still image from the start of the execution of the panoramic imaging measurement process to the present point in time. The presence or absence of actual results of the projection conversion process is determined whether or not the processing of step 268 illustrated in FIG. 14 has been executed.

In step 282, in a case where actual results of the projection conversion process are not present, the determination result is negative, and the process proceeds to step 296 illustrated in FIG. 14. In step 282, in a case where actual results of the projection conversion process are present, the determination result is positive, and the process proceeds to step 284.

In step 284, the execution unit 112A acquires the first still image, and then the process proceeds to step 286. Here, the first still image refers to a still image which is first stored among still images stored in the third storage region, that is, the oldest still image. Meanwhile, hereinafter, for convenience of description, the first still image obtained by executing the processing of step 284 will be simply referred to as a "first still image".

In step 286, the execution unit 112A acquires position specification information corresponding to the latest projection-converted image, and then the process proceeds to step 288.

In step 288, the execution unit 112A derives positional relationship information by using two pieces of position specification information, and then the process proceeds to step 290.

Here, the positional relationship information is information indicating a positional relationship between the imaging range 115 used in imaging performed to obtain the first still image and the imaging range 115 used in imaging performed to obtain a still image corresponding to the latest projection-converted image. The positional relationship information is information including a distance between the imaging ranges and an imaging range direction. The distance between the imaging ranges refers to a distance between the imaging range 115 used in imaging performed to obtain the first still image and the imaging range 115 used in imaging performed to obtain a still image corresponding to the latest projection-converted image. The imaging range direction refers to a direction of the imaging range 115 used in imaging performed to obtain the first still image with respect to the imaging range 115 used in imaging performed to obtain a still image corresponding to the latest projection-converted image.

In step 290, the execution unit 112A adjusts a projection conversion coefficient of the latest projection-converted image to a coefficient capable of converting the first still image into the projection-converted image on the basis of the positional relationship information derived in the processing of step 288, and then the process proceeds to step 292.

In step 292, the execution unit 112A executes the projection conversion process by using the projection conversion coefficient adjusted in the processing of step 290 with the first still image as a processing target, and erases the still image which is set to be a processing target from the third storage region, and then the process proceeds to step 294.

In step 294, the execution unit 112A determines whether or not all of the still images stored in the third storage region have been set to be processing targets of the projection conversion process of step 292. In step 294, in a case where all of the still images stored in the third storage region have not been set to be processing targets of the projection conversion process of step 292, the determination result is negative, and the process proceeds to step 284. In step 294, in a case where all of the still images stored in the third storage region have been set to be processing targets of the projection conversion process of step 292, the determination result is positive, and the process proceeds to step 272 illustrated in FIG. 14.

In step 296 illustrated in FIG. 14, the execution unit 112A determines whether or not an imaging measurement termination condition which is a condition for terminating the panoramic imaging measurement process has been satisfied. An example of the imaging measurement termination condition is a condition that a panoramic image including a projection-converted image obtained on the basis of a still image, obtained by performing imaging on a subject within the last imaging range 115, is generated and stored in the fourth storage region. Another example of the imaging measurement termination condition is a condition that an instruction for terminating the panoramic imaging measurement process is received by the touch panel 88 or the reception device 90.

In step 296, in a case where the imaging measurement termination condition has not been satisfied, the determination result is negative, and the process proceeds to step 298.

In step 298, the execution unit 112A moves the position of the imaging range 115 to a position where imaging for a still image is expected to be performed next as imaging for a still image required in panoramic imaging by operating the change mechanism 11, to thereby change the position of the imaging range 115. In a case where the execution of the processing of step 298 is terminated, the panoramic imaging measurement process proceeds to step 200 illustrated in FIG. 12.

Meanwhile, the position where imaging for a still image is expected to be performed next refers to the position of the imaging range 115B, for example, in a case where the present imaging range 115 is the imaging range 115A, and refers to the position of the imaging range 115C in a case where the present imaging range 115 is the imaging range 115B (see FIGS. 17 and 18). In addition, the processing of step 298 is an example of a movement process according to the technique of this disclosure.

In step 296, in a case where the imaging measurement termination condition has been satisfied, the determination result is positive, and the panoramic imaging measurement process is terminated.

Figure 21:
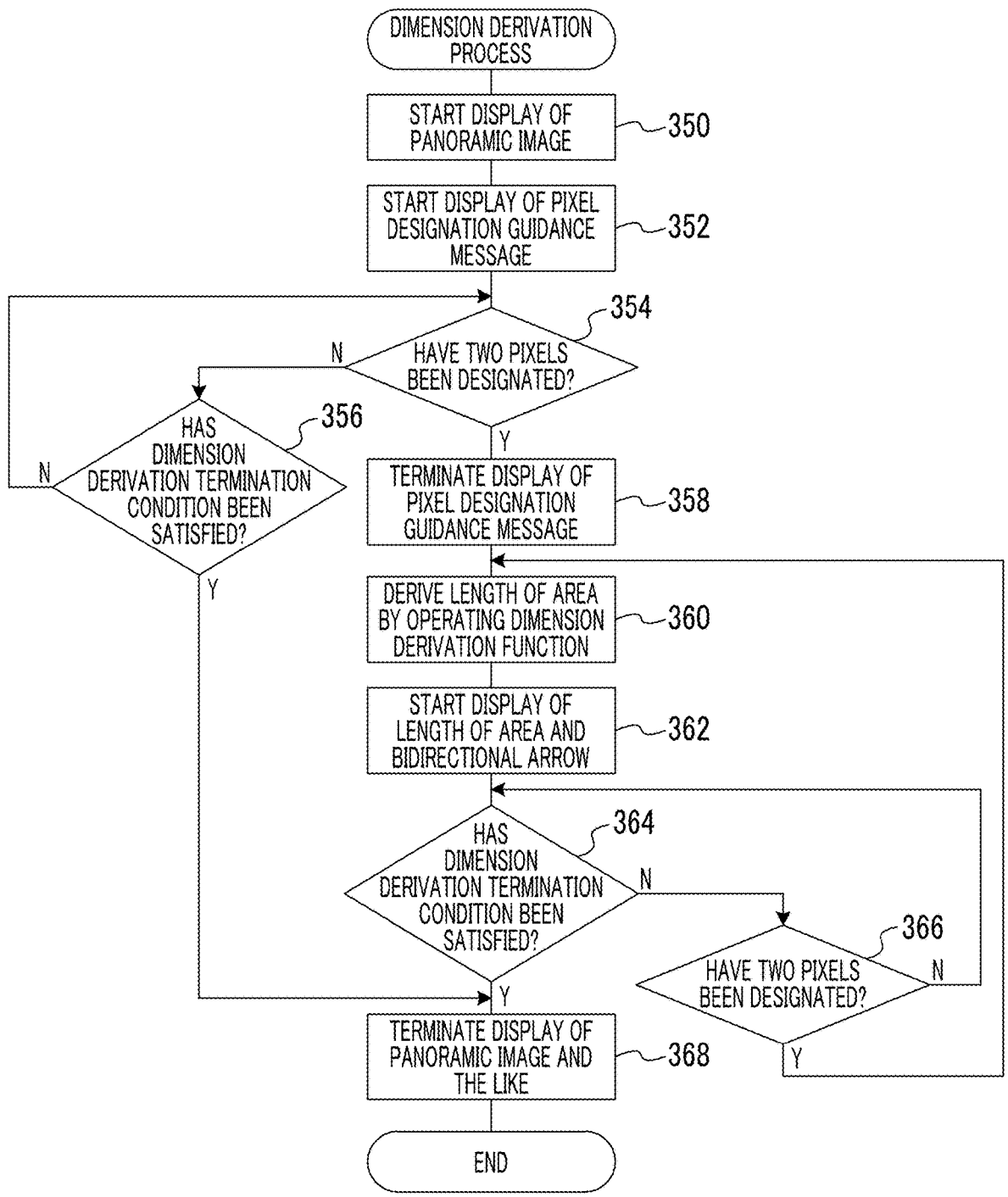
FIG. 21 is a flowchart illustrating an example of a flow of a dimension derivation process according to the first and second embodiments.

Next, reference will be made to FIG. 21 to describe a dimension derivation process realized by operating a dimension derivation function by executing the dimension derivation program 106A by the CPU 100 in a case where the dimension derivation button 90F is turned on in a state where a panoramic image is stored in the fourth storage region.

Meanwhile, hereinafter, for convenience of description, a description will be given on the assumption that an actually measured distance is stored in the second storage region. In addition, hereinafter, for convenience of description, a description will be given on the assumption that the dimension derivation button 90F is turned on without shutting down the distance measurement device 10A after the panoramic imaging measurement process is executed.

In addition, hereinafter, for convenience of description, a description will be given on the assumption that "$f_0$" of Expression (1) denotes a representative focal length which is used in the imaging of a panoramic image. An example of the representative focal length is an average value of focal lengths used in respective imaging operations for a still image which are required in panoramic imaging and performed a plurality of times. Another example of the representative focal length is a focal length used in imaging performed to obtain a still image corresponding to a projection-converted image including two designated pixels to be described later.

Figure 22:
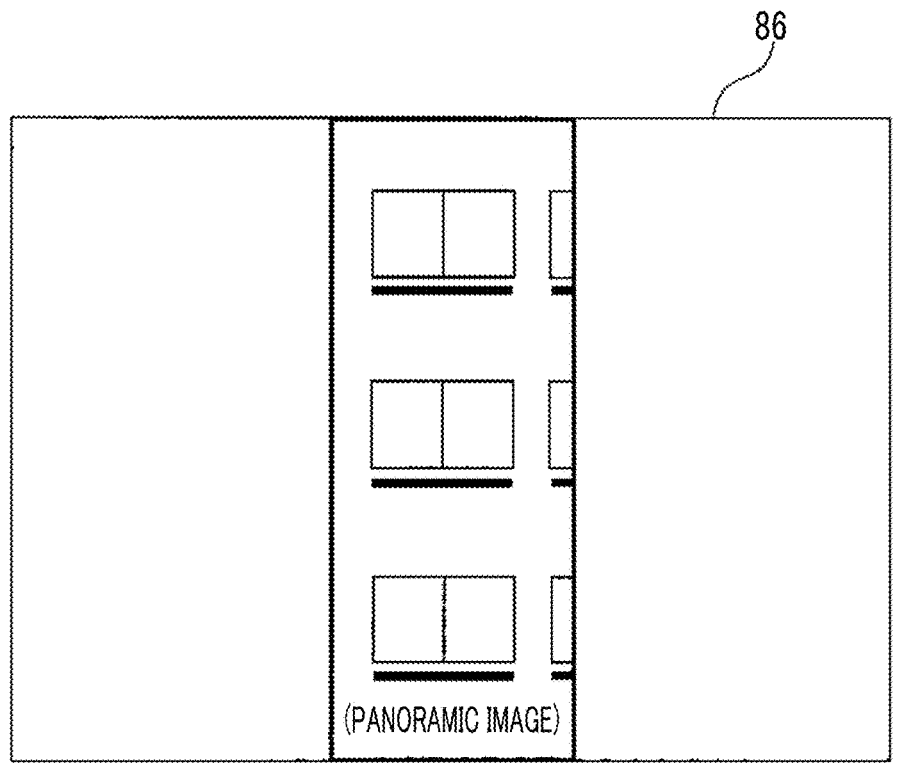
FIG. 22 is a schematic screen view illustrating an example of a screen including a panoramic image which is displayed on a display unit by executing the dimension derivation process according to the first and second embodiments.

First, in step 350, the execution unit 112A acquires a panoramic image from the fourth storage region. The execution unit 112A causes the display unit 86 to start the display of the panoramic image, as illustrated in FIG. 22 as an example, and then the process proceeds to step 352.

Figure 23:
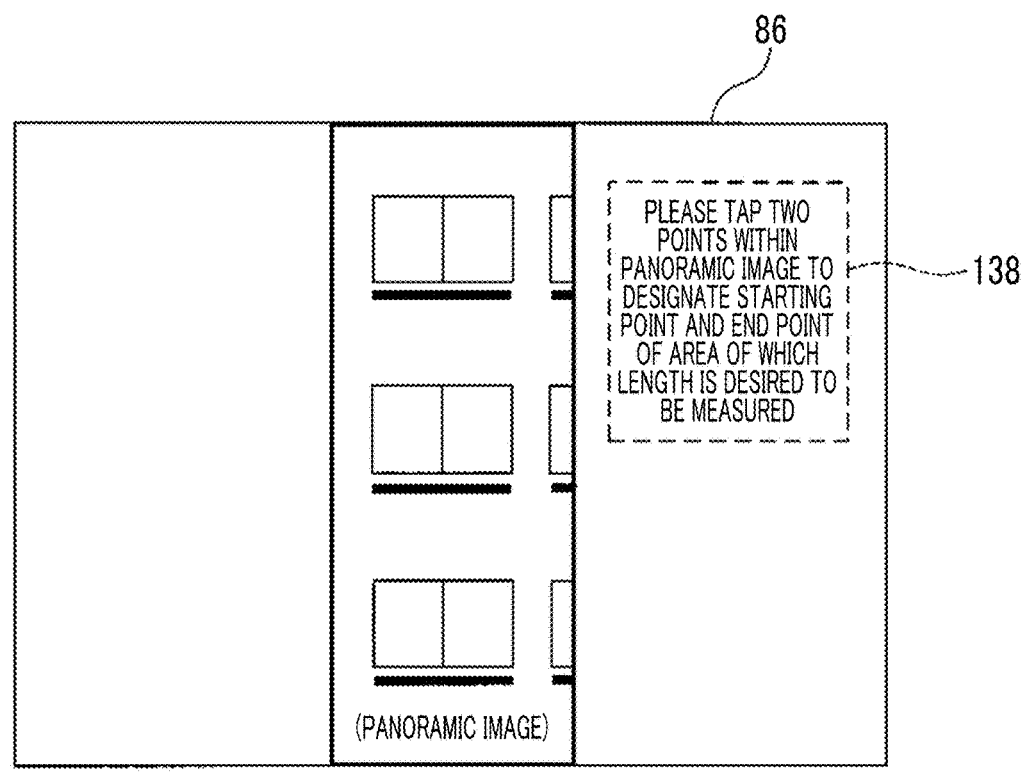
FIG. 23 is a schematic screen view illustrating an example of a screen including a panoramic image displayed on the display unit by executing the dimension derivation process according to the first and second embodiments, and a pixel designation guidance message.

In step 352, the execution unit 112A causes the display unit 86 to display a pixel designation guidance message 138 within a horizontal display region of the panoramic image, as illustrated in FIG. 23 as an example, and then the process proceeds to step 354.

In the example illustrated in FIG. 23, a message of "please tap two points within panoramic image to designate starting point and end point of area of which length is desired to be measured" is shown as the pixel designation guidance message 138, but this is just an example. The pixel designation guidance message 138 is not limited to the example illustrated in FIG. 23, and may be any message as long as the message is a message for prompting the user to designate two pixels for specifying a starting point and an end point of an area of which the length is desired to be measured.

Figure 24:
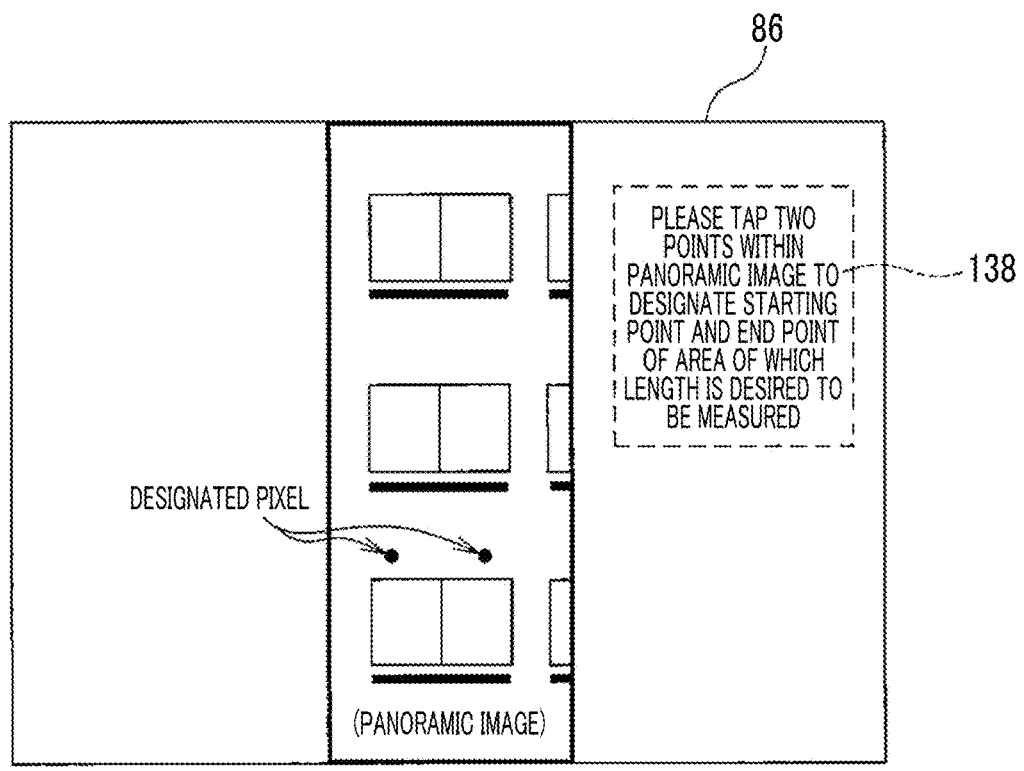
FIG. 24 is a schematic screen view illustrating an example of a screen including a panoramic image displayed on the display unit by executing the dimension derivation process according to the first and second embodiments, and two pixels designated in accordance with a pixel designation guidance message and a pixel designation guidance message.

In step 354, the execution unit 112A determines whether or not two pixels have been designated by the user through the touch panel 88. In step 354, in a case where two pixels have not been designated by the user through the touch panel 88, the determination result is negative, and the process proceeds to step 356. In step 354, in a case where two pixels have been designated by the user through the touch panel 88 as illustrated in FIG. 24 as an example, the determination result is positive, and the process proceeds to step 358.

In step 356, the execution unit 112A determines whether or not a dimension derivation termination condition which is a condition for terminating the dimension derivation process has been satisfied. An example of the dimension derivation termination condition is a condition that an instruction for terminating the dimension derivation process is received by the touch panel 88 or the reception device 90. Another example of the dimension derivation termination condition is a condition that a predetermined time (for example, 30 minutes) has elapsed after the execution of the dimension derivation process is started.

In step 356, in a case where the dimension derivation termination condition has not been satisfied, the determination result is negative, and the process proceeds to step 354. In step 356, in a case where the dimension derivation termination condition has been satisfied, the determination result is positive, and the process proceeds to step 368.

In step 358, the execution unit 112A causes the display unit 86 to terminate the display of the pixel designation guidance message 138, and then the process proceeds to step 360.

In step 360, the execution unit 112A operates the dimension derivation function to derive the length of an area on the real space which corresponds to an interval between the two pixels designated by the user through the touch panel 88, and then the process proceeds to step 362.

In step 360, the length of the area on the real space which corresponds to an interval between the two pixels designated by the user through the touch panel 88 is derived by Expression (1). Meanwhile, in this case, u1 and u2 in Expression (1) denote addresses of the two pixels designated by the user through the touch panel 88. In addition, L in Expression (1) denotes an actually measured distance stored in the second storage region by executing the processing of step 230 included in the panoramic imaging measurement process.

Figure 25:
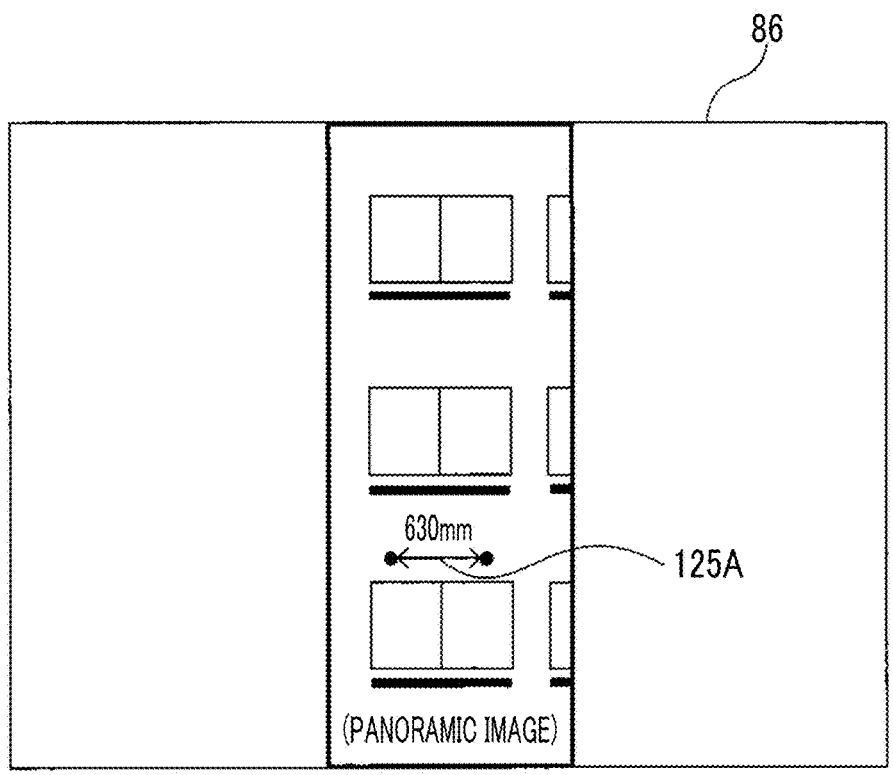
FIG. 25 is a schematic screen view illustrating an example of a screen in a state where the length of an area on the real space, which is derived by executing the dimension derivation process according to the first and second embodiments, is superimposed on a panoramic image.

In step 362, the execution unit 112A causes the display unit 86 to display the length of the area and a bidirectional arrow 125A so as to be superimposed on the panoramic image as illustrated in FIG. 25 as an example, and then the process proceeds to step 364.

The length of the area which is displayed on the display unit 86 by executing the processing of step 362 is the length of the area which is derived by the execution unit 112A by executing the processing of step 360. Meanwhile, in the example illustrated in FIG. 25, a length of "630 mm" corresponds to the length of the area. In addition, the bidirectional arrow 125A displayed on the display unit 86 by executing the processing of step 362 is an arrow for specifying a distance between the two pixels designated by the user through the touch panel 88.

In step 364, the execution unit 112A determines whether or not the above-described dimension derivation termination condition has been satisfied. In step 364, in a case where the dimension derivation termination condition has not been satisfied, the determination result is negative, and the process proceeds to step 366. In step 364, in a case where the dimension derivation termination condition has been satisfied, the determination result is positive, and the process proceeds to step 368.

Figure 26:
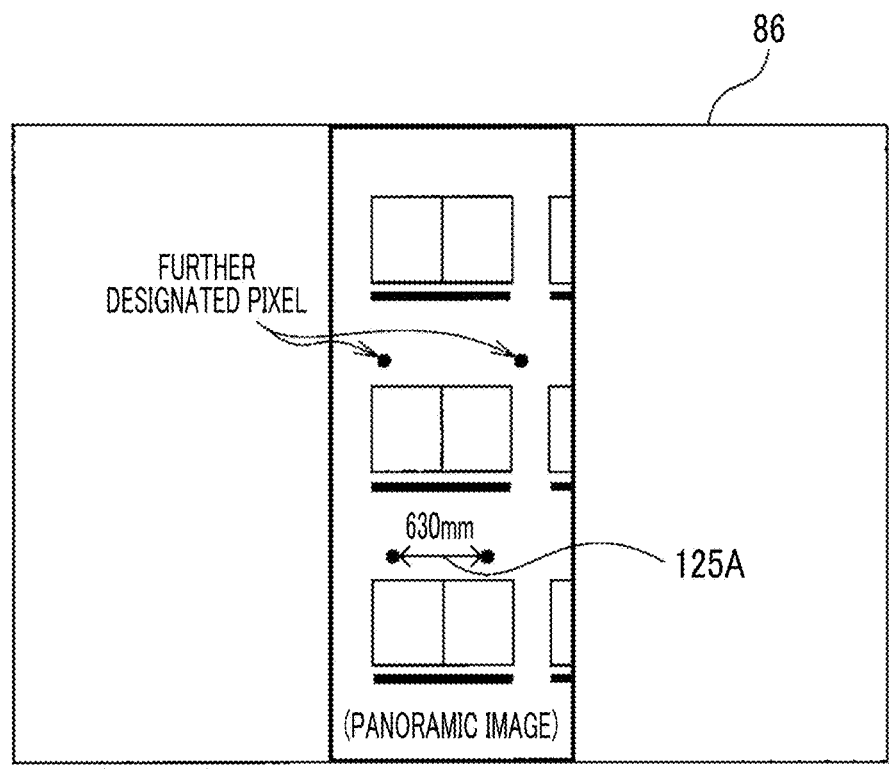
FIG. 26 is a schematic screen view illustrating an example of a screen in a case where two pixels are further designated in a state where the length of an area on the real space is displayed so as to be superimposed on a panoramic image by executing the dimension derivation process according to the first and second embodiments.

In step 366, the execution unit 112A determines whether or not two pixels have been further designated by the user through the touch panel 88. In step 366, in a case where two pixels have not been further designated by the user through the touch panel 88, the determination result is negative, and the process proceeds to step 364. In step 366, in a case where two pixels have been further designated by the user through the touch panel 88 as illustrated in FIG. 26 as an example, the determination result is positive, and the process proceeds to step 360.

Figure 27:
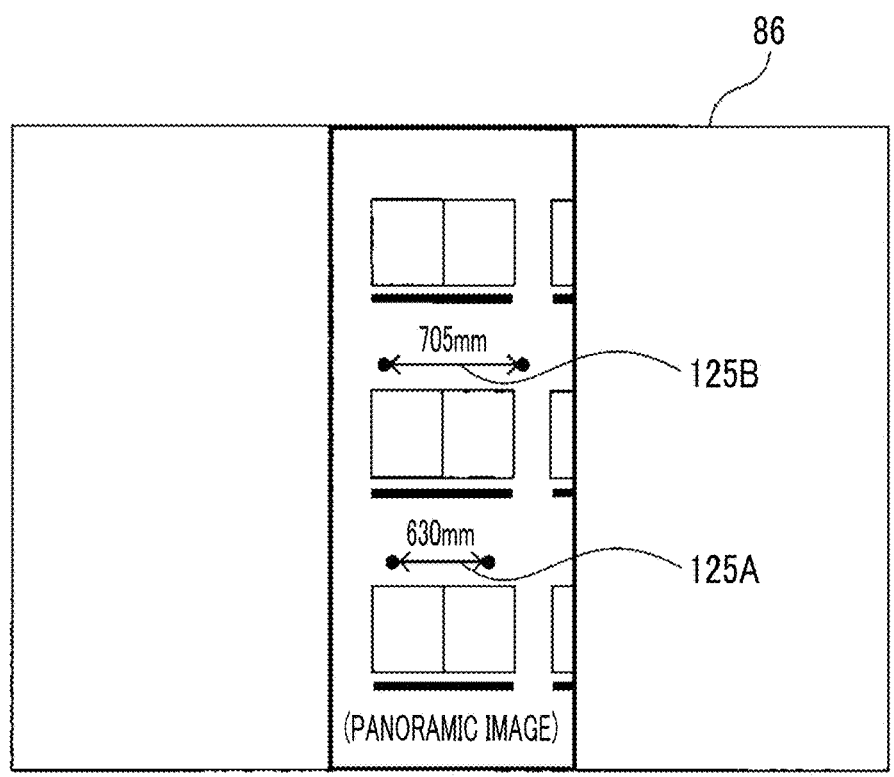
FIG. 27 is a schematic screen view illustrating an example of a screen in a state where the length of each of two areas on the real space is displayed so as to be superimposed on a panoramic image by executing the dimension derivation process according to the first and second embodiments.

In a case where the determination result in step 366 is positive and the processing of step 360 and the processing of step 362 are executed again, the length of an area which corresponds to a distance between the two pixels further designated by the user through the touch panel 88 is displayed on the display unit 86 as illustrated in FIG. 27 as an example. Meanwhile, in the example illustrated in FIG. 27, a length of "705 mm" corresponds to the length of the area which corresponds to the distance between the two pixels further designated by the user through the touch panel 88. In addition, in the example illustrated in FIG. 27, a bidirectional arrow 125B visibly specifies the distance between the two pixels further designated by the user through the touch panel 88. Meanwhile, hereinafter, for convenience of description, the bidirectional arrows 125A and 125B will be simply referred to as a "bidirectional arrow 125" in a case where it is not necessary to give a description by distinguishing between the bidirectional arrows.

In step 368, the execution unit 112A causes the display unit 86 to terminate the display of a panoramic image and the like, and then the dimension derivation process is terminated. Meanwhile, here, the panoramic image and the like refer to the panoramic image and the pixel designation guidance message 138 in a case where the determination result in step 356 is positive, and refer to the panoramic image, the length of an area, and the bidirectional arrow 125 in a case where the determination result in step 364 is positive.

As described above, in the distance measurement device 10A, in a case where the measurement result acquired by the acquisition unit 110A indicates that the measurement by the measurement unit has been successful (step 226: Y), a measurement success flag is turned on, and thus the measurement by the measurement unit is suppressed (step 242: N) (step 246: N).

Therefore, according to the distance measurement device 10A, it is possible to suppress unnecessary measurement, as compared to a case where a distance to a subject is measured once with respect to each of all imaging required in one panoramic imaging.

In the distance measurement device 10A, in a case where the measurement success flag is turned on, the measurement by the measurement unit performed on subjects within a plurality of imaging ranges 115 serving as imaging targets in panoramic imaging is prohibited (step 246: N).

Therefore, according to the distance measurement device 10A, it is possible to prohibit unnecessary measurement, as compared to a case where a distance to a subject is measured once with respect to each of all imaging required in one panoramic imaging.

In the distance measurement device 10A, the measurement by the measurement unit is executed in a case where the imaging measurement button 90A is turned on (step 220). In a case where the measurement success flag is turned on (step 228), an instruction for executing the measurement by the measurement unit is invalidated (step 242: N) (step 246: N) even in a case where the imaging measurement button 90A is turned on (step 202: Y).

Therefore, according to the distance measurement device 10A, it is possible to prohibit unnecessary measurement by simple control, as compared to a case where an instruction for executing the measurement by the measurement unit is not invalidated.

In the distance measurement device 10A, the measurement by the measurement unit performed on a subject within an imaging range 115 of which the imaging has not been performed, among the plurality of imaging ranges 115, is suppressed (step 242: N) (step 246: N).

Therefore, according to the distance measurement device 10A, it is possible to suppress unnecessary measurement even during panoramic imaging, as compared to a case where a distance to a subject is measured once with respect to each of all imaging required in one panoramic imaging.

In addition, the distance measurement device 10A executes a process of moving the present imaging range 115 to a position where the next imaging required in panoramic imaging is expected to be performed by operating the change mechanism 11 in a case where imaging is terminated (step 298).

Therefore, according to the distance measurement device 10A, it is possible to move the position of the present imaging range 115 to a position where the next imaging required in panoramic imaging is expected to be performed without requiring time and effort, as compared to a case where the present imaging range 115 is manually moved to a position where the next imaging required in panoramic imaging is expected to be performed.

In the distance measurement device 10A, a panoramic image is generated by joining projection-converted images, obtained by performing projection conversion on each of a plurality of still images, together (steps 278 and 280).

Therefore, according to the distance measurement device 10A, it is possible to generate a high-precision panoramic image, as compared to a case where a panoramic image is generated by joining images having not been subjected to projection conversion together.

In the distance measurement device 10A, a first still image which is the previous still image includes 4-apex corresponding coordinates and corresponding pixels which are four pixels corresponding to 4-apex corresponding pixels are included in a second still image which is the latest still image (step 240: N), the first still image is subjected to projection conversion on the basis of the 4-apex corresponding pixels (step 268). In addition, the second still image is subjected to projection conversion on the basis of the corresponding pixels (step 268). A panoramic image is generated which is an image including a projection-converted image obtained by performing the projection conversion on the first still image (an example of a first projection-converted image according to the technique of this disclosure) and a projection-converted image obtained by performing the projection conversion on the second still image (an example of a second projection-converted image according to the technique of this disclosure) (step 278).

Therefore, according to the distance measurement device 10A, it is possible to generate a panoramic image including a projection-converted image without requiring time and effort, as compared to a case where 4-apex corresponding pixels are searched for with respect to each of all of the still images obtained by imaging each subject included in each of the plurality of imaging ranges 115 serving as imaging targets in panoramic imaging.

Further, in the distance measurement device 10A, the length of an area on the real space which corresponds to a distance between two pixels designated within a panoramic image is derived by operating the dimension derivation function on the basis of an actually measured distance obtained by executing the panoramic imaging measurement process, and the panoramic image (step 360).

Therefore, according to the distance measurement device, it is possible to derive the length of an area on the real space which is designated through a panoramic image, as compared to a case where a distance to a subject is measured once with respect to each of all imaging required in one panoramic imaging.

Figure 28:
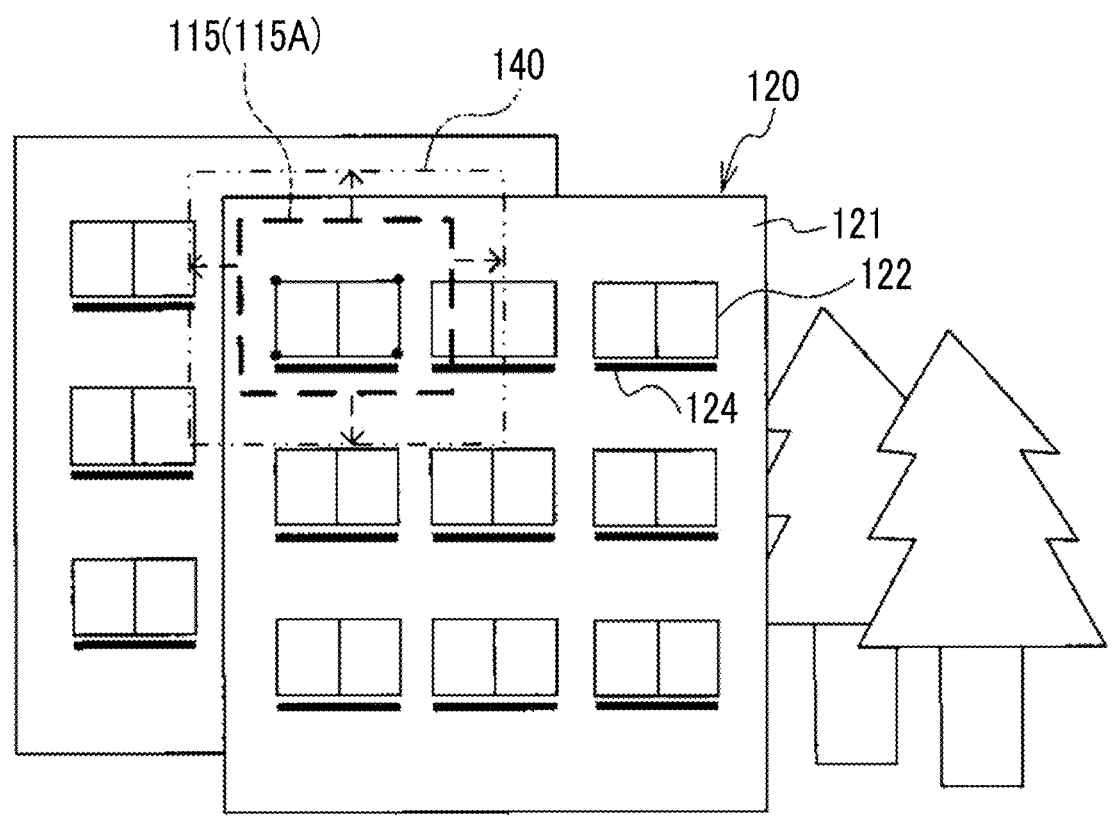
FIG. 28 is a conceptual diagram illustrating a modification example of an allowable range which is used by executing the panoramic imaging measurement process according to the first embodiment.

Meanwhile, in the first embodiment, the range 130 has been described as an allowable range. However, the technique of this disclosure is not limited thereto, and a range 140 may be used as an allowable range, as illustrated in FIG. 28 as an example. The range 140 is a range in which the imaging range 115 is not only enlarged in the lateral direction when seen in a front view with respect to the imaging range 115, but also enlarged in the vertical direction when seen in a front view. In the example illustrated in FIG. 28, the range 140 is set to be a range in which the imaging range 115 is enlarged by 1.5 times both in the imaging direction when seen in a front view with respect to the imaging range 115 and the lateral direction. In this case, the position of the imaging range 115 is also finely changed within an allowable range in the vertical direction when seen in a front view in the same manner as the fine change described in the first embodiment.

In the first embodiment, a description has been given of a case where an instruction for starting the measurement by the measurement unit is invalidated in spite of the turn-on state of the imaging measurement button 90A until the panoramic imaging measurement process is terminated after the measurement success flag is turned on, but the technique of this disclosure is not limited thereto. For example, a switch (not shown) is provided between an LD driver 34 and an LD 30, and the switch between the LD driver 34 and the LD 30 may be turned off only in a case where the measurement success flag is turned on even in a case where the instruction for starting the measurement by the measurement unit is valid.

In the first embodiment, a description has been given of a measurement prohibition process of prohibiting the measurement by the measurement unit (see steps 228, 242, and 246 illustrated in FIG. 12) in a case where the measurement success flag is turned on, but the technique of this disclosure is not limited thereto. For example, a process of suppressing the measurement by the measurement unit performed on a subject within an imaging range 115 of which the imaging has not been performed, among the plurality of imaging ranges 115, may be adopted.

An example of a process of suppressing the measurement by the measurement unit is a process of reducing the number of times of measurement by the measurement unit. An example of a process of reducing the number of times of measurement by the measurement unit is a process of causing the measurement unit to perform the measurement of a distance to a subject with respect to a plurality of number of times (for example, three times) of imaging which is determined in advance.

Another example of a process of suppressing the measurement by the measurement unit is a process of reducing the emission intensity of a laser beam to a level at which reflected light of the laser beam cannot be received.

In the first embodiment, a description has been given of a case where a panoramic image is generated on the basis of a still image obtained by imaging a subject included in each of the plurality of imaging ranges 115 which are arranged in the vertical direction when seen in a front view with respect to the subject, but the technique of this disclosure is not limited thereto. For example, a panoramic image may be generated on the basis of a still image obtained by imaging a subject included in each of the plurality of imaging ranges 115, while moving the position of the imaging range 115 in the lateral direction when seen in a front view with respect to the subject. In addition, a panoramic image may be generated on the basis of a still image obtained by imaging a subject within each imaging range 115, while moving the position of the imaging range 115 in the vertical direction when seen in a front view with respect to the subject and the lateral direction, in accordance with a predetermined rule.

In the first embodiment, a description has been given of a case where the measurement by the measurement unit is executed with a subject, included in each of all of the imaging ranges 115 used in imaging for a still image until the measurement success flag is turned on, as a measurement target, but the technique of this disclosure is not limited thereto. For example, the measurement by the measurement unit may be executed with subjects, included in some imaging ranges 115 among all of the imaging ranges 115 used in imaging for a still image until the measurement success flag is turned on, as measurement targets.

In the first embodiment, a description has been given of a case where the panoramic imaging measurement process is continued until imaging for a still image with respect to a subject within the last imaging range 115 determined within the range $R_1$ is terminated, but the technique of this disclosure is not limited thereto. For example, the panoramic imaging measurement process may be continued until imaging for a still image with respect to a subject included in each of all of the imaging ranges 115 determined in the first half of the range within the range $R_1$ is terminated. In this case, in a case where the measurement success flag is turned on in the panoramic imaging measurement process performed with respect to the first half of the range within the range $R_1$, only panoramic imaging may be performed without executing distance measurement in the second half of the range within the range $R_1$.

Second Embodiment

In the first embodiment, a description has been given of a case where the change of the position of the imaging range 115 is realized without depending on a user's manual operation, but a description will be given of a case where the change of the position of an imaging range 115 is realized in accordance with a user's operation with respect to a rotary switch, in a second embodiment. Meanwhile, in the second embodiment, the same components as those described in the first embodiment will be denoted by the same reference numerals and signs, and a description thereof will be omitted.

A distance measurement device 10B according to the second embodiment is different from the distance measurement device 10A in that the distance measurement device 10B includes a distance measurement device main body 10B1 instead of the distance measurement device main body 10A1, as illustrated in FIGS. 1 to 4 as an example. The distance measurement device main body 10B1 is different from the distance measurement device main body 10A1 in that the distance measurement device main body 10B1 includes an imaging device 150 instead of the imaging device 14. The imaging device 150 is different from the imaging device 14 in that the imaging device 150 includes an imaging device main body 152 instead of the imaging device main body 18.

As illustrated in FIG. 5 as an example, the imaging device main body 152 is different from the imaging device main body 18 in that the imaging device main body 152 includes a main control unit 154 instead of the main control unit 62. As illustrated in FIG. 9 as an example, the main control unit 154 is different from the main control unit 62 in that a panoramic imaging measurement program 105B is stored in the secondary storage unit 104, instead of the panoramic imaging measurement program 105A.

A CPU 100 executes the panoramic imaging measurement program 105B to be operated as an acquisition unit 110B and an execution unit 112B, as illustrated in FIG. 10 as an example. The acquisition unit 110B corresponds to the acquisition unit 110A described in the first embodiment, and the execution unit 112B corresponds to the execution unit 112A described in the first embodiment. Meanwhile, in the second embodiment, for convenience of description, with regard to the acquisition unit 110B and the execution unit 112B, differences from the acquisition unit 110A and the execution unit 112A described in the first embodiment will be described.

Next, a panoramic imaging measurement process realized by executing the panoramic imaging measurement program 105B by the CPU 100 will be described with reference to FIGS. 29 to 33, as the operation of portions of the distance measurement device 10B according to the technique of this disclosure. Meanwhile, the same steps as the steps included in the panoramic imaging measurement process (FIGS. 12 to 15) described in the first embodiment will be denoted by the same step numbers, and a description thereof will be omitted.

Figure 30:
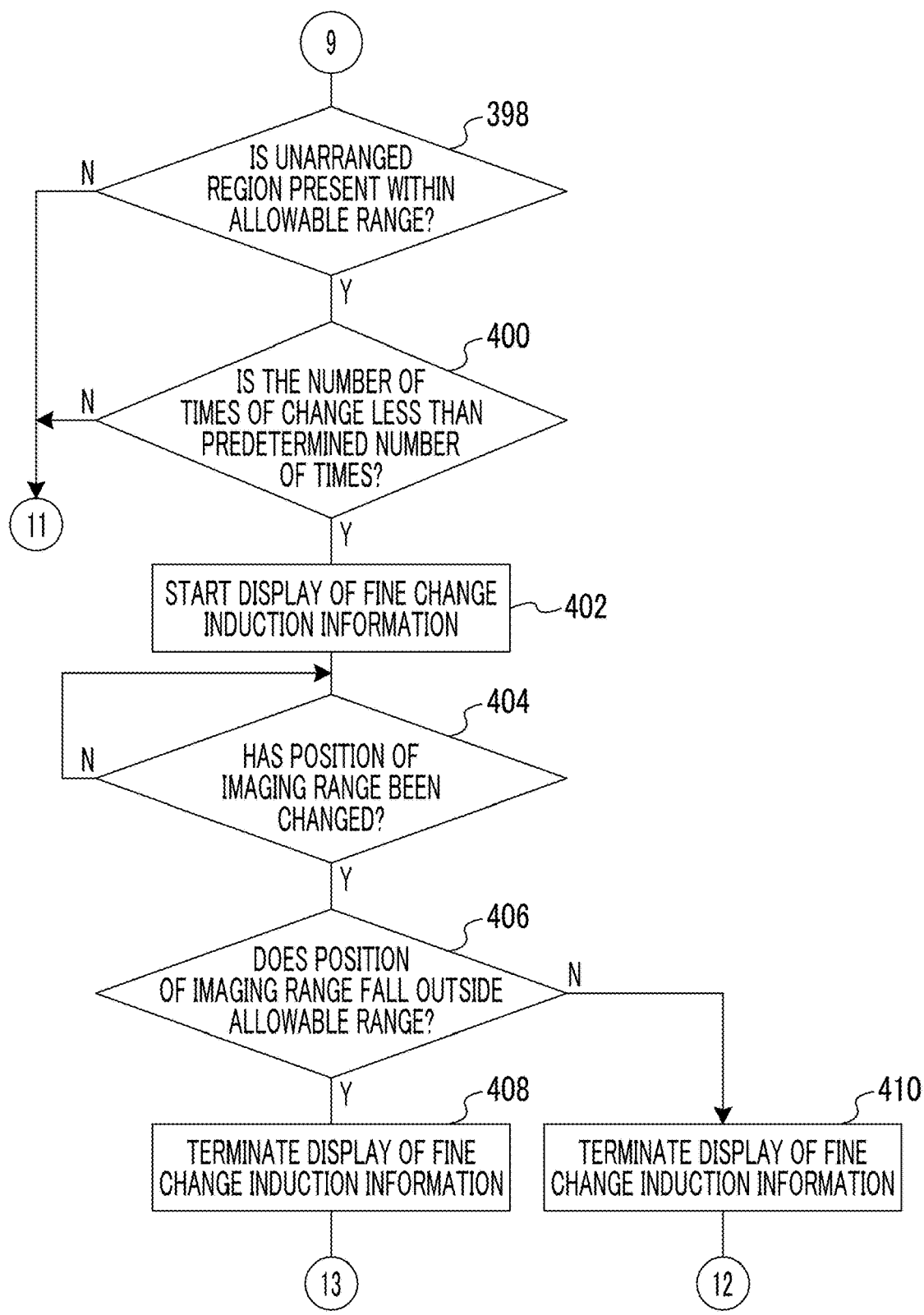
FIG. 30 is the continuation of the flowchart illustrated in FIG. 29.
Figure 31:
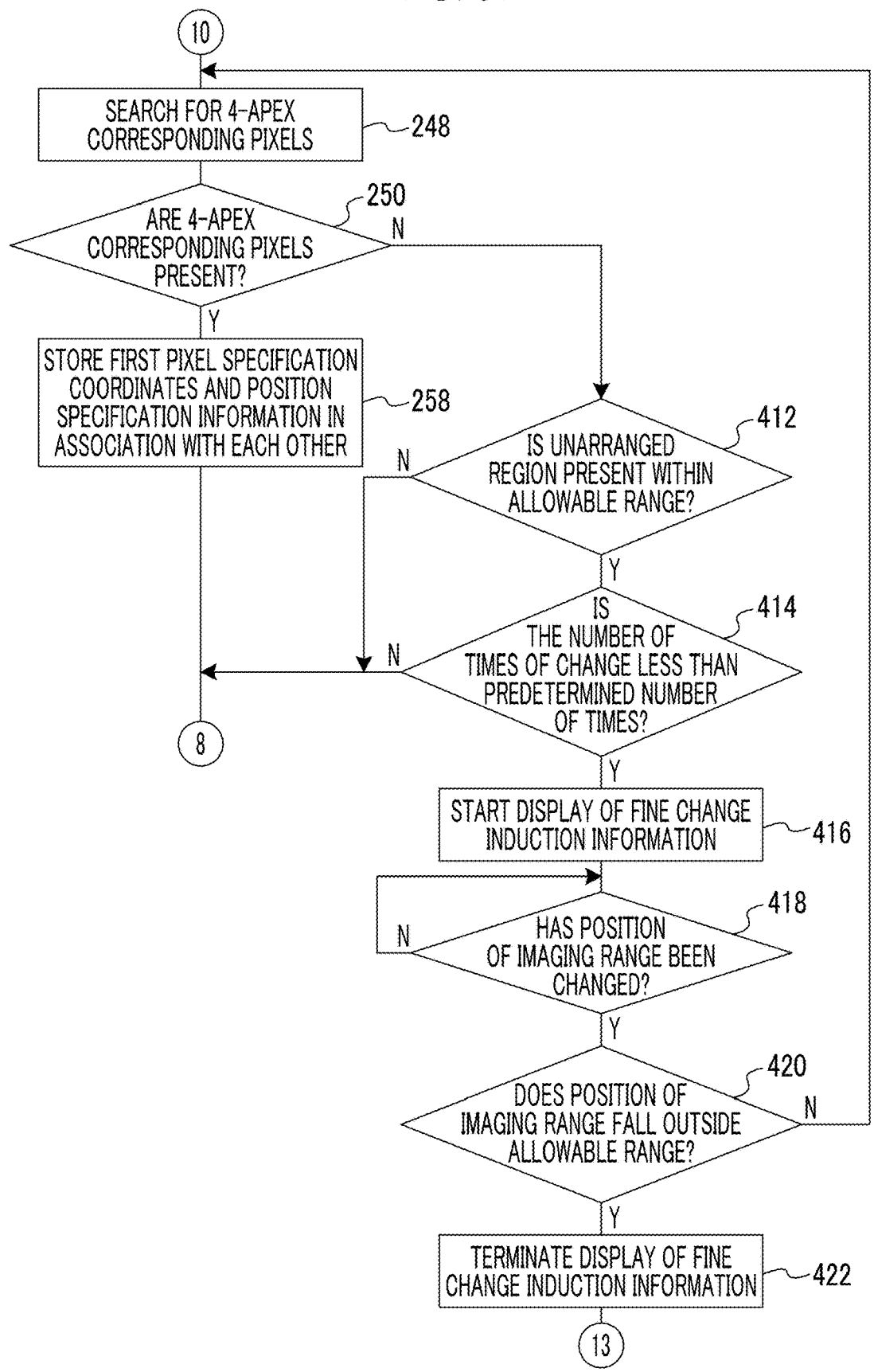
FIG. 31 is the continuation of the flowchart illustrated in FIG. 29.

As illustrated in FIG. 30 as an example, the panoramic imaging measurement process according to the second embodiment is different from the panoramic imaging measurement process according to the first embodiment in that steps 398 to 410 are provided instead of steps 214 and 216. In addition, as illustrated in FIG. 31 as an example, the panoramic imaging measurement process according to the second embodiment is different from the panoramic imaging measurement process according to the first embodiment in that steps 412 to 422 are provided instead of steps 254 and 256.

Figure 32:
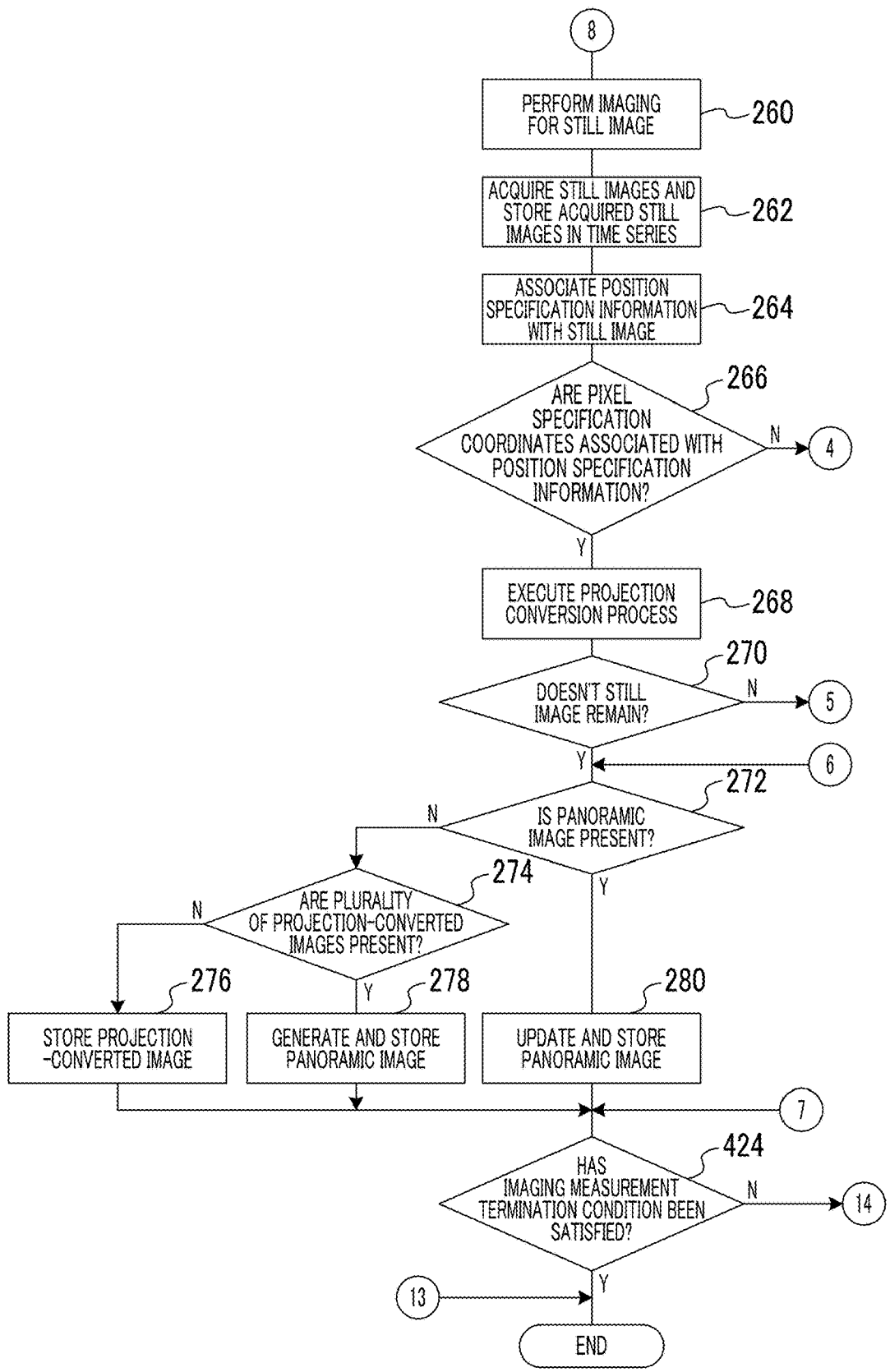
FIG. 32 is the continuation of the flowchart illustrated in FIGS. 29 to 31.
Figure 33:
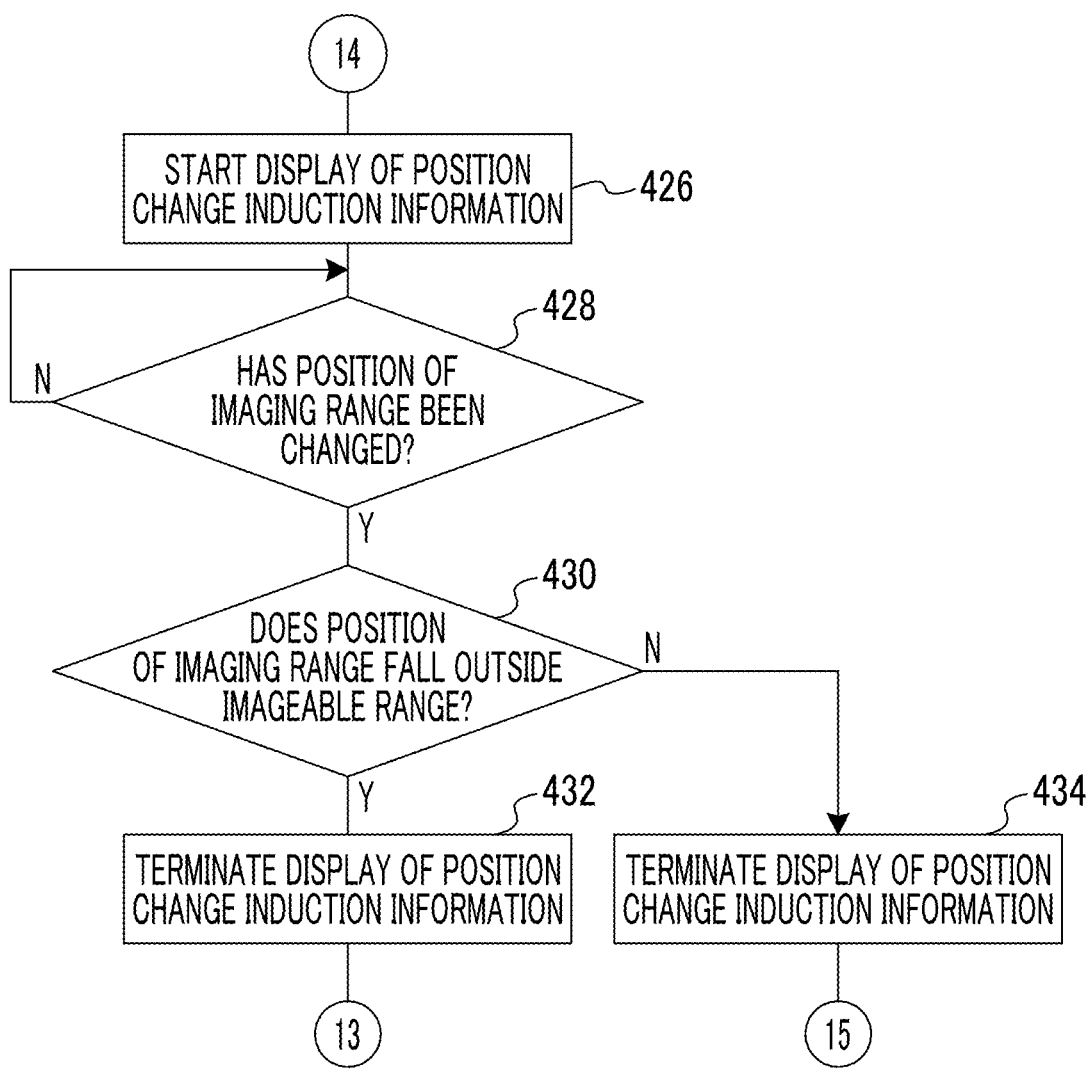
FIG. 33 is the continuation of the flowchart illustrated in FIG. 32.

In addition, as illustrated in FIG. 32 as an example, the panoramic imaging measurement process according to the second embodiment is different from the panoramic imaging measurement process according to the first embodiment in that step 424 is provided instead of step 296. Further, as illustrated in FIG. 33 as an example, the panoramic imaging measurement process according to the second embodiment is different from the panoramic imaging measurement process according to the first embodiment in that steps 426 to 434 are provided instead of step 298.

In step 398 illustrated in FIG. 30, the execution unit 112B determines whether or not a non-arrangement region is present within an allowable range. In step 398, in a case where a non-arrangement region is not present within the allowable range, the determination result is negative, and the process proceeds to step 220 illustrated in FIG. 29. In step 398, in a case where a non-arrangement region is present within the allowable range, the determination result is positive, and the process proceeds to step 400.

In step 400, the execution unit 112B determines whether or not the number of times of the change of the position of the imaging range 115 within the allowable range is less than a predetermined number of times (for example, 10 times) with respect to the present imaging range 115. In step 400, in a case where the number of times of the change of the position of the imaging range 115 within the allowable range reaches the predetermined number of times with respect to the present imaging range 115, the determination result is negative, and the process proceeds to step 220 illustrated in FIG. 29. In step 400, in a case where the number of times of the change of the position of the imaging range 115 within the allowable range is less than the predetermined number of times with respect to the present imaging range 115, the determination result is positive, and the process proceeds to step 402.

Figure 34:
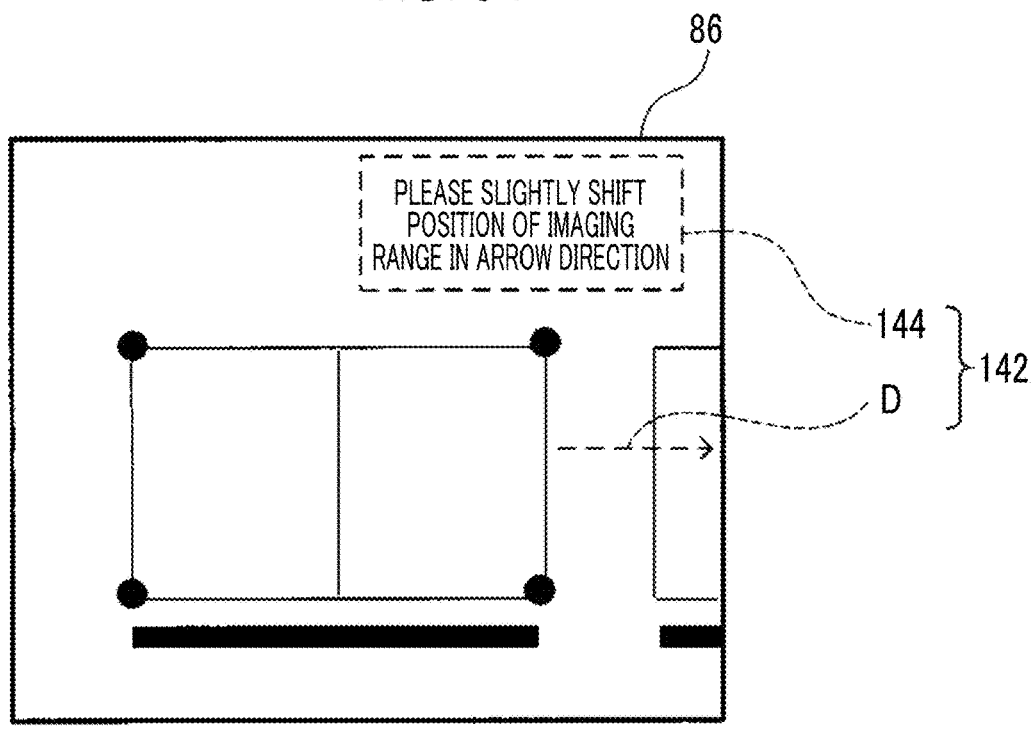
FIG. 34 is a schematic screen view illustrating an example of a screen on which a live view image showing a subject within the imaging range illustrated in FIG. 16 and fine change induction information are displayed.

In step 402, the execution unit 112B causes a display unit 86 to start the display of fine change induction information 142 within a display region of a live view image as illustrated in FIG. 34 as an example, and then the process proceeds to step 404.

The fine change induction information 142 is information including a fine change induction message 144 and an arrow D. In the example illustrated in FIG. 34, a message of "please slightly shift position of imaging range in arrow direction" is shown as the fine change induction message 144. In the example illustrated in FIG. 34, the arrow D indicates a non-arrangement direction.

In addition, the arrow D has a function of an indicator. That is, the arrow D becomes smaller as the position of the imaging range 115 becomes closer to the boundary of the allowable range, and becomes larger as the position of the imaging range 115 becomes distant from the boundary of the allowable range. In other words, the arrow D becomes smaller as the center of the imaging range 115 becomes distant from a center line CL illustrated in FIG. 16 within the allowable range, and becomes larger as the center of the imaging range 115 becomes closer to the center line CL illustrated in FIG. 16 within the allowable range.

In the example illustrated in FIG. 34, a description has been given of a case where the fine change induction information 142 is visibly displayed, but audible display such as the output of a sound using a sound reproducing device (not shown) or permanent visible display such as the output of printed matter using a printer may be performed instead of the visible display or may be performed in combination.

In step 404, the execution unit 112B determines whether or not the position of the imaging range 115 has been changed. Meanwhile, in the second embodiment, the change of the position of the imaging range 115 is realized by operating a change mechanism 11 in accordance with the user's operation with respect to the rotary switch.

In step 404, in a case where the position of the imaging range 115 has not been changed, the determination result is negative, and the determination in step 404 is performed again. In step 404, in a case where the position of the imaging range 115 has been changed, the determination result is positive, and the process proceeds to step 406.

In step 406, the execution unit 112B determines whether or not the position of the imaging range 115 falls outside an allowable range. In step 406, in a case where the position of the present imaging range 115 falls outside the allowable range, the determination result is positive, and the process proceeds to step 408. In step 406, in a case where the position of the present imaging range 115 falls within the allowable range, the determination result is negative, and the process proceeds to step 410.

In step 408, the execution unit 112B causes the display unit 86 to terminate the display of the fine change induction information 142, and then the panoramic imaging measurement process is terminated.

Figure 29:
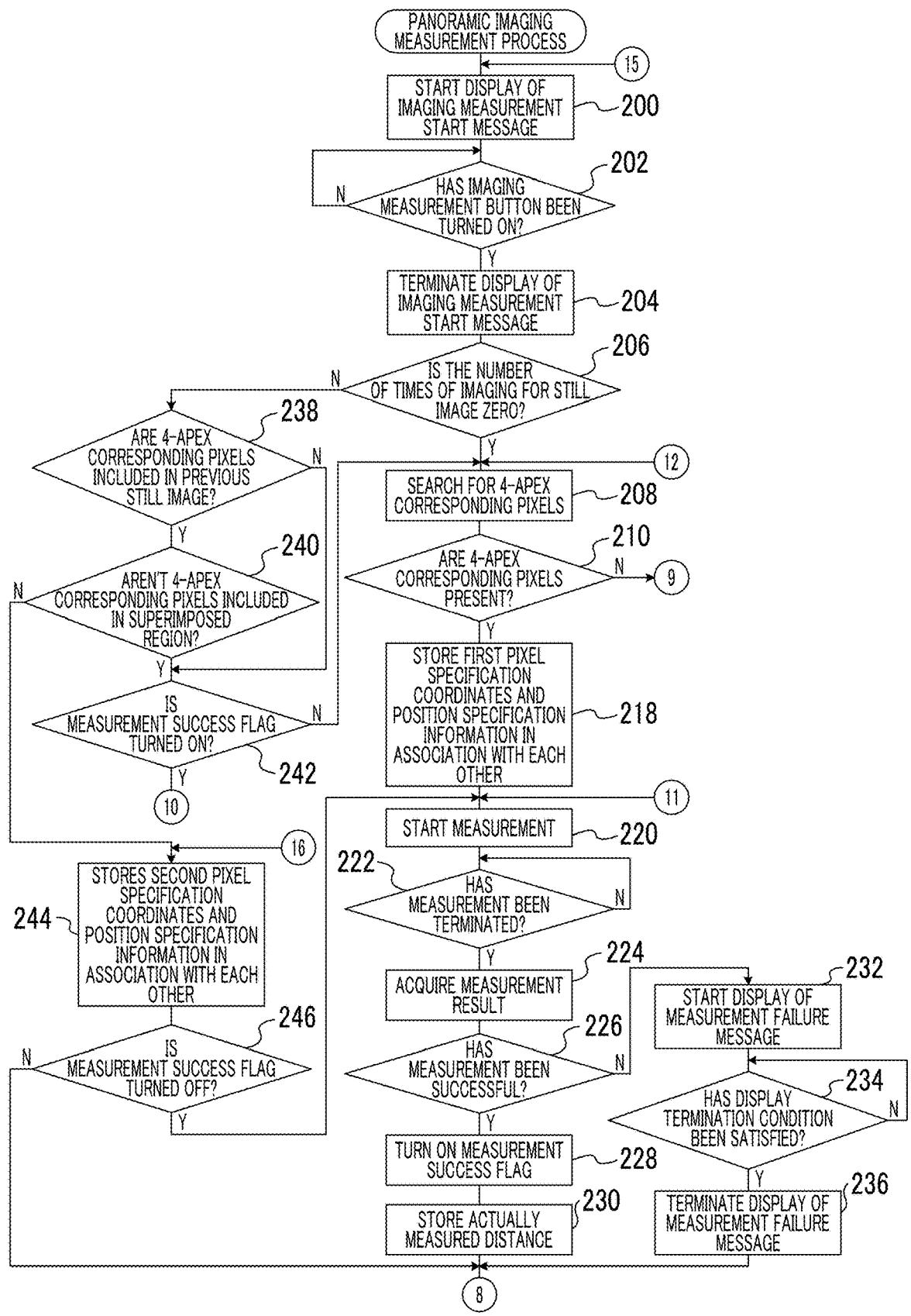
FIG. 29 is a flowchart illustrating an example of a flow of a panoramic imaging measurement process according to the second embodiment.

In step 410, the execution unit 112B causes the display unit 86 to terminate the display of the fine change induction information 142, and then the process proceeds to step 208 illustrated in FIG. 29.

In step 412 illustrated in FIG. 31, the execution unit 112B determines whether or not a non-arrangement region is present within an allowable range. In step 412, in a case where a non-arrangement region is not present within the allowable range, the determination result is negative, and the process proceeds to step 260 illustrated in FIG. 32. In step 412, in a case where a non-arrangement region is present within the allowable range, the determination result is positive, and the process proceeds to step 414.

In step 414, the execution unit 112B determines whether or not the number of times of the change of the position of the imaging range 115 within the allowable range is less than a predetermined number of times (for example, 10 times) with respect to the present imaging range 115. In step 414, in a case where the number of times of the change of the position of the imaging range 115 within the allowable range reaches the predetermined number of times with respect to the present imaging range 115, the determination result is negative, and the process proceeds to step 260 illustrated in FIG. 32. In step 414, in a case where the number of times of the change of the position of the imaging range 115 within the allowable range is less than the predetermined number of times with respect to the present imaging range 115, the determination result is positive, and the process proceeds to step 416.

In step 416, the execution unit 112B causes the display unit 86 to start the display of the fine change induction information 142 within a display region of a live view image as illustrated in FIG. 34 as an example, and then the process proceeds to step 418.

In step 418, the execution unit 112B determines whether or not the position of the imaging range 115 has been changed. In step 418, in a case where the position of the imaging range 115 has not been changed, the determination result is negative, and the determination in step 418 is performed again. In step 418, in a case where the position of the imaging range 115 has been changed, the determination result is positive, and the process proceeds to step 420.

In step 420, the execution unit 112B determines whether or not the position of the imaging range 115 falls outside an allowable range. In step 420, in a case where the position of the present imaging range 115 falls outside the allowable range, the determination result is positive, and the process proceeds to step 422. In step 420, in a case where the position of the present imaging range 115 falls within the allowable range, the determination result is negative, and the process proceeds to step 248.

In step 422, the execution unit 112B causes the display unit 86 to terminate the display of the fine change induction information 142, and then the panoramic imaging measurement process is terminated.

In step 424 illustrated in FIG. 32, the execution unit 112B determines whether or not an imaging measurement termination condition has been satisfied. Meanwhile, the imaging measurement termination condition according to the second embodiment may be the same as or different from the imaging measurement termination condition described in the first embodiment.

In step 424, in a case where the imaging measurement termination condition has not been satisfied, the determination result is negative, and the process proceeds to step 426 illustrated in FIG. 33.

Figure 35:
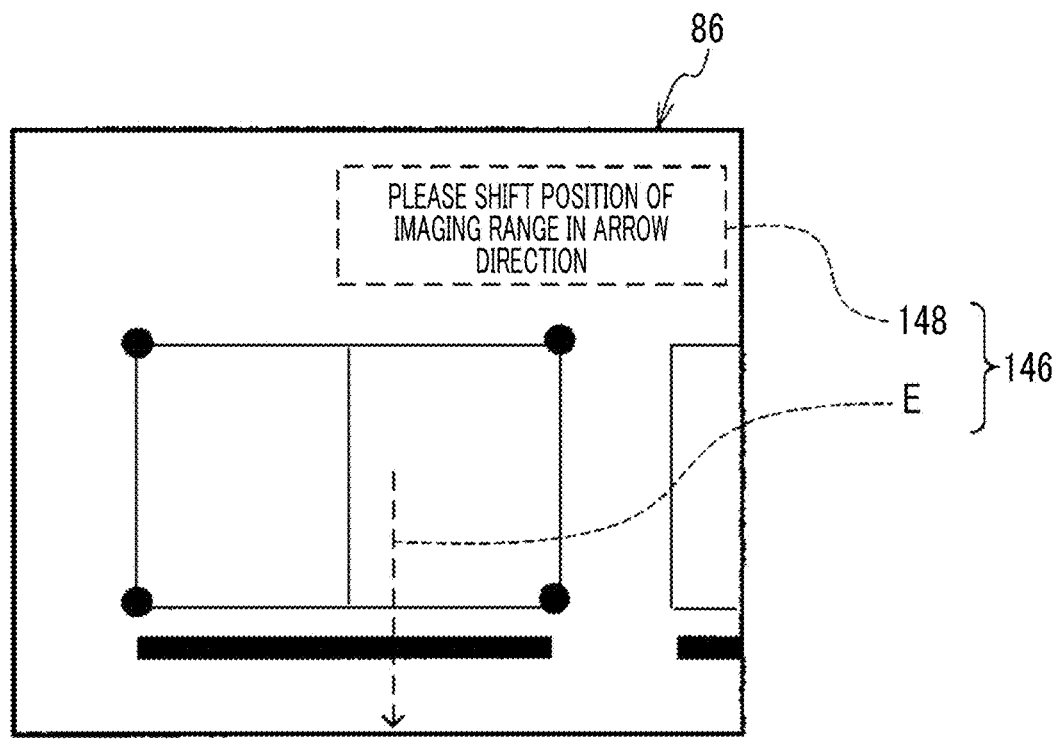
FIG. 35 is a schematic screen view illustrating an example of a screen on which a live view image showing a subject within the imaging range illustrated in FIG. 16 and position change induction information are displayed.

In step 426 illustrated in FIG. 33, the execution unit 112B causes the display unit 86 to start the display of position change induction information 146 as illustrated in FIG. 35 as an example, and then the process proceeds to step 428.

The position change induction information 146 is information including a position change induction message 148 and an arrow E. In the example illustrated in FIG. 35, a message of "please shift position of imaging range in arrow direction" is shown as the position change induction message 148. In the example illustrated in FIG. 35, the arrow E indicates the direction of the position of the imaging range 115 used in imaging for a still image which is expected to be performed next, as imaging for a still image which is required in panoramic imaging.

In addition, the arrow E has a function of an indicator. That is, the arrow E becomes smaller as the position of the imaging range 115 becomes closer to the boundary of an imageable range, and becomes larger as the position of the imaging range 115 becomes distant from the boundary of the imageable range. Meanwhile, the imageable range refers to a range in which panoramic imaging can be performed. The range in which panoramic imaging can be performed refers to, for example, a range which is within an allowable range and continuity with the present imaging range 115 is secured in a direction of the arrow A illustrated in FIG. 16.

In addition, the example illustrated in FIG. 35 shows a case where the position change induction information 146 is visibly displayed, but audible display such as the output of a sound using a sound reproducing device (not shown) or permanent visible display such as the output of printed matter using a printer may be performed instead of the visible display or may be performed in combination.

In step 428, the execution unit 112B determines whether or not the position of the imaging range 115 has been changed. In step 428, in a case where the position of the imaging range 115 has not been changed, the determination result is negative, and the determination in step 428 is performed again. In step 428, in a case where the position of the imaging range 115 has been changed, the determination result is positive, and the process proceeds to step 430.

In step 430, the execution unit 112B determines whether or not the position of the imaging range 115 falls outside an imageable range. In step 430, in a case where the position of the imaging range 115 falls outside the imageable range, the determination result is positive, and the process proceeds to step 432. In step 430, in a case where the position of the imaging range 115 falls within the imageable range, the determination result is negative, and the process proceeds to step 434.

In step 432, the execution unit 112B causes the display unit 86 to terminate the display of the position change induction information 146, and then the panoramic imaging measurement process according to the second embodiment is terminated.

In step 434, the execution unit 112B causes the display unit 86 to terminate the display of the position change induction information 146, and then the process proceeds to step 200 illustrated in FIG. 29.

In step 424 illustrated in FIG. 32, in a case where the imaging measurement termination condition has been satisfied, the determination result is positive, and the panoramic imaging measurement process according to the second embodiment is terminated.

As described above, in the distance measurement device 10B, in a case where a measurement result acquired by the acquisition unit 110B indicates that the measurement by the measurement unit has been successful (step 226: Y), a measurement success flag is turned on, and thus the measurement by the measurement unit is suppressed (step 246: N).

Therefore, similar to the distance measurement device 10A described in the first embodiment, according to the distance measurement device 10B, it is possible to suppress unnecessary measurement, as compared to a case where a distance to a subject is measured once with respect to each of all imaging required in one panoramic imaging.

In the distance measurement device 10B, in a case where a rotary switch is operated by the user in a state where the fine change induction information 142 is displayed (step 416), the position of the imaging range 115 is changed in accordance with the operation of the rotary switch (step 418: Y). Therefore, according to the distance measurement device 10B, it is possible to move the position of the imaging range 115 to the user's intended position within an allowable range.

Further, in the distance measurement device 10B, in a case where the rotary switch is operated by the user in a state where the position change induction information 146 is displayed (step 426) in a case where imaging is terminated, the position of the imaging range 115 is changed in accordance with the operation of the rotary switch (step 428: Y). Therefore, according to the distance measurement device 10B, it is possible to move the position of the imaging range 115 to a position where the next imaging for a still image is expected to be performed, at the user's intended timing.

Figure 36:
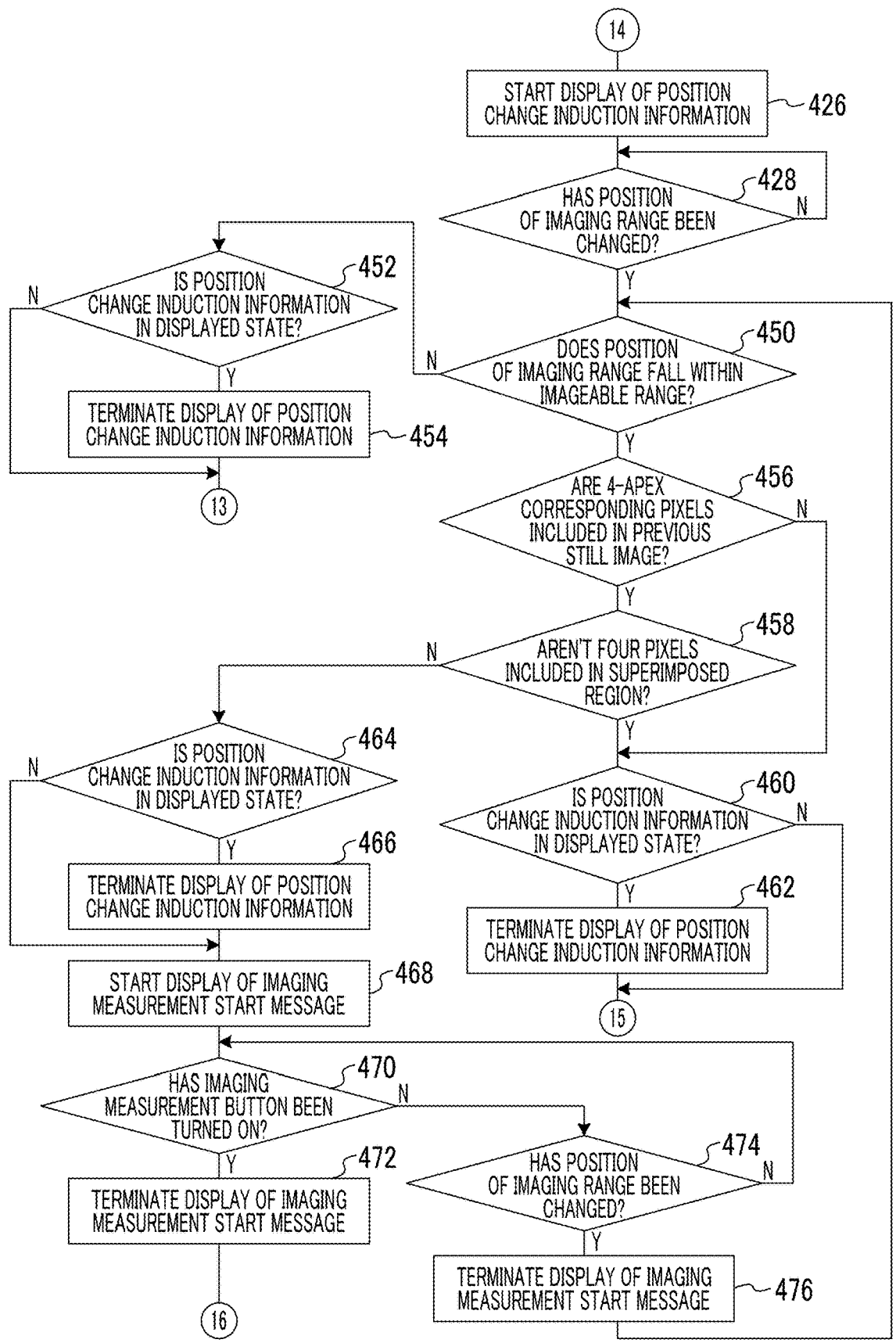
FIG. 36 is a flowchart illustrating a flow (a flow of the processing illustrated in FIG. 33) of a portion of the panoramic imaging measurement process according to a modification example of the second embodiment.

Meanwhile, in the second embodiment, a description has been given of a case where the process simply proceeds to step 200 illustrated in FIG. 29 in a case where the execution of the processing of step 434 illustrated in FIG. 33 is terminated, but the technique of this disclosure is not limited thereto. As illustrated in FIG. 36 as an example, steps 450 to 476 may be applied instead of steps 430 to 434 illustrated in FIG. 33. Meanwhile, in a case where steps 450 to 476 illustrated in FIG. 36 are applied instead of steps 430 to 434 illustrated in FIG. 33, steps 238 and 240 illustrated in FIG. 29 may be left as they are or may be removed.

In step 450 illustrated in FIG. 36, the execution unit 112B determines whether or not the position of the imaging range 115 falls within an imageable range. In step 450, in a case where the position of the imaging range 115 falls outside the imageable range, the determination result is negative, and the process proceeds to step 452. In step 450, in a case where the position of the imaging range 115 falls within the imageable range, the determination result is positive, and the process proceeds to step 456.

In step 452, the execution unit 112B determines whether or not the position change induction information 146 is in a displayed state. In step 452, in a case where the position change induction information 146 is in a displayed state, the determination result is positive, and the process proceeds to step 454. In step 452, in a case where the position change induction information 146 is not in a displayed state, the determination result is negative, and the panoramic imaging measurement process is terminated.

In step 454, the execution unit 112B causes the display unit 86 to terminate the display of the position change induction information 146, and then the panoramic imaging measurement process is terminated.

In step 456, the execution unit 112B determines whether or not the 4-apex corresponding pixels described in the first embodiment are included in the previous still image described in the first embodiment. In step 456, in a case where the 4-apex corresponding pixels are not included in the previous still image, the determination result is negative, and the process proceeds to step 460. In step 456, in a case where the 4-apex corresponding pixels are included in the previous still image, the determination result is positive, and the process proceeds to step 458.

In step 458, the execution unit 112B determines whether or not 4-apex corresponding pixels corresponding to the 4-apex corresponding pixels included in the previous still image are present in the superimposed region described in the first embodiment. In step 458, in a case where 4-apex corresponding pixels corresponding to the 4-apex corresponding pixels included in the previous still image are not present in the superimposed region, the determination result is positive, and the process proceeds to step 460. In step 458, in a case where 4-apex corresponding pixels corresponding to the 4-apex corresponding pixels included in the previous still image are present in the superimposed region, the determination result is negative, and the process proceeds to step 464.

In step 460, the execution unit 112B determines whether or not the position change induction information 146 is in a displayed state. In step 460, in a case where the position change induction information 146 is in a displayed state, the determination result is positive, and the process proceeds to step 462. In step 460, in a case where the position change induction information 146 is not in a displayed state, the determination result is negative, and the process proceeds to step 200 illustrated in FIG. 29.

In step 462, the execution unit 112B causes the display unit 86 to terminate the display of the position change induction information 146, and then the process proceeds to step 200 illustrated in FIG. 29.

In step 464, the execution unit 112B determines whether or not the position change induction information 146 is in a displayed state. In step 464, in a case where the position change induction information 146 is in a displayed state, the determination result is positive, and the process proceeds to step 466. In step 464, in a case where the position change induction information 146 is not in a displayed state, the determination result is negative, and the process proceeds to step 468.

In step 466, the execution unit 112B causes the display unit 86 to terminate the display of the position change induction information 146, and then the process proceeds to step 468.

In step 468, the execution unit 112B causes the display unit 86 to start the display of an imaging measurement start message 134 within a display region of a live view image as illustrated in FIG. 19 as an example, and then the process proceeds to step 470.

Meanwhile, the processing of step 468 is an example of a second display process according to the technique of this disclosure. In the step 468, the imaging measurement start message 134 is described. However, the technique of this disclosure is not limited thereto, and any information may be adopted as long as the information is imaging start timing information which is information indicating a timing when the imaging of a subject is started.

In step 470, the execution unit 112B determines whether or not an imaging measurement button 90A has been turned on. In step 470, in a case where the imaging measurement button 90A has not been turned on, the determination result is negative, and the process proceeds to step 474. In step 470, in a case where the imaging measurement button 90A has been turned on, the determination result is positive, and the process proceeds to step 472.

In step 472, the execution unit 112B causes the display unit 86 to terminate the display of the imaging measurement start message 134, and then the process proceeds to step 244 illustrated in FIG. 29.

In step 474, the execution unit 112B determines whether or not the position of the imaging range 115 has been changed. In step 474, in a case where the position of the imaging range 115 has not been changed, the determination result is negative, and the process proceeds to step 470. In step 474, in a case where the position of the imaging range 115 has been changed, the determination result is positive, and the process proceeds to step 476.

In step 476, the execution unit 112B causes the display unit 86 to terminate the display of the imaging measurement start message 134, and then the process proceeds to step 450.

As described above, according to the example illustrated in FIG. 36, in a case where the position of the imaging range 115 has been changed to a position where imaging for a still image is expected to be performed next as imaging for a still image required in panoramic imaging, it is possible to cause the measurement unit to measure a distance to a subject at the user's intended timing.

In addition, according to the example illustrated in FIG. 36, it is possible to easily make the user recognize a timing when a captured image contributing to high-precision projection conversion can be acquired, as compared to a case where the imaging measurement start message 134 is not displayed.

Figure 37:
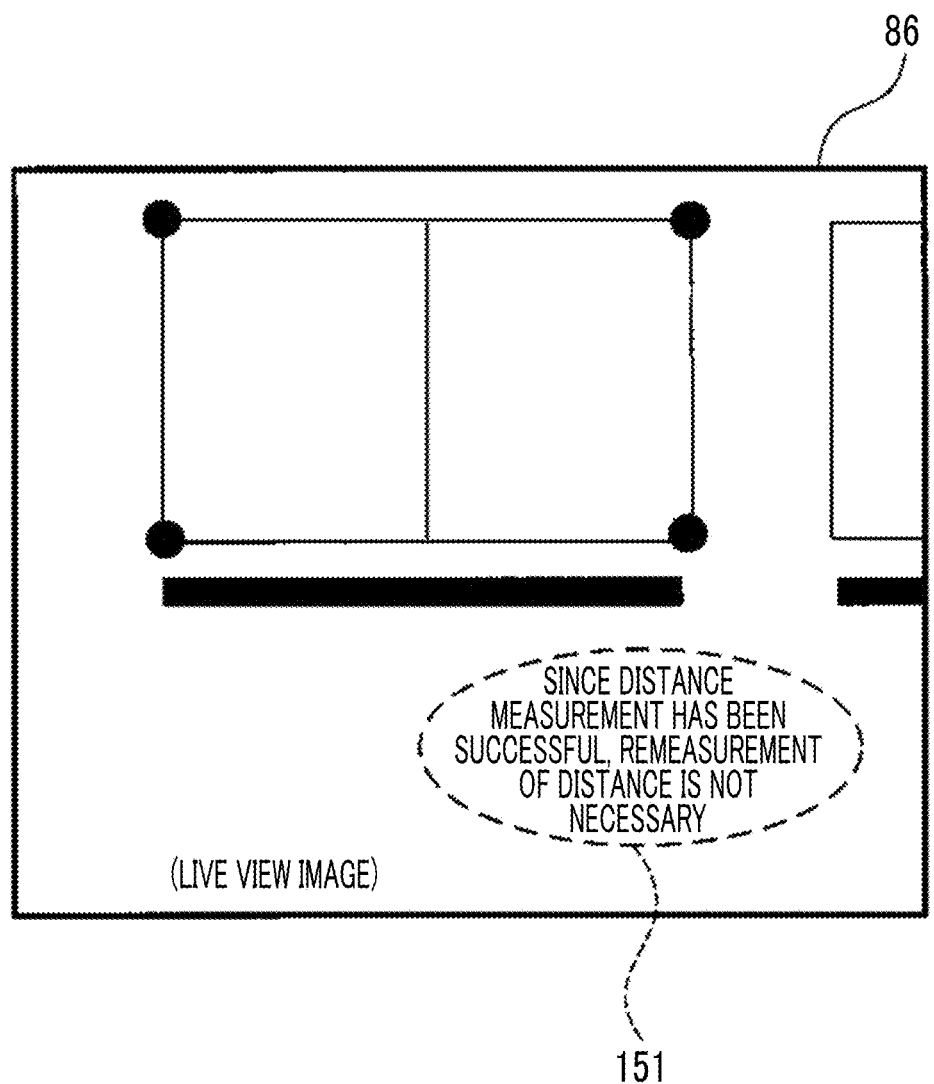
FIG. 37 is a schematic screen view illustrating an example of a screen on which a live view image showing a subject within the imaging range illustrated in FIG. 16 and measurement suppression information are displayed.

In the second embodiment, the measurement by the measurement unit is prohibited after the measurement success flag is turned on by executing the processing of step 228, but the technique of this disclosure is not limited thereto. For example, in a case where the measurement success flag is turned on without prohibiting the measurement by the measurement unit, the execution unit 112B may execute a process of causing the display unit 86 to display measurement suppression information 151 (an example of a first display process according to the technique of this disclosure), as illustrated in FIG. 37 as an example. In this case, it is possible to suppress remeasurement of a distance to a subject within the imaging range 115 used in panoramic imaging that has already been performed, as compared to a case where the measurement suppression information 151 is not displayed. Meanwhile, the measurement suppression information 151 is an example of information for prompting suppression of the measurement by the measurement unit according to the technique of this disclosure.

In addition, a process may be executed in which the measurement suppression information 151 is displayed on the display unit 86 in a case where the measurement success flag is turned on and imaging of a subject within the last imaging range 115 is terminated. In this case, it is possible to suppress unnecessary measurement, as compared to a case where a subject within the imaging range 115 having been subjected to imaging is set to be a measurement target and the measurement by the measurement unit is executed again, even though the measurement by the measurement unit has been successful and the imaging of the plurality of imaging ranges 115 has been terminated.

In the example illustrated in FIG. 37, a message of "since distance measurement has been successful, remeasurement of distance is not necessary" is shown as the measurement suppression information 151. Meanwhile, the measurement suppression information 151 illustrated in FIG. 37 is just an example. The invention is not limited thereto, and any information may be adopted as long as the information is information for prompting the user to suppress the measurement by the measurement unit which is performed on subject within the plurality of imaging ranges 115.

The example illustrated in FIG. 37 shows a case where the measurement suppression information 151 is visibly displayed, but audible display such as the output of a sound using a sound reproducing device (not shown) or permanent visible display such as the output of printed matter using a printer may be performed instead of the visible display or may be performed in combination.

In addition, a measurement suppressing process in a case where the measurement success flag is turned on and the imaging of the subject within the last imaging range 115 is terminated is not limited to a display process of displaying the measurement suppression information 151. For example, a process may be executed in which an instruction for starting distance measurement with respect to a subject within the last imaging range 115 is invalidated in a case where the instruction for starting the distance measurement is received again after the measurement success flag is turned on and the imaging with respect to the subject within the last imaging range 115 is terminated. In addition, a process may be executed in which a laser beam is emitted with such an intensity as to disable distance measurement in a case where an instruction for starting distance measurement with respect to a subject within the last imaging range 115 is received again after the measurement success flag is turned on and the imaging with respect to the subject within the last imaging range 115 is terminated.

In the second embodiment, the distance measurement device 10B has been described. However, the technique of this disclosure is not limited thereto, and a distance measurement device 10C may be adopted instead of the distance measurement device 10B, as illustrated in FIGS. 1 and 38 as an example.

Figure 38:
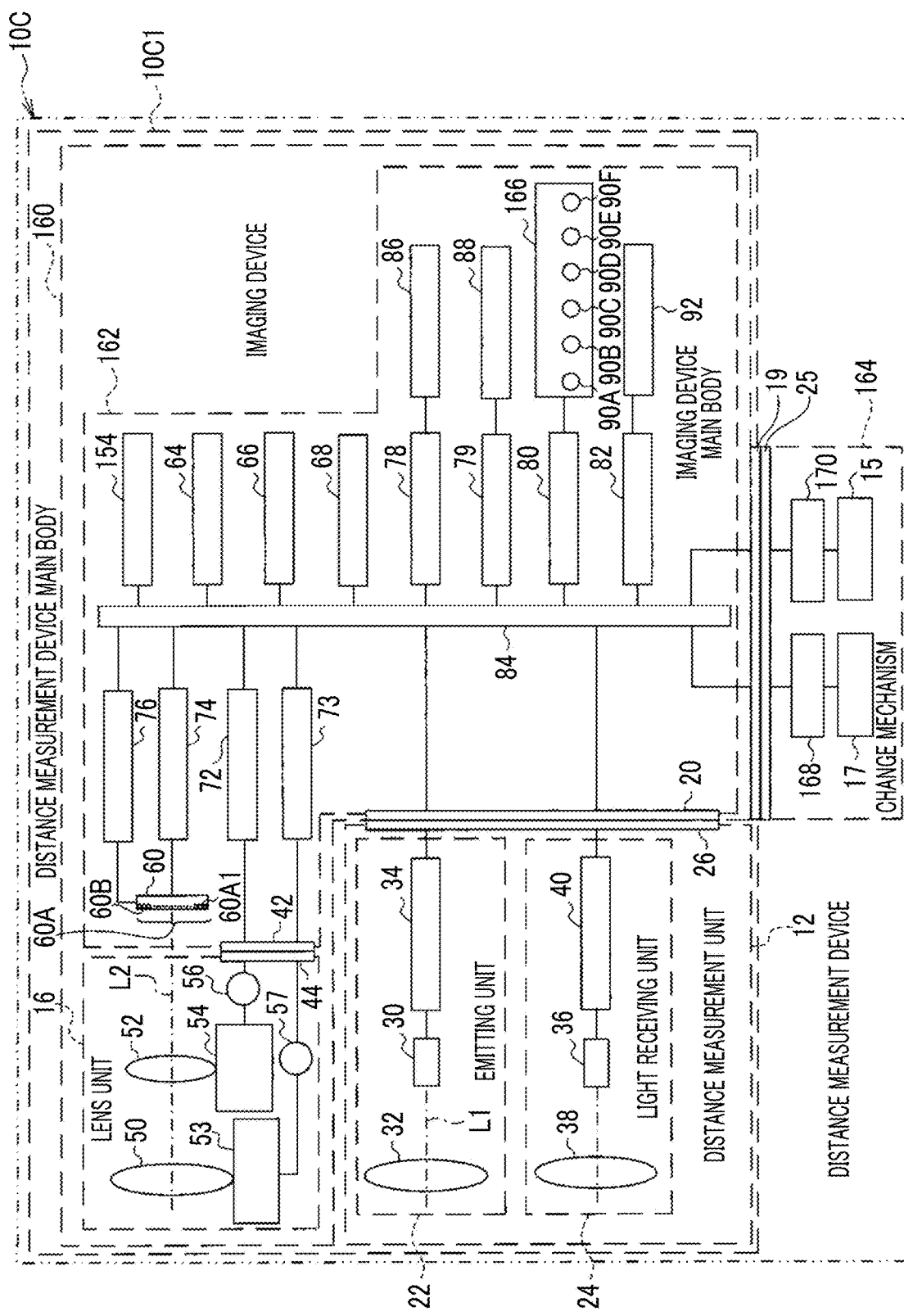
FIG. 38 is a block diagram illustrating a hardware configuration of the distance measurement device according to a first modification example of the second embodiment.

As illustrated in FIGS. 1 and 38 as an example, the distance measurement device 10C is different from the distance measurement device 10B in that the distance measurement device 10C includes a distance measurement device main body 10C1 instead of the distance measurement device main body 10B1 and includes a change mechanism 164 instead of the change mechanism 11. The distance measurement device main body 10C1 is different from the distance measurement device main body 10B1 in that the distance measurement device main body 10C1 includes an imaging device 160 instead of the imaging device 150. The imaging device 160 is different from the imaging device 150 in that the imaging device 160 includes an imaging device main body 162 instead of the imaging device main body 152.

As illustrated in FIG. 38 as an example, the imaging device main body 162 is different from the imaging device main body 152 in that the imaging device main body 162 includes a reception device 166 instead of the reception device 90. The reception device 166 is different from the reception device 90 in that the reception device 166 does not include the rotary switch for vertical rotation 90G and the rotary switch for horizontal rotation 90H. In addition, the imaging device main body 162 is different from the imaging device main body 152 in that the imaging device main body 162 does not include the motor drivers 29 and 31.

As illustrated in FIG. 38 as an example, the change mechanism 164 is different from the change mechanism 11 in that the change mechanism 164 includes a rotary encoder 168 instead of the motor 21, and includes a rotary encoder 170 instead of the motor 23.

The rotary encoder 168 is connected to a horizontal rotation mechanism 17. In addition, the rotary encoder 168 is connected to a bus line 84 through a connector 25 and a hot shoe 19. The rotary encoder 168 detects the rotation direction and the amount of rotation of a vertical rotation mechanism 15 rotated by the horizontal rotation mechanism 17. The main control unit 154 acquires the rotation direction and the amount of rotation which are detected by the rotary encoder 168.

The rotary encoder 170 is connected to the vertical rotation mechanism 15. In addition, the rotary encoder 170 is connected to the bus line 84 through the connector 25 and the hot shoe 19. The rotary encoder 170 detects the rotation direction and the amount of rotation of the distance measurement device main body 10C1 which is rotated by the vertical rotation mechanism 15. The main control unit 154 acquires the rotation direction and the amount of rotation which are detected by the rotary encoder 170.

In the distance measurement device 10B, the rotation direction and the amount of rotation of the vertical rotation mechanism 15 are specified on the basis of the rotation direction and the amount of rotation of the motor 23, and the rotation direction and the amount of rotation of the horizontal rotation mechanism 17 are specified on the basis of the rotation direction and the amount of rotation of the motor 21. On the other hand, in the distance measurement device 10C, the rotation direction and the amount of rotation of the vertical rotation mechanism 15 are specified on the basis of detection results of the rotary encoder 170, and the rotation direction and the amount of rotation of the horizontal rotation mechanism 17 are specified on the basis of detection results of the rotary encoder 168. Also in the distance measurement device 10C, position specification information is derived on the basis of the rotation directions and the amounts of rotation of the vertical rotation mechanism 15 and the horizontal rotation mechanism 17, similar to the distance measurement device 10B.

Figure 39:
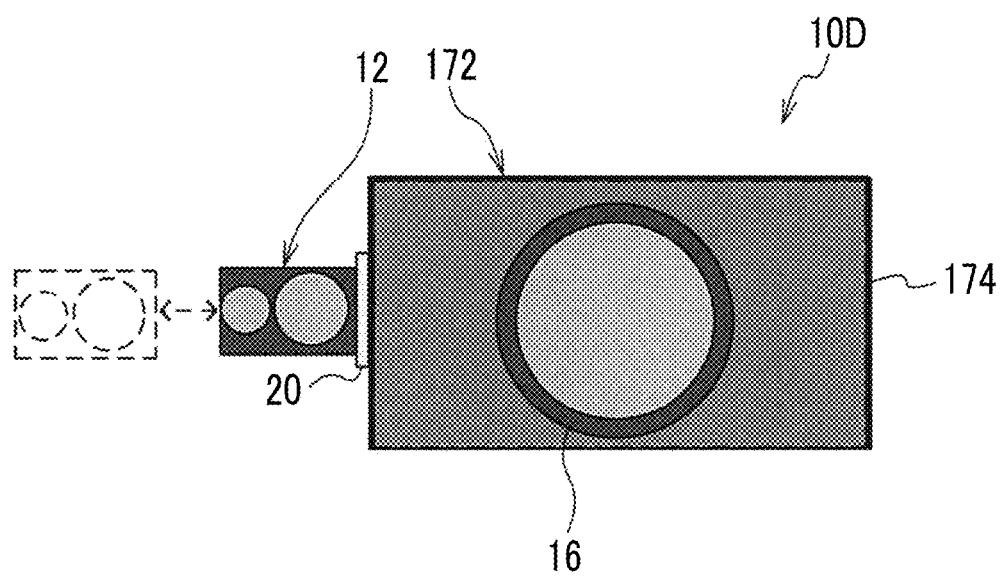
FIG. 39 is a front view illustrating the appearance of the distance measurement device according a second modification example of the second embodiment.
Figure 40:
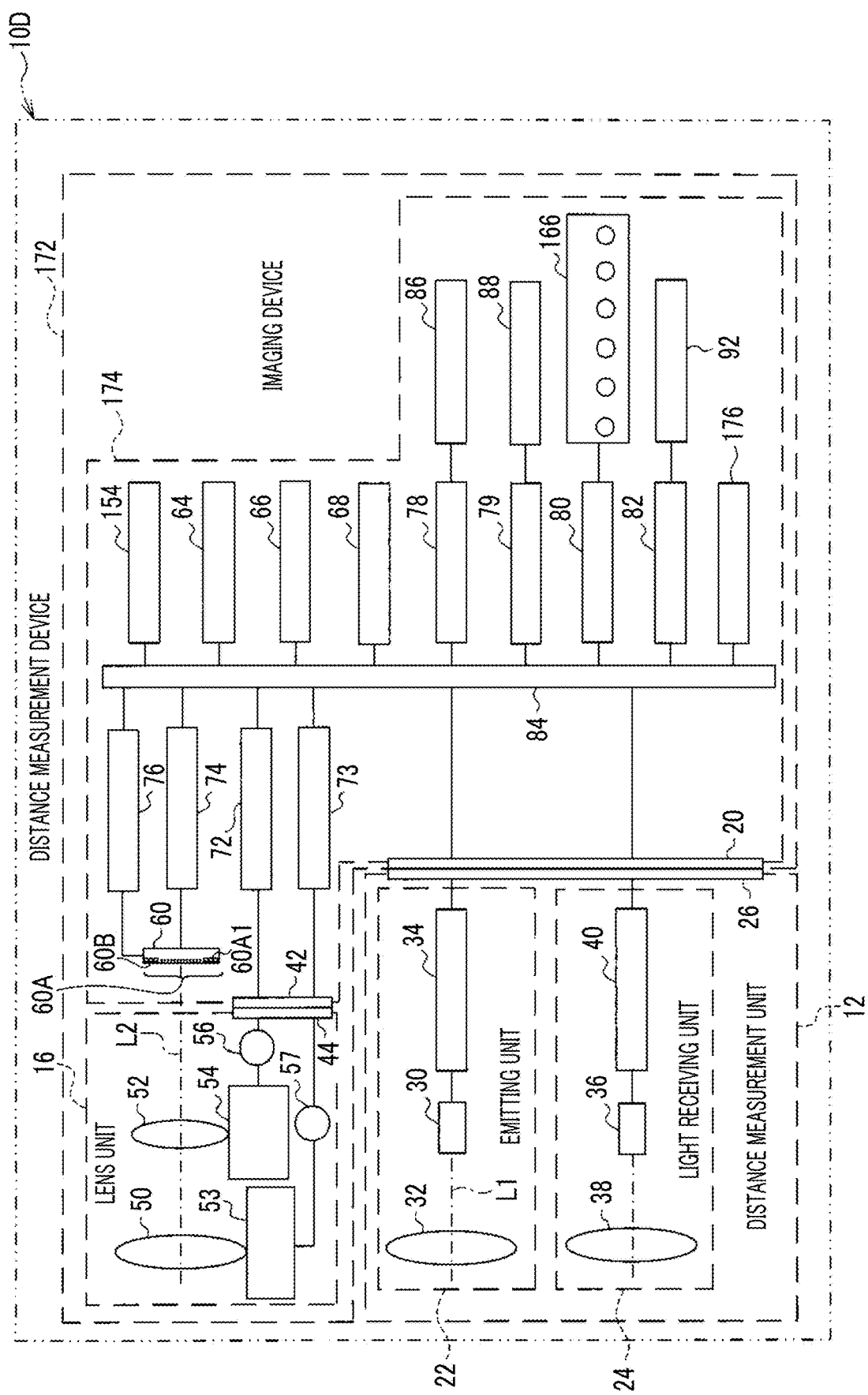
FIG. 40 is a block diagram illustrating an example of a hardware configuration of the distance measurement device illustrated in FIG. 39.

In the distance measurement device 10C illustrated in FIG. 38, position specification information is derived on the basis of detection results of the rotary encoders 168 and 170. However, the technique of this disclosure is not limited thereto, and a distance measurement device 10D illustrated in FIGS. 39 and 40 as an example may be adopted instead of the distance measurement device 10C. As illustrated in FIGS. 39 and 40 as an example, the distance measurement device 10D is different from the distance measurement device 10C in that the distance measurement device 10D includes a change mechanism 164. In addition, the distance measurement device 10D is different from the distance measurement device 10C in that the distance measurement device 10D includes an imaging device 172 instead of the imaging device 160. The imaging device 172 is different from the imaging device 160 in that the imaging device 172 includes an imaging device main body 174 instead of the imaging device main body 162. The imaging device main body 174 is different from the imaging device main body 162 in that the imaging device main body 174 includes a gyro sensor 176. The gyro sensor 176 is connected to the bus line 84, and detection results of the gyro sensor 176 are acquired by the main control unit 154.

The distance measurement device 10D is different from the distance measurement device 10C in that position specification information is derived on the basis of detection results of the rotary encoders 168 and 170 in the distance measurement device 10C, while position specification information is derived on the basis of detection results of the gyro sensor 176 in the distance measurement device 10D.

Third Embodiment

In the first embodiment, a description has been given of a case where the distance measurement device 10A is realized by the distance measurement unit 12 and the imaging device 14, but a distance measurement device 10E realized by further including a smart device 500 will be described in a third embodiment. Meanwhile, in the third embodiment, the same components as those described in the above-described embodiments will be denoted by the same reference numerals and signs, a description thereof will be omitted, and only different portions from the above-described embodiments will be described.

Figure 41:
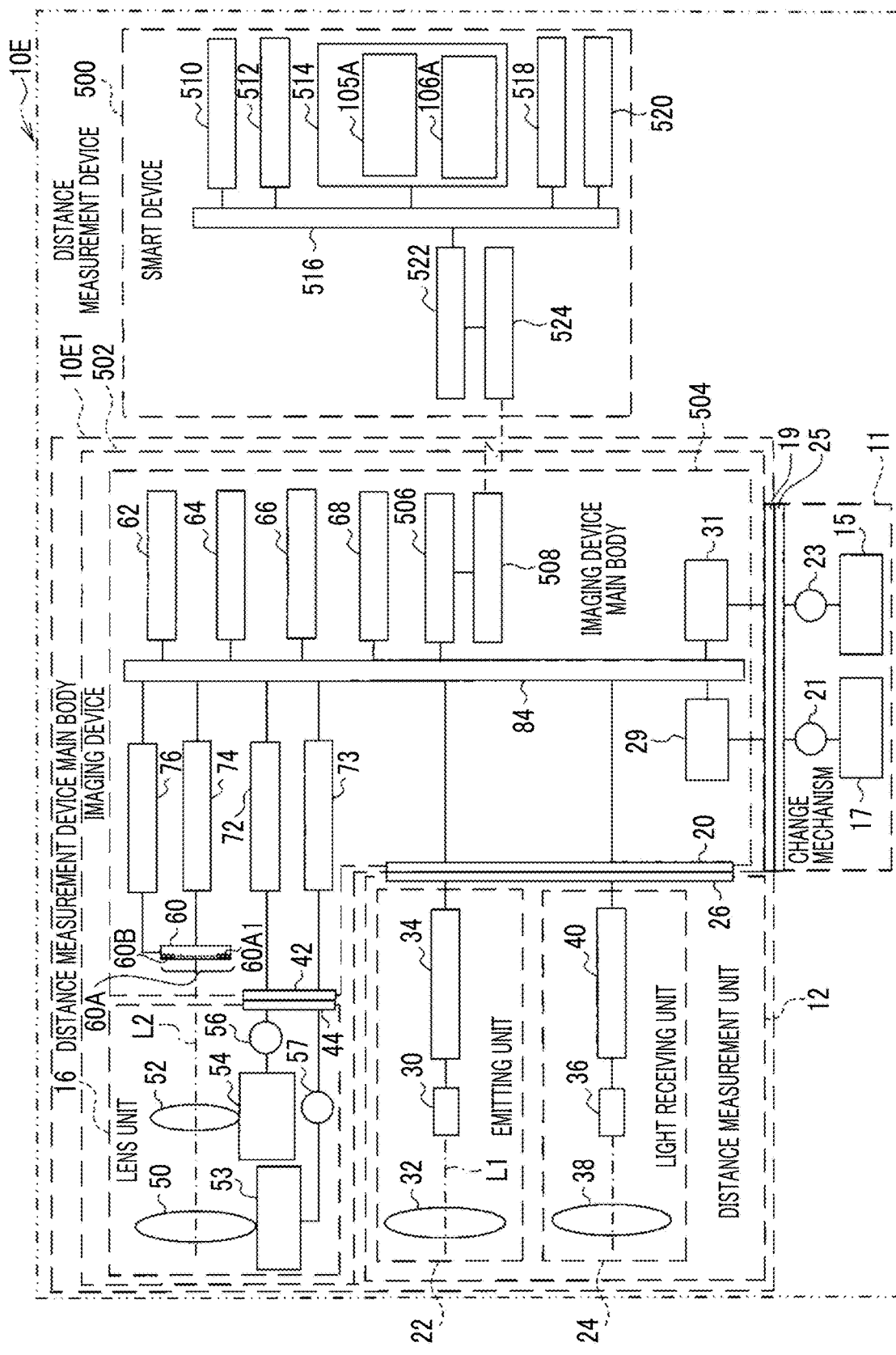
FIG. 41 is a block diagram illustrating an example of a hardware configuration of the distance measurement device according to the third embodiment.

As illustrated in FIG. 41 as an example, a distance measurement device 10E according to the third embodiment is different from the distance measurement device 10A according to the first embodiment in that the distance measurement device 10E includes a distance measurement device main body 10E1 instead of the distance measurement device main body 10A1, and includes the smart device 500. Meanwhile, the smart device 500 is an example of an information processing device according to the technique of this disclosure. In the third embodiment, the smart device 500 is described, but a Personal Computer (PC) may be adopted instead of the smart device.

The distance measurement device main body 10E1 is different from the distance measurement device main body 10A1 in that the distance measurement device main body 10E1 includes an imaging device 502 instead of the imaging device 14. The imaging device 502 is different from the imaging device 14 in that the imaging device 502 includes an imaging device main body 504 instead of the imaging device main body 18.

The imaging device main body 504 is different from the imaging device main body 18 in that the imaging device main body 504 includes a radio communication unit 506 and a radio communication antenna 508.

The radio communication unit 506 is connected to the bus line 84 and the radio communication antenna 508. The main control unit 62 outputs transmission target information, which is information to be transmitted to the smart device 500, to the radio communication unit 506.

The radio communication unit 506 transmits the transmission target information which is input from the main control unit 62 to the smart device 500 through the radio communication antenna 508 by radio waves. In a case where radio waves from the smart device 500 are received by the radio communication antenna 508, the radio communication unit 506 acquires a signal based on the received radio waves and outputs the acquired signal to the main control unit 62.

The smart device 500 includes a CPU 510, a primary storage unit 512, and a secondary storage unit 514. The CPU 510, the primary storage unit 512, and the secondary storage unit 514 are connected to the bus line 516.

The CPU 510 controls the entire distance measurement device 10E inclusive of the smart device 500. The primary storage unit 512 is a volatile memory which is used as a work area or the like during the execution of various programs. An example of the primary storage unit 512 is a RAM. The secondary storage unit 514 is a non-volatile memory that stores a control program, various parameters, or the like for controlling the overall operation of the distance measurement device 10E, inclusive of the smart device 500. An example of the secondary storage unit 514 is a flash memory or an EEPROM.

The smart device 500 includes a display unit 518, a touch panel 520, a radio communication unit 522, and a radio communication antenna 524.

The display unit 518 is connected to the bus line 516 through a display control unit (not shown), and displays various pieces of information under the control of the display control unit. Meanwhile, the display unit 518 is realized by, for example, an LCD.

The touch panel 520 is superimposed on a display screen of the display unit 518, and receives a touch of an indicator. The touch panel 520 is connected to the bus line 516 through a touch panel I/F (not shown), and outputs positional information indicating a position touched by the indicator to the touch panel I/F. The touch panel I/F operates the touch panel I/F in accordance with an instruction of the CPU 510, and outputs the positional information which is input from the touch panel 520 to the CPU 510.

Figure 42:
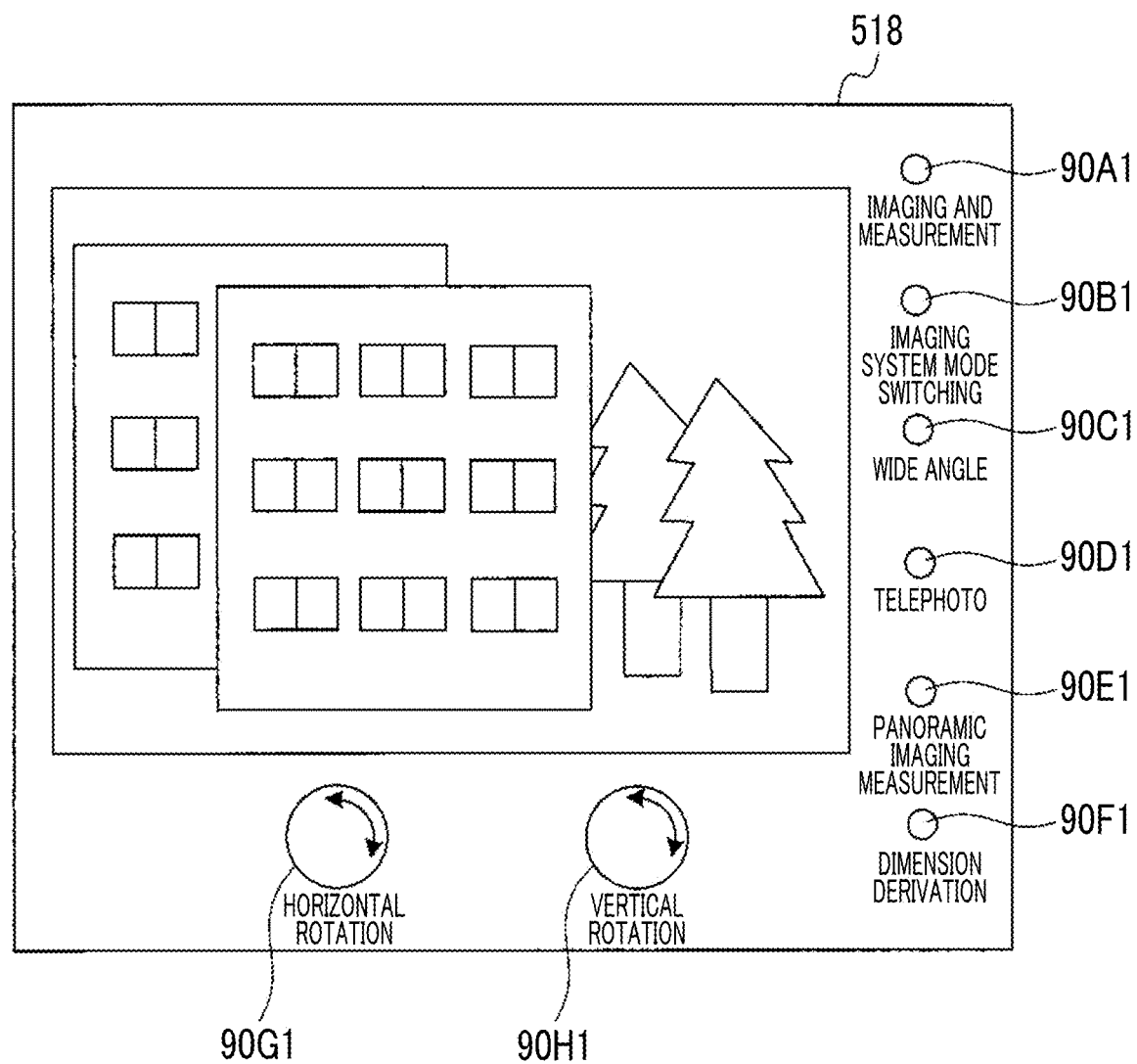
FIG. 42 is a screen view illustrating an example of a screen including various buttons displayed as soft keys on a display unit of a smart device included in the distance measurement device according to the third embodiment.

Soft keys corresponding to the imaging measurement button 90A, the imaging system operation mode switching button 90B, the wide angle instruction button 90C, the telephoto instruction button 90D, the panoramic imaging measurement button 90E, the dimension derivation button 90F, and the like are displayed on the display unit 518 (see FIG. 42).

For example, as illustrated in FIG. 42, an imaging measurement button 90A1 functioning as the imaging measurement button 90A is displayed on the display unit 518 as a soft key, and is pressed down by the user through the touch panel 520. In addition, for example, an imaging button (not shown) functioning as the imaging button described in the first embodiment is displayed on the display unit 518 as a soft key, and is pressed down by the user through the touch panel 520. In addition, for example, an imaging system operation mode switching button 90B1 functioning as the imaging system operation mode switching button 90B is displayed on the display unit 518 as a soft key, and is pressed down by the user through the touch panel 520.

In addition, for example, a wide angle instruction button 90C1 functioning as the wide angle instruction button 90C is displayed on the display unit 518 as a soft key, and is pressed down by the user through the touch panel 520. Further, for example, a telephoto instruction button 90D1 functioning as the telephoto instruction button 90D is displayed on the display unit 518 as a soft key, and is pressed down by the user through the touch panel 520.

In addition, for example, a panoramic imaging measurement button 90E1 functioning as the panoramic imaging measurement button 90E is displayed on the display unit 518 as a soft key, and is pressed down by the user through the touch panel 520. In addition, for example, a dimension derivation button 90F 1 functioning as the dimension derivation button 90F is displayed on the display unit 518 as a soft key, and is pressed down by the user through the touch panel 520.

As illustrated in FIG. 42 as an example, a touch pad for vertical rotation 90G1 and a touch pad for horizontal rotation 90H1 are displayed on the display unit 518.

The touch pad for vertical rotation 90G1 is a circular touch pad functioning as the rotary switch for vertical rotation 90G. As illustrated in FIG. 42 as an example, the amount of rotation and the rotation direction of the vertical rotation mechanism 15 are determined by an arc-shaped trajectory being drawn on the inner side of the display region of the touch pad for vertical rotation 90G1 through the touch panel 520.

That is, the amount of rotation of the vertical rotation mechanism 15 is determined in accordance with the length of the trajectory drawn on the inner side of the display region of the touch pad for vertical rotation 90G1. Here, the length of the trajectory drawn on the inner side of the display region of the touch pad for vertical rotation 90G1 corresponds to, for example, the amount of sliding of an indicator (for example, the user's finger) which is slid in a state where the indicator is in contact with the touch panel 520.

In addition, the rotation direction of the vertical rotation mechanism 15 is determined in accordance with a direction (in the example illustrated in FIG. 42, a direction of an arrow G) in which the trajectory is drawn on the inner side of the display region of the touch pad for vertical rotation 90G1. Here, the direction in which the trajectory is drawn on the inner side of the display region of the touch pad for vertical rotation 90G1 corresponds to, for example, a sliding direction of the indicator which is slid in a state where the indicator is in contact with the touch panel 520.

The touch pad for horizontal rotation 90H1 is a circular touch pad functioning as the rotary switch for horizontal rotation 90H. As illustrated in FIG. 42 as an example, the amount of rotation and the rotation direction of the horizontal rotation mechanism 17 are determined by an arc-shaped trajectory being drawn on the inner side of the display region of the touch pad for horizontal rotation 90H1 through the touch panel 520.

That is, the amount of rotation of the horizontal rotation mechanism 17 is determined in accordance with the length of the trajectory drawn on the inner side of the display region of the touch pad for horizontal rotation 90H1. Here, the length of the trajectory drawn on the inner side of the display region of the touch pad for horizontal rotation 90H1 corresponds to, for example, the amount of sliding of an indicator which is slid in a state where the indicator is in contact with the touch panel 520.

In addition, the rotation direction of the horizontal rotation mechanism 17 is determined in accordance with a direction (in the example illustrated in FIG. 42, a direction of an arrow H) in which the trajectory is drawn on the inner side of the display region of the touch pad for horizontal rotation 90H1. Here, the direction in which the trajectory is drawn on the inner side of the display region of the touch pad for horizontal rotation 90H1 corresponds to, for example, a sliding direction of the indicator which is slid in a state where the indicator is in contact with the touch panel 520.

The radio communication unit 522 is connected to the bus line 516 and the radio communication antenna 524. The radio communication unit 522 transmits a signal, which is input from the CPU 510, to the imaging device main body 504 through the radio communication antenna 524 by radio waves. In a case where radio waves from the imaging device main body 504 are received by the radio communication antenna 524, the radio communication unit 522 acquires a signal based on the received radio waves and outputs the acquired signal to the CPU 510. Therefore, the imaging device main body 504 is controlled by the smart device 500 by radio communication performed between the smart device 500 and the imaging device main body 504.

The secondary storage unit 514 stores the panoramic imaging measurement program 105A and a dimension derivation program 106A. The CPU 510 reads out the panoramic imaging measurement program 105A from the secondary storage unit 514 and develops the read-out panoramic imaging measurement program to the primary storage unit 512 to execute the panoramic imaging measurement program 105A. In addition, the CPU 510 reads out the dimension derivation program 106A from the secondary storage unit 514 and develops the read-out dimension derivation program 106A to the primary storage unit 512 to execute the dimension derivation program 106A.

The CPU 510 executes the panoramic imaging measurement program 105A to be operated as the acquisition unit 110A and the execution unit 112A. In addition, the CPU 510 executes the dimension derivation program 106A, and thus the dimension derivation process described in the first embodiment is realized.

Therefore, in the distance measurement device 10E, the smart device 500 executes the panoramic imaging measurement program 105A and the dimension derivation program 106A, and thus the same operations and effects as those in the above-described embodiments are obtained.

Figure 43:
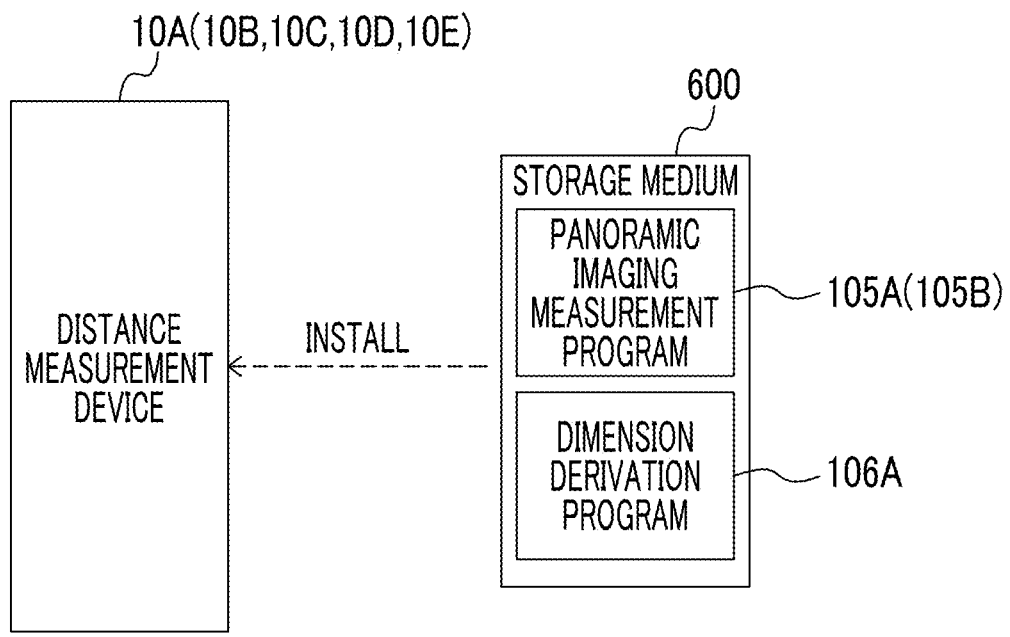
FIG. 43 is a conceptual diagram illustrating an example of a mode in which a panoramic imaging measurement program and a dimension derivation program according to the first to third embodiments are installed in the distance measurement device.

Meanwhile, in the above-described embodiments, a description has been given of a case where the panoramic imaging measurement program 105A (105B) and the dimension derivation program 106A (hereinafter, simply referred to as a "program") are read out from the secondary storage unit 104 (514), but this is just an example. For example, as illustrated in FIG. 43, the programs may be first stored in any portable storage medium 600 such as a Solid State Drive (SSD) or a Universal Serial Bus (USB) memory. In this case, the programs stored in the storage medium 600 are installed in the distance measurement device 10A (10B, 10C, 10D, 10E) (hereinafter, referred to as the "distance measurement device 10A or the like"), and the installed programs are executed by the CPU 100 (510).

In addition, the programs may be stored in a storage unit of another computer or a server device which is connected to the distance measurement device 10A or the like through a communication network (not shown), and the programs may be downloaded in accordance with a request of the distance measurement device 10A or the like. In this case, a downloaded derivation program is executed by the CPU 100 (510).

In the above-described embodiments, a description has been given of a case where various pieces of information such as a panoramic image, the length of an area, and various messages are displayed on the display unit 86, but the technique of this disclosure is not limited thereto. For example, various pieces of information may be displayed on a display unit of an external device which is used by being connected to the distance measurement device 10A or the like. An example of the external device is a PC or a spectacle type or wristwatch type wearable terminal device.

In the above-described embodiments, a description has been given of a case where various pieces of information such as a panoramic image, the length of an area, and various messages are displayed on the display unit 86, but the technique of this disclosure is not limited thereto. For example, at least one of the imaging measurement start message 134, the position change induction information 146, the measurement suppression information 151, and the like may be displayed on a display unit (not shown) different from the display unit 86, and the rest may be displayed on the display unit 86. In addition, the imaging measurement start message 134, the position change induction information 146, the measurement suppression information 151, and the like may be individually displayed on a plurality of display units including the display unit 86.

In the above-described embodiments, a laser beam has been described as light for distance measurement. However, the technique of this disclosure is not limited thereto, and the light for distance measurement may be directional light having directivity. For example, the light for distance measurement may be directional light obtained by a Light Emitting Diode (LED), a Super Luminescent Diode (SLD), or the like. It is preferable that directivity of the directional light is the same degree of directivity as that of the directivity of the laser beam and is usable in distance measurement, for example, within a range between several meters and several kilometers.

In addition, the panoramic imaging measurement process and the dimension derivation process described in the above-described embodiments are just examples. Therefore, it is needless to say that the deletion of unnecessary steps, the addition of new steps, and the change of processing order may be performed without departing from the scope of the invention. In addition, each processing included in the panoramic imaging measurement process and the dimension derivation process may be realized only by a hardware configuration such as ASIC, or may be realized by a combination of a software configuration and a hardware configuration using a computer.

Figure 44:
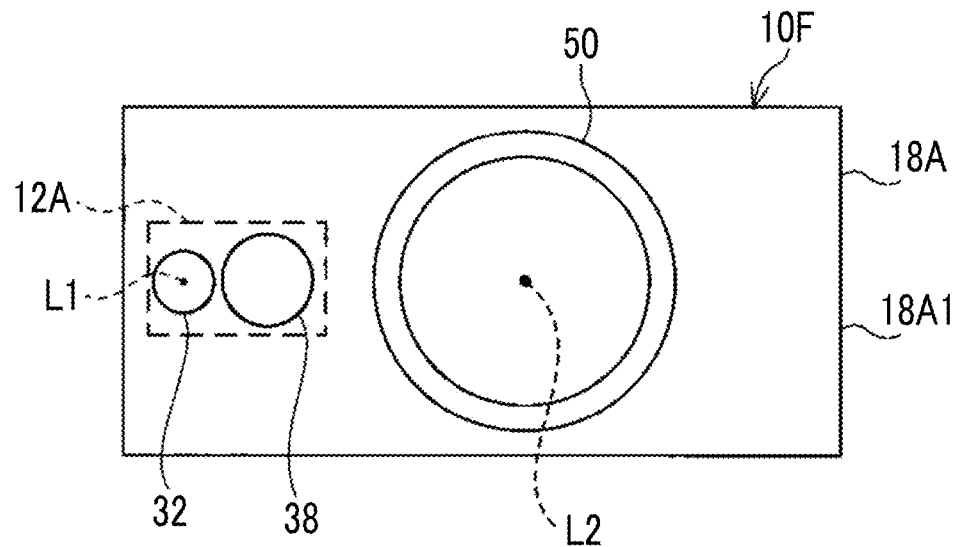
FIG. 44 is a front view illustrating the appearance of the distance measurement device main body according to a modification example of the first embodiment.

In the above-described embodiments, for convenience of description, a description has been given of a case where the distance measurement unit 12 is mounted on the side surface of the imaging device main body 18 included in the distance measurement device 10A and the like, but the technique of this disclosure is not limited thereto. For example, the distance measurement unit 12 may be mounted on the upper surface or the lower surface of the imaging device main body 18. In addition, for example, as illustrated in FIG. 44, a distance measurement device 10F may be applied instead of the distance measurement device 10A and the like. As illustrated in FIG. 44 as an example, the distance measurement device 10F is different from the distance measurement device 10A and the like in that a distance measurement unit 12A is provided instead of the distance measurement unit 12 and an imaging device main body 18A is provided instead of the imaging device main body 18.

In the example illustrated in FIG. 44, the distance measurement unit 12A is accommodated in a housing 18A1 of the imaging device main body 18A, and objective lenses 32 and 38 are exposed from the housing 18A1 on the front side (a side where the focusing lens 50 is exposed) of the distance measurement device 10E. In addition, it is preferable that the distance measurement unit 12A is disposed such that optical axes L1 and L2 are set to be at the same height in the vertical direction. Meanwhile, an opening (not shown) through which the distance measurement unit 12A can be inserted into and removed from the housing 18A1 may be formed in the housing 18A1.

All the documents, patent applications, and technical specifications described in the present specification are incorporated into the present specification by reference, to the same extent as in a case where the individual documents, patent applications, and technical specifications were specifically and individually described as being incorporated by reference.

In regard to the above embodiment, the following appendixes are further disclosed.

(Appendix 1)
An information processing device comprising:
 a processor; and
 a memory storing instructions, which when executed by the processor perform a procedure, the procedure including:
 acquiring measurement success/failure information indicating whether or not measurement by a measurement unit has been successful in a case where a measurement process is executed of emitting directional light, which is light having directivity, toward a subject within a specific imaging range among a plurality of imaging ranges serving as imaging targets in panoramic imaging of the subject, and receiving reflected light of the directional light to cause the measurement unit to measure a distance to the subject; and
 executing a measurement suppressing process of suppressing the measurement by the measurement unit which is performed on the subjects within the plurality of imaging ranges, in a case where the measurement success/failure information acquired indicates that the measurement by the measurement unit has been successful, from when a panoramic imaging start instruction is received until when the panoramic imaging is terminated.

(Appendix 2)
An information processing device comprising:
 a processor; and
 a memory storing instructions, which when executed by the processor perform a procedure, the procedure including:
 acquiring measurement success/failure information indicating whether or not measurement by a measurement unit has been successful in a case where a measurement process is executed of emitting directional light, which is light having directivity, toward a subject within a specific imaging range among a plurality of imaging ranges serving as imaging targets in panoramic imaging of the subject, and receiving reflected light of the directional light to cause the measurement unit to measure a distance to the subject; and
 executing a measurement suppressing process of suppressing the measurement by the measurement unit which is performed on the subjects within the plurality of imaging ranges, in a case where the measurement success/failure information acquired indicates that the measurement by the measurement unit has been successful,
 wherein the measurement process is a process executed in a case where a measurement start instruction for causing the measurement unit to start the measurement of the distance to the subject is received,
 the measurement suppressing process is a measurement prohibition process of prohibiting the measurement by the measurement unit which is performed on the subjects within the plurality of imaging ranges, and
 the measurement prohibition process is a process of prohibiting the measurement by the measurement unit which is performed on the subjects within the plurality of imaging ranges by invalidating the measurement start instruction.

(Appendix 3)
An information processing device comprising:
 a processor; and
 a memory storing instructions, which when executed by the processor perform a procedure, the procedure including:
 acquiring measurement success/failure information indicating whether or not measurement by a measurement unit has been successful in a case where a measurement process is executed of emitting directional light, which is light having directivity, toward a subject within a specific imaging range among a plurality of imaging ranges serving as imaging targets in panoramic imaging of the subject, and receiving reflected light of the directional light to cause the measurement unit to measure a distance to the subject; and
 executing a measurement suppressing process of suppressing the measurement by the measurement unit which is performed on the subjects within the plurality of imaging ranges, in a case where the measurement success/failure information acquired indicates that the measurement by the measurement unit has been successful,
 wherein the measurement suppressing process is a process of suppressing the measurement by the measurement unit which is performed on the subject within an imaging range of which imaging has not been performed yet, among the plurality of imaging ranges.

(Appendix 4)
An information processing device comprising:
 a processor; and
 a memory storing instructions, which when executed by the processor perform a procedure, the procedure including:
 acquiring measurement success/failure information indicating whether or not measurement by a measurement unit has been successful in a case where a measurement process is executed of emitting directional light, which is light having directivity, toward a subject within a specific imaging range among a plurality of imaging ranges serving as imaging targets in panoramic imaging of the subject, and receiving reflected light of the directional light to cause the measurement unit to measure a distance to the subject; and
 executing a measurement suppressing process of suppressing the measurement by the measurement unit which is performed on the subjects within the plurality of imaging ranges, in a case where the measurement success/failure information acquired indicates that the measurement by the measurement unit has been successful and imaging of the plurality of imaging ranges has been terminated.

(Appendix 5)
An information processing device comprising:
 a processor; and
 a memory storing instructions, which when executed by the processor perform a procedure, the procedure including:
 acquiring measurement success/failure information indicating whether or not measurement by a measurement unit has been successful in a case where a measurement process is executed of emitting directional light, which is light having directivity, toward a subject within a specific imaging range among a plurality of imaging ranges serving as imaging targets in panoramic imaging of the subject, and receiving reflected light of the directional light to cause the measurement unit to measure a distance to the subject;
 executing a measurement suppressing process of suppressing the measurement by the measurement unit which is performed on the subjects within the plurality of imaging ranges, in a case where the measurement success/failure information acquired indicates that the measurement by the measurement unit has been successful, and
 executing a generation process of generating a panoramic image obtained by joining images, which are obtained by performing projection conversion on a plurality of captured images obtained by imaging the subject included in each of the plurality of imaging ranges, together,
 wherein in a case where a first captured image, obtained by imaging the subject within one imaging range of which imaging is first performed out of adjacent imaging ranges which are imaging ranges adjacent to each other in the plurality of imaging ranges, includes multi-apex pixels which are at least four pixels for defining apexes of a polygon and a second captured image, obtained by imaging the subject within the other imaging range out of the adjacent imaging ranges, includes corresponding pixels which are pixels corresponding to the multi-apex pixels, the panoramic image is an image including a first projection-converted image which is an image obtained by performing projection conversion on the first captured image on the basis of the multi-apex pixels, and a second projection-converted image which is an image obtained by performing projection conversion on the second captured image on the basis of the corresponding pixels.

(Appendix 6)
The information processing device according to any one of Appendixes 1 to 5,
 wherein the processor is a circuitry.

What is claimed is:
1. An information processing device comprising:
 an acquisition unit that acquires measurement success/failure information indicating whether or not measurement by a measurement unit has been successful in a case in which a measurement process is executed of emitting directional light, which is light having directivity, toward a subject within a specific imaging range among a plurality of imaging ranges serving as imaging targets in panoramic imaging of the subject, and receiving reflected light of the directional light to cause the measurement unit to measure a distance to the subject; and
 an execution unit that executes a measurement suppressing process of suppressing the measurement by the measurement unit which is performed on the subjects within the plurality of imaging ranges, in a case in which the measurement success/failure information acquired by the acquisition unit indicates that the measurement by the measurement unit has been successful, from when a panoramic imaging start instruction is received until when the panoramic imaging is terminated.

2. The information processing device according to claim 1,
 wherein the measurement suppressing process is a measurement prohibition process of prohibiting the measurement by the measurement unit which is performed on the subjects within the plurality of imaging ranges.

3. An information processing device comprising:
an acquisition unit that acquires measurement success/failure information indicating whether or not measurement by a measurement unit has been successful in a case in which a measurement process is executed of emitting directional light, which is light having directivity, toward a subject within a specific imaging range among a plurality of imaging ranges serving as imaging targets in panoramic imaging of the subject, and receiving reflected light of the directional light to cause the measurement unit to measure a distance to the subject; and
an execution unit that executes a measurement suppressing process of suppressing the measurement by the measurement unit which is performed on the subjects within the plurality of imaging ranges, in a case in which the measurement success/failure information acquired by the acquisition unit indicates that the measurement by the measurement unit has been successful,
wherein the measurement process is a process executed in a case in which a measurement start instruction for causing the measurement unit to start the measurement of the distance to the subject is received,
the measurement suppressing process is a measurement prohibition process of prohibiting the measurement by the measurement unit which is performed on the subjects within the plurality of imaging ranges, and
the measurement prohibition process is a process of prohibiting the measurement by the measurement unit which is performed on the subjects within the plurality of imaging ranges by invalidating the measurement start instruction.

4. An information processing device comprising:
an acquisition unit that acquires measurement success/failure information indicating whether or not measurement by a measurement unit has been successful in a case in which a measurement process is executed of emitting directional light, which is light having directivity, toward a subject within a specific imaging range among a plurality of imaging ranges serving as imaging targets in panoramic imaging of the subject, and receiving reflected light of the directional light to cause the measurement unit to measure a distance to the subject; and
an execution unit that executes a measurement suppressing process of suppressing the measurement by the measurement unit which is performed on the subjects within the plurality of imaging ranges, in a case in which the measurement success/failure information acquired by the acquisition unit indicates that the measurement by the measurement unit has been successful,
wherein the measurement suppressing process is a process of suppressing the measurement by the measurement unit which is performed on the subject within an imaging range of which imaging has not been performed yet, among the plurality of imaging ranges.

5. An information processing device comprising:
an acquisition unit that acquires measurement success/failure information indicating whether or not measurement by a measurement unit has been successful in a case in which a measurement process is executed of emitting directional light, which is light having directivity, toward a subject within a specific imaging range among a plurality of imaging ranges serving as imaging targets in panoramic imaging of the subject, and receiving reflected light of the directional light to cause the measurement unit to measure a distance to the subject; and
an execution unit that executes a measurement suppressing process of suppressing the measurement by the measurement unit which is performed on the subjects within the plurality of imaging ranges, in a case in which the measurement success/failure information acquired by the acquisition unit indicates that the measurement by the measurement unit has been successful,
wherein the execution unit executes the measurement suppressing process in a case in which the measurement success/failure information acquired by the acquisition unit indicates that the measurement by the measurement unit has been successful, and imaging of the plurality of imaging ranges has been terminated.

6. The information processing device according to claim 1,
wherein the measurement suppressing process is a process including a first display process of displaying, on a first display unit, information for prompting suppression of the measurement by the measurement unit which is performed on the subjects within the plurality of imaging ranges.

7. The information processing device according to claim 3,
wherein the measurement suppressing process is a process including a first display process of displaying, on a first display unit, information for prompting suppression of the measurement by the measurement unit which is performed on the subjects within the plurality of imaging ranges.

8. The information processing device according to claim 4,
wherein the measurement suppressing process is a process including a first display process of displaying, on a first display unit, information for prompting suppression of the measurement by the measurement unit which is performed on the subjects within the plurality of imaging ranges.

9. The information processing device according to claim 5,
wherein the measurement suppressing process is a process including a first display process of displaying, on a first display unit, information for prompting suppression of the measurement by the measurement unit which is performed on the subjects within the plurality of imaging ranges.

10. The information processing device according to claim 1,
wherein the execution unit further executes a movement process of operating a change mechanism, which has a power source and changes an imaging direction in accordance with power generated by the power source, in a case in which imaging of the subject within a designated imaging range is terminated, to move a position of the designated imaging range to a position where next imaging in the panoramic imaging is expected to be performed, the designated imaging range being an imaging range designated as an object to be subjected to the imaging before individual imaging is performed, among the plurality of imaging ranges.

11. The information processing device according to claim 3,
wherein the execution unit further executes a movement process of operating a change mechanism, which has a power source and changes an imaging direction in accordance with power generated by the power source, in a case in which imaging of the subject within a designated imaging range is terminated, to move a position of the designated imaging range to a position where next imaging in the panoramic imaging is expected to be performed, the designated imaging range being an imaging range designated as an object to be subjected to the imaging before individual imaging is performed, among the plurality of imaging ranges.

12. The information processing device according to claim 4,
wherein the execution unit further executes a movement process of operating a change mechanism, which has a power source and changes an imaging direction in accordance with power generated by the power source, in a case in which imaging of the subject within a designated imaging range is terminated, to move a position of the designated imaging range to a position where next imaging in the panoramic imaging is expected to be performed, the designated imaging range being an imaging range designated as an object to be subjected to the imaging before individual imaging is performed, among the plurality of imaging ranges.

13. The information processing device according to claim 5,
wherein the execution unit further executes a movement process of operating a change mechanism, which has a power source and changes an imaging direction in accordance with power generated by the power source, in a case in which imaging of the subject within a designated imaging range is terminated, to move a position of the designated imaging range to a position where next imaging in the panoramic imaging is expected to be performed, the designated imaging range being an imaging range designated as an object to be subjected to the imaging before individual imaging is performed, among the plurality of imaging ranges.

14. The information processing device according to claim 1,
wherein the execution unit further executes a generation process of generating a panoramic image obtained by joining images, which are obtained by performing projection conversion on a plurality of captured images obtained by imaging the subject included in each of the plurality of imaging ranges, together.

15. The information processing device according to claim 3,
wherein the execution unit further executes a generation process of generating a panoramic image obtained by joining images, which are obtained by performing projection conversion on a plurality of captured images obtained by imaging the subject included in each of the plurality of imaging ranges, together.

16. An information processing device comprising:
an acquisition unit that acquires measurement success/failure information indicating whether or not measurement by a measurement unit has been successful in a case in which a measurement process is executed of emitting directional light, which is light having directivity, toward a subject within a specific imaging range among a plurality of imaging ranges serving as imaging targets in panoramic imaging of the subject, and receiving reflected light of the directional light to cause the measurement unit to measure a distance to the subject; and
an execution unit that executes a measurement suppressing process of suppressing the measurement by the measurement unit which is performed on the subjects within the plurality of imaging ranges, in a case in which the measurement success/failure information acquired by the acquisition unit indicates that the measurement by the measurement unit has been successful,
wherein the execution unit further executes a generation process of generating a panoramic image obtained by joining images, which are obtained by performing projection conversion on a plurality of captured images obtained by imaging the subject included in each of the plurality of imaging ranges, together, and
in a case in which a first captured image, obtained by imaging the subject within one imaging range of which imaging is first performed out of adjacent imaging ranges which are imaging ranges adjacent to each other in the plurality of imaging ranges, includes multi-apex pixels which are at least four or more pixels for defining apexes of a polygon and a second captured image, obtained by imaging the subject within the other imaging range out of the adjacent imaging ranges, includes corresponding pixels which are pixels corresponding to the multi-apex pixels, the panoramic image is an image including a first projection-converted image which is an image obtained by performing projection conversion on the first captured image on the basis of the multi-apex pixels, and a second projection-converted image which is an image obtained by performing projection conversion on the second captured image on the basis of the corresponding pixels.

17. The information processing device according to claim 16,
wherein the execution unit further executes a second display process of displaying imaging start timing information, indicating a timing when the imaging of the subject within the other imaging range is started, on a second display unit in a case in which the other imaging range includes the apexes of the polygon.

18. The information processing device according to claim 1,
wherein the execution unit further executes a derivation process of deriving a dimension of a real space region corresponding to an interval between a plurality of pixels designated within a panoramic image obtained by performing the panoramic imaging, on the basis of the distance to the subject which is obtained by executing the measurement process and the designated interval.

19. An information processing method comprising:
acquiring measurement success/failure information indicating whether or not measurement by a measurement unit has been successful in a case in which a measurement process is executed of emitting directional light, which is light having directivity, toward a subject within a specific imaging range among a plurality of imaging ranges serving as imaging targets in panoramic imaging of the subject, and receiving reflected light of the directional light to cause the measurement unit to measure a distance to the subject; and executing a measurement suppressing process of suppressing the measurement by the measurement unit which is performed on the subjects within the plurality of imaging ranges, in a case in which the acquired measurement success/failure information indicates that the measurement by the measurement unit has been successful, from when a panoramic imaging start instruction is received until when the panoramic imaging is terminated.

20. A non-transitory computer-readable recording medium storing a program causing a computer to execute a process comprising:

acquiring measurement success/failure information indicating whether or not measurement by a measurement unit has been successful in a case in which a measurement process is executed of emitting directional light, which is light having directivity, toward a subject within a specific imaging range among a plurality of imaging ranges serving as imaging targets in panoramic imaging of the subject, and receiving reflected light of the directional light to cause the measurement unit to measure a distance to the subject; and executing a measurement suppressing process of suppressing the measurement by the measurement unit which is performed on the subjects within the plurality of imaging ranges, in a case in which the acquired measurement success/failure information indicates that the measurement by the measurement unit has been successful, from when a panoramic imaging start instruction is received until when the panoramic imaging is terminated.

* * * * *